(12) United States Patent
Veige

(10) Patent No.: US 11,814,462 B2
(45) Date of Patent: Nov. 14, 2023

(54) FUNCTIONALIZED CYCLIC POLYMERS AND METHODS OF PREPARING SAME

(71) Applicant: University of Florida Research Foundation, Inc., Gainesville, FL (US)

(72) Inventor: Adam S. Veige, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 141 days.

(21) Appl. No.: 17/516,191

(22) Filed: Nov. 1, 2021

(65) Prior Publication Data

US 2022/0056167 A1 Feb. 24, 2022

Related U.S. Application Data

(63) Continuation-in-part of application No. PCT/US2020/031115, filed on May 1, 2020.

(60) Provisional application No. 62/841,313, filed on May 1, 2019.

(51) Int. Cl.
*C08F 4/78* (2006.01)
*C08F 138/00* (2006.01)

(52) U.S. Cl.
CPC ........................ *C08F 4/78* (2013.01)

(58) Field of Classification Search
CPC ..................... C08F 4/78; C08F 138/00
See application file for complete search history.

(56) References Cited

U.S. PATENT DOCUMENTS 9,206,266 B2 * 12/2015 Veige ............... C08F 4/62082
2014/0309389 A1 10/2014 Veige et al.

FOREIGN PATENT DOCUMENTS

WO WO-2015191571 A1 * 12/2015 ............ C08F 30/08

OTHER PUBLICATIONS

Furakawa et al., "Alternating Copolymerization of Acetylenic Donor and Acceptor Monomers," Polym. J., vol. 12, No. 1, pp. 17-23 (1980). (Year: 1980).*
Zhang et al., "Universal Cyclic Polymer Templates," J. Am. Chem. Soc. 2011, 133, 6906-6909. (Year: 2011).*
Gibson et al., Poly(1,6-heptadiyne), a free-standing polymer film dopable to high electrical conductivity, Journal of the American Chemical Society, 105(13):4417-4431 (1983).
Gonsales et al. Highly Tactic Cyclic Polynorbornene: Stereoselective Ring Expansion Metathesis Polymerization of Norbornene Catalyzed by a New Tethered Tungsten-Alkylidene Catalyst, Journal of the American Chemical Society, 138:4996-4999 (2016).
International Application No. PCT/US20/031115, International Search Report and Written Opinion, dated Sep. 4, 2020.
(Continued)

*Primary Examiner* — Catherine S Branch
(74) *Attorney, Agent, or Firm* — MARSHALL, GERSTEIN & BORUN LLP

(57) ABSTRACT

The disclosure provides a method of preparing a functionalized cyclic polymer the method including reacting a metal-alkylidyne compound, metallacycloalkylene compound, or metallacyclopentadiene compound with a plurality of alkynes to form the functionalized cyclic polymer, wherein at least one alkyne comprises a functional group capable of further reacting to form a modified polymer. Also provided is a stereoregular functionalized cyclic polymer prepared by the method of the disclosure.

49 Claims, 2 Drawing Sheets

(56) References Cited

OTHER PUBLICATIONS

International Application No. PCT/US20/031115, Invitation to Pay Additional Fees, dated Jun. 30, 2020.

McGowan et al., Compelling mechanistic data and identification of the active species in tungsten-catalyzed alkyne polymerizations: conversion of a trianionic pincer into a new tetraanionic pincer-type ligand, Chemical Science, 4(3):1145-1155 (2013).

Nandi et al., Swelling Behavior of Partially Cross-Linked Polymers :? A Ternary System, Macromolecules, 38(10):4447-4455 (2005).

Roland et al., Cyclic polymers from alkynes, Nature Chemistry, 8:791-796 (2016).

Siskos et al. The polymerization of propargyl halides (Cl, Br) using $M(CO)5PPh_3/R_xAlCl_{3-x}(M=Mo,W)$ as catalysts, Polymer Bulletin, 33:295-300, (1994).

\* cited by examiner

FUNCTIONALIZED CYCLIC POLYMERS AND METHODS OF PREPARING SAME

CROSS-REFERENCE TO RELATED APPLICATIONS

This application is a continuation-in-part of PCT Application No. PCT/US20/31115, filed May 1, 2020, which claims the benefit under 35 U.S.C. 119(e) of U.S. Provisional Application No. 62/841,313, filed May 1, 2019, the entire disclosures of which are hereby incorporated by reference.

STATEMENT REGARDING FEDERALLY SPONSORED RESEARCH OR DEVELOPMENT

This invention was made with U.S. government support under Grant Numbers 2108266, 1808234, and 1565654, awarded by the National Science Foundation. The U.S. government has certain rights in the invention.

BACKGROUND

An important challenge in modern polymer chemistry is the efficient and controlled synthesis of polymers with unique topologies. Perhaps the simplest shape change is to convert a linear polymer into its cyclic analogue. By simply tying together the chain ends of a linear polymer it is possible to dramatically alter its physical properties. The repeat unit, functional groups, molecular weight (minus end groups), and polydispersity all remain the same when the chain ends are removed to create a cyclic polymer; however, the density, refractive index, $T_g$, viscoelasticity, reptation, and surface properties all change.

A common method for the synthesis of cyclic polymers involves intramolecular coupling of polymer chain ends; however, inherent limitations of this method are the requirement of dilute conditions and long reaction times. Ring closing methods continue to improve and provide an opportunity to obtain samples of unique ring-shaped polymers, though large scale production via ring closure is unlikely.

Metal complexes that polymerize alkynes by ring expansion metathesis polymerization (REMP) to yield cyclic polyalkenes are desirable.

SUMMARY

One aspect of the disclosure provides methods of preparing functionalized cyclic polymers, the methods including reacting a metal-alkylidyne compound, metallacycloalkylene compound, or metallacyclopentadiene compound with a plurality of alkynes to form the functionalized cyclic polymer, wherein at least one alkyne includes a functional group capable of further reacting to form a modified polymer.

Another aspect of the disclosure provides stereoregular functionalized cyclic polymers prepared by the methods of the disclosure.

Further aspects and advantages will be apparent to those of ordinary skill in the art from a review of the following detailed description. While the methods and functionalized polymers are susceptible of embodiments in various forms, the description hereafter includes specific embodiments with the understanding that the disclosure is illustrative and is not intended to limit the invention to the specific embodiments disclosed herein.

DETAILED DESCRIPTION

Figure 1:
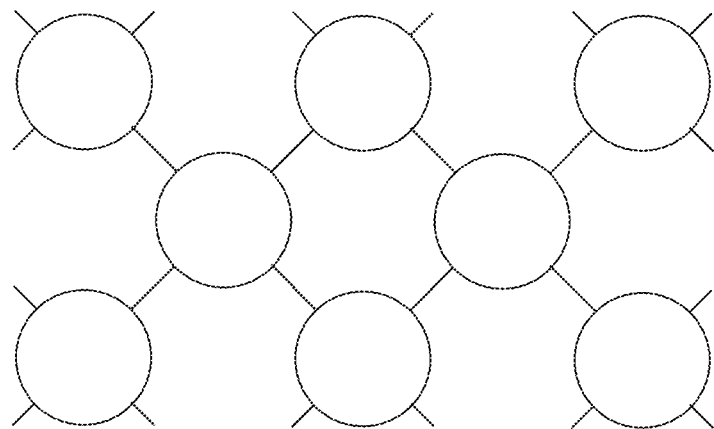
FIG. 1 is a representation of a crosslinked cyclic polymer network.

Many modifications and other embodiments disclosed herein will come to mind to one skilled in the art to which the disclosed compositions and methods pertain having the benefit of the teachings presented herein. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Definitions

As used herein, the term "alkyl" refers to straight chained and branched saturated hydrocarbon groups containing one to thirty carbon atoms, for example, one to twenty two carbon atoms, or one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$alkyl and $C_1$-$C_7$ alkyl refer to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Nonlimiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group. For example, a "haloalkyl" is an alkyl group that is substituted with one or more halo, and can be perhalogenated (i.e., each hydrogen atom of the alkyl group are substituted with a halo atom).

As used herein, the term "alkylene" refers to an alkyl group having a substituent. For example, an alkylene group can be —CH$_2$CH$_2$— or —CH$_2$—. The term "alkylene-aryl" refers to an alkyl group substituted with an aryl group. The term C$_n$ means the alkylene group has "n" carbon atoms. For example, C$_{1-6}$ alkylene refers to an alkylene group having a number of carbon atoms encompassing the entire range, as well as all subgroups, as previously described for "alkyl" groups. A C$_0$alkylene group is merely a bond to the stated substituted—e.g., C$_0$alkylene-5-7 membered heterocycloalkyl indicates a direct bond to the 5-7 membered heterocycloalkyl. Unless otherwise indicated, an alkylene group can be an unsubstituted alkylene group or a substituted alkylene group.

As used herein, the term "heteroalkyl" is defined similarly as alkyl except that the straight chained and branched saturated hydrocarbon group contains one to five heteroatoms (e.g., 1-5, 1-4, 1-3, 1-2, 1, 2, 3, 4, or 5 heteroatoms) independently selected from oxygen (O), nitrogen (N), and sulfur (S). In particular, the term "heteroalkyl" refers to a saturated hydrocarbon containing one to thirty carbon atoms and one to five heteroatoms. In general, in embodiments wherein the heteroalkyl is provided as a substituent, the heteroalkyl is bound through a carbon atom, e.g., a heteroalkyl is distinct from an alkoxy or amino group. Unless otherwise indicated, a heteroalkyl group can be an unsubstituted or a substituted heteroalkyl group.

As used herein, the term "cycloalkyl" refers to an aliphatic monocyclic or polycyclic hydrocarbon ring containing three to twenty two carbon atoms, for example, three to twenty, three to fifteen carbon atoms, or three to ten carbon atoms (e.g., 3, 4, 5, 6, 7, 8, 10, 12, 14, 15, 16, 17, 18, 19, 20, 21, or 22 carbon atoms). The term C$_n$ means the cycloalkyl group has "n" carbon atoms. For example, C$_5$ cycloalkyl refers to a cycloalkyl group that has 5 carbon atoms in the ring. C$_{5-8}$ cycloalkyl and C$_5$-C$_8$ cycloalkyl refer to cycloalkyl groups having a number of carbon atoms encompassing the entire range (i.e., 5 to 8 carbon atoms), as well as all subgroups (e.g., 5-6, 6-7, 6-8, 7-8, 5-7, 5, 6, 7, and 8 carbon atoms). Nonlimiting examples of cycloalkyl groups include cyclopropyl, cyclobutyl, cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group.

As used herein, the term "heterocycloalkyl" is defined similarly as cycloalkyl, except the ring contains one to four heteroatoms independently selected from oxygen, nitrogen, and sulfur. In particular, the term "heterocycloalkyl" refers to a ring containing a total of five to twenty atoms, for example five to fifteen atoms, five to twelve, or five to ten atoms, of which 1, 2, 3, or 4 of those atoms are heteroatoms independently selected from the group consisting of oxygen, nitrogen, and sulfur, and the remaining atoms in the ring are carbon atoms. Nonlimiting examples of heterocycloalkyl rings include piperidine, pyrazolidine, tetrahydrofuran, tetrahydropyran, dihydrofuran, and morpholine. The heterocycloalkyl groups described herein can be isolated or fused to another heterocycloalkyl group, a cycloalkyl group, an aryl group, and/or a heteroaryl group. In some embodiments, the heterocycloalkyl groups described herein comprise one oxygen ring atom (e.g., oxiranyl, oxetanyl, tetrahydrofuranyl, and tetrahydropyranyl). The heterocycloalkyl can include one or more unsaturated bonds, but is not aromatic. Unless otherwise indicated, a heterocycloalkyl group can be an unsubstituted or a substituted heterocycloalkyl group.

As used herein, the term "alkenyl" is defined identically as "alkyl," except for containing at least one carbon-carbon double bond, and having two to thirty carbon atoms, for example, two to twenty carbon atoms, or two to ten carbon atoms. The term C$_n$ means the alkenyl group has "n" carbon atoms. For example, C$_4$ alkenyl refers to an alkenyl group that has 4 carbon atoms. C$_{2-7}$ alkenyl and C$_2$-C$_7$ alkenyl refer to an alkenyl group having a number of carbon atoms encompassing the entire range (i.e., 2 to 7 carbon atoms), as well as all subgroups (e.g., 2-6, 2-5, 3-6, 2, 3, 4, 5, 6, and 7 carbon atoms). Specifically contemplated alkenyl groups include ethenyl, 1-propenyl, 2-propenyl, and butenyl. Unless otherwise indicated, an alkenyl group can be an unsubstituted alkenyl group or a substituted alkenyl group.

As used herein, the term "cycloalkenyl" is defined identically as "cycloalkyl," except for containing at least one carbon-carbon double bond, and containing three to twenty carbon atoms (e.g., 3, 4, 5, 6, 7, 8, 10, 12, 14, 15, 16, 17, 18, 19 or 20 carbon atoms). The term C$_n$ means the cycloalkenyl group has "n" carbon atoms. For example, C$_5$ cycloalkenyl refers to a cycloalkenyl group that has 5 carbon atoms in the ring. C$_{5-8}$ cycloalkenyl refers to cycloalkenyl groups having a number of carbon atoms encompassing the entire range (i.e., 5 to 8 carbon atoms), as well as all subgroups, as previously described for "cycloalkyl." Unless otherwise indicated, a heterocycloalkyl group can be an unsubstituted or a substituted heterocycloalkyl group.

As used herein, the term "heteroalkenyl" is defined identically as "heteroalkyl" except for containing at least one carbon-carbon double bond. As used herein, the term "heterocycloalkenyl" is defined identically as "heterocycloalkyl" except for containing at least one carbon-carbon double bond. Unless otherwise indicated, a heteroalkenyl group can be an unsubstituted or a substituted heteroalkenyl group.

As used herein, the term "alkynyl" is defined identically as "alkyl," except for containing at least one carbon-carbon triple bond, and having two to thirty carbon atoms, for example, two to twenty carbon atoms, or two to ten carbon atoms. The term C$_n$ means the alkynyl group has "n" carbon atoms. For example, C$_4$ alkynyl refers to an alkynyl group that has 4 carbon atoms. C$_{2-7}$ alkynyl and C$_2$-C$_7$ alkynyl refer to an alkynyl group having a number of carbon atoms encompassing the entire range (i.e., 2 to 7 carbon atoms), as well as all subgroups (e.g., 2-6, 2-5, 3-6, 2, 3, 4, 5, 6, and 7 carbon atoms). Unless otherwise indicated, an alkynyl group can be an unsubstituted alkynyl group or a substituted alkynyl group.

As used herein, the term "cycloalkynyl" is defined identically as "cycloalkyl," except for containing at least one carbon-carbon triple bond, and containing eight to twenty carbon atoms (e.g., 8, 10, 12, 14, 15, 16, 17, 18, 19 or 20 carbon atoms). The term C$_n$ means the cycloalkynyl group has "n" carbon atoms. For example, C$_5$ cycloalkynyl refers to a cycloalkynyl group that has 5 carbon atoms in the ring. C$_{5-8}$ cycloalkynyl refers to cycloalkynyl groups having a number of carbon atoms encompassing the entire range (i.e., 5 to 8 carbon atoms), as well as all subgroups, as previously described for "cycloalkyl." Unless otherwise indicated, a cycloalkynyl group can be an unsubstituted or a substituted cycloalkynyl group.

As used herein, the term "alkenylene" refers to an alkenyl group having a substituent. For example, an alkenylene group can be —CHCH—. As used herein, the term "alkynylene" refers to an alkynyl group having a substituent. As used herein, the term "cycloalkylene" refers to a cycloalkyl group having a substituent. As used herein, the term "cycloalkenylene" refers to a cycloalkenyl group having a substituent. As used herein, the term "cycloalkynylene" refers to a cycloalkynyl group having a substituent. As used herein, the term "heteroalkylene" refers to a heteroalkyl group having a substituent. As used herein, the term "heteroalkenylene" refers to a heteroalkenyl group having a substituent. As used herein, the term "heterocycloalkylene" refers to a heterocycloalkyl group having a substituent. As used herein, the term "heterocycloalkenylene" refers to a heterocycloalkenyl group having a substituent. Unless otherwise indicated, an alkenylene group, an alkynylene group, a cycloalkylene group, a cycloalkenylene group, a cycloalkynylene group, a heteroalkylene group, a heteroalkenylene group, a heterocycloalkylene group, or a heterocycloalkenylene group can be unsubstituted or a substituted.

As used herein, the term "aryl" refers to monocyclic or polycyclic (e.g., fused bicyclic and fused tricyclic) carbocyclic aromatic ring systems. The term $C_n$ means the aryl ring has "n" carbon atoms. For example, $C_6$ aryl refers to an aryl ring that has 6 carbon atoms in the ring. Examples of aryl groups include, but are not limited to, phenyl, methoxyphenyl, chlorophenyl, naphthyl, methylnaphthyl, fluoronaphthyl, tetrahydronaphthyl, phenanthrenyl, indanyl, indenyl, anthracenyl, tetracenyl, chrysenyl, triphenylenyl, pyrenyl, fluorenyl. Unless otherwise indicated, an aryl group can be an unsubstituted aryl group or a substituted aryl group. In particular, one to four carbon atoms of an aryl ring can be independently substituted with a group selected from, for example, halo, alkyl, alkenyl, $OCF_3$, $NO_2$, CN, NC, OH, alkoxy, amino, $CO_2H$, $CO_2$alkyl, aryl, and heteroaryl. Other substituents are also contemplated, including $C_{0-3}$alkylene-halo, $C_{0-3}$alkylene-CN, $C_{0-3}$alkylene-$NH_2$, $C_{0-3}$alkylene-OH, and $C_{0-3}$alkylene-O—$C_{1-3}$alkyl.

As used herein, the term "heteroaryl" refers to a monocyclic or polycyclic aromatic ring system having five to twenty total ring atoms (e.g., a monocyclic aromatic ring with 5-12 total ring atoms), of which 1, 2, 3, or 4 of those atoms are heteroatoms independently selected from the group consisting of oxygen, nitrogen, and sulfur, and the remaining atoms in the ring are carbon atoms. Unless otherwise indicated, a heteroaryl ring can be unsubstituted or substituted with one or more, and in particular one to four, substituents selected from, for example, halo, alkyl, alkenyl, $OCF_3$, $NO_2$, CN, NC, OH, alkoxy, amino, $CO_2H$, $CO_2$alkyl, aryl, and heteroaryl. In some cases, the heteroaryl ring is substituted with one or more of alkyl and alkoxy groups. Heteroaryl rings can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, furyl, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl ring is fused to another heteroaryl group, then each ring can contain five to twenty total ring atoms and one to five heteroatoms in its aromatic ring.

As used herein, the term "arylene" refers to an aryl group having a substituent. For example, an arylene group can be —$C_6H_4$— (phenylene) or —$C_{10}H_5$— (naphthylene). As used herein, the term "heteroarylene" refers to a heteroaryl group having a substituent. Unless otherwise indicated, an arylene group or a heteroarylene group can be unsubstituted or substituted.

As used herein, the term "cyclic group" refers to any ring structure comprising a cycloalkyl, heterocycloalkyl, aryl, heteroaryl, cycloalkenyl, heterocycloalkenyl, or a combination thereof. Unless otherwise indicated, a cyclic group can be an unsubstituted or a substituted cyclic group.

As used herein, the term "hydroxy" or "hydroxyl" refers to the "—OH" group. As used herein, the term "thiol" refers to the "—SH" group.

As used herein, the term "alkoxy" or "alkoxyl" refers to a "—O-alkyl" group. As used herein, the term "aryloxy" or "aryloxyl" refers to a "—O-aryl" group.

As used herein, the term "silyl" refers to a "—$SiH_3$" group wherein one, two, or three hydrogens can be replaced with an alkyl, cycloalkyl, or aryl group. As used herein, the term "silyl ether" refers to an "—O—$SiH_3$" group, wherein one, two, or three hydrogens can be replaced with an alkyl, cycloalkyl, or aryl group.

As used herein, the term "carboxy" or "carboxyl" refers to a —C(=O)OH group and the term "carboxylate" refers to a —C(=O)O— group, wherein. The carboxylate group can be associated with an alkali metal or alkaline earth metal cation.

As used herein, the term "boryl" refers to a —B($R^F$)($R^F$) group, wherein each $R^F$ can independently be alkyl or aryl.

As used herein, the term "halo" is defined as fluoro, chloro, bromo, and iodo. The term "haloalkyl" refers to an alkyl group that is substituted with at least one halogen, and includes perhalogenated alkyl (i.e., all hydrogen atoms substituted with halogen).

As used herein, the term "amino" refers to a —$NH_2$ group, wherein one or both hydrogens can be replaced with an alkyl, cycloalkyl, or aryl group. As used herein, the term "amido" refers to —$NR^F$C(=O) or —C(=O)—$NR^F$), wherein $R^F$ is a substituent on the nitrogen (e.g., alkyl or H). As used herein "imine" refers to a —N(H)=$CH_2$ group, wherein one, two, or three hydrogens can be replaced with an alkyl, cycloalkyl, or aryl group. When referring to a ligand, the term "amine" refers to a $NH_3$ group, where one, two, or three hydrogens can be replaced with an alkyl, cycloalkyl, or aryl group. When referring to a ligand, the term "amide" refers to a $NH_2$ group, wherein one or both hydrogen can be replaced with an alkyl, cycloalkyl, or aryl group.

As used herein, the term "phosphine" refers to a —$PH_3$ group, wherein 0, 1, 2, or 3 hydrogens can be replaced with an alkyl, cycloalkyl, or aryl group. As used herein "phosphite" refers to a —P(O$R^F$)$_3$ group, wherein each $R^F$ can individually be alkyl, cycloalkyl, or aryl. As used herein, "phosphonite" refers to a —PRF(O$R^F$)$_2$ group, wherein each $R^F$ can individually be alkyl, cycloalkyl, or aryl. As used herein, "phosphinite" refers to a —PR$F_2$(O$R^F$) group, wherein each $R^F$ can individually be alkyl, cycloalkyl, or aryl. As used herein, the term "diphosphine" refers to a —P($R^F_2$)—($CH_2$)$_n$—P($R^F_2$)— group, wherein each $R^F$ can individually be alkyl, cycloalkyl, or aryl and n can be 1, 2, 3, 4, or 5.

As used herein, the term "substituted," when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, heterocycloalkenyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms.

As used herein, the terms "poly(alkyne)" and "poly(alkynes) refer to a polymer prepared from a plurality of alkyne monomers. As used herein, the term "cyclic polyalkene" refers to a cyclic polymer comprising a plurality of C=C units.

A "neutral ligand," as used herein, refers to a ligand that, when provided as a free molecule, does not bear a charge. Examples of neutral ligands include water, phosphines, amines, tetrahydrofuran, and pyridine.

When a substituent is indicated to be optionally substituted, that means that one or more of an available hydrogen is replaced with a different moiety.

Methods of the Disclosure

Provided herein are methods of preparing a functionalized cyclic polymer, the method including reacting a metal-alkylidyne compound, metallacycloalkylene compound, or metallacyclopentadiene compound with a plurality of alkynes to form the functionalized cyclic polymer, wherein at least one alkyne comprises a functional group capable of further reacting to form a modified polymer.

Metal-Alkylidyne Compound

The metal-alkylidyne compound can generally have a structure represented by formula (III):

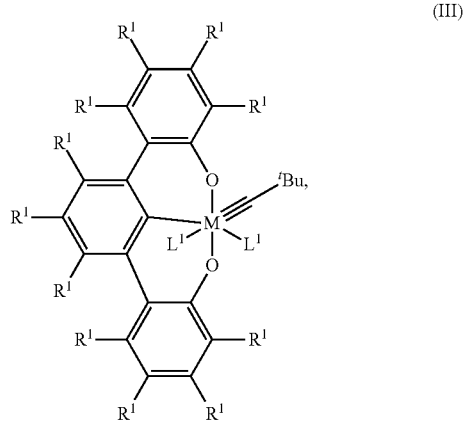

In general, M can be a group 5-7 transition metal. In embodiments, M is selected from Mo and W.

In general, each $R^1$ is independently H, $C_1$-$C_{20}$ alkyl, carboxyl, ester, amino, thiol, halo, $C_1$-$C_{22}$ haloalkyl, OH, or two adjacent $R^1$, together with the carbon atoms to which they are attached, form a five- to eight-member cyclic group. In embodiments, each $R^1$ is independently H or $C_1$-$C_6$ alkyl. In embodiments, each $R^1$ is independently H, $C_1$-$C_{20}$ alkyl, secondary amino, halo, $C_1$-$C_{22}$ haloalkyl, or two adjacent $R^1$, together with the carbon atoms to which they are attached, form a five- to eight-member cyclic group.

Generally, each $L^1$ is independently absent or a neutral ligand. The neutral ligand is not particularly limited. Suitable neutral ligands include, but are not limited to, phosphine, phosphite, phosphinite, phosphonite, ether, thioether, amine, imine, and a five- or six-membered monocyclic group comprising 1 to 4 ring heteroatoms selected from N, S, and O. The five- or six-membered monocyclic groups can include 1 to 4 heteroatoms, 1 to 3 heteroatoms or 1 to 2 heteroatoms, for example, pyridine, pyridazine, pyrimidine, pyrazine, triazine, pyrrole, pyrazole, imidazoletriazole, pyran, pyrone, dioxin, and furan. The five- or six-membered monocyclic groups can be substituted with halo, $C_1$-$C_{20}$ alkyl, $C_1$-$C_{20}$ heteroalkyl, $C_6$-$C_{20}$ aryl, 5-20 membered heteroaryl, and functional groups, including but not limited to, $C_1$-$C_{20}$ alkoxy, $C_1$-$C_{20}$ aryloxy, $C_2$-$C_{20}$ alkylcarbonyl, $C_6$-$C_{20}$ arylcarbonyl, carboxy, carboxylate, carbamoyl, carbamido, formyl, thioformyl, amino, nitro, and nitroso. In embodiments, at least one $L^1$ is tetrahydrofuran (THF). In embodiments, both $L^1$ are THF.

In embodiments, the metal-alkylidyne compound has a structure represented by a formula (1):

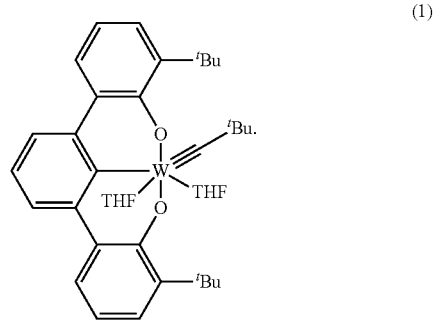

Methods of making metal-alkylidyne compounds having a structure represented by formula (III) are known in the art and described in, for example, U.S. Pat. No. 9,206,266, which is hereby incorporated by reference in its entirety.

Metallacycloalkylene Compound

The metallacycloalkylene can be a metallacyclopropylene compound generally having a structure represented by formula (IV):

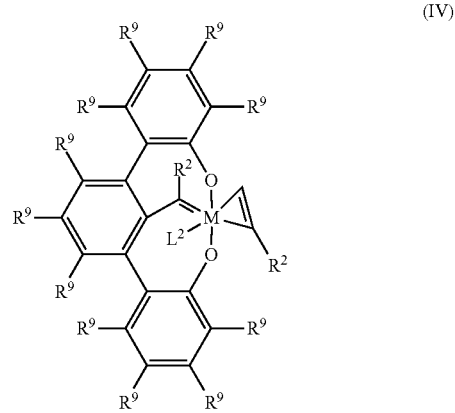

In general, M can be a group 5-7 transition metal. In embodiments, M is selected from Mo and W.

In general, each $R^9$ is independently H, $C_1$-$C_{20}$ alkyl, carboxyl, ester, amino, thiol, halo, $C_1$-$C_{22}$ haloalkyl, OH, or two adjacent $R^9$, together with the carbon atoms to which they are attached, form a five- to eight-member cyclic group. In embodiments, each $R^9$ is independently H, $C_1$-$C_{20}$ alkyl, secondary amino, halo, $C_1$-$C_{22}$ haloalkyl, or two adjacent $R^9$, together with the carbon atoms to which they are attached, form a five- to eight-member cyclic group. In embodiments, each $R^9$ is independently H or $C_1$-$C_6$ alkyl.

Generally, each $R^2$ can be selected from $Ar^1$, $C_1$-$C_{22}$ alkyl, halo, $C_1$-$C_{22}$ haloalkyl, H, —$NH_2$, —N—($C_1$-$C_{22}$ alkyl)$_2$, —NH($C_1$-$C_{22}$ alkyl), —NHAr$^1$, —NAr$^1{}_2$, —O—Ar$^1$, —O—($C_1$-$C_{22}$ alkyl), and ($R^3$)$_3$—Si—. In embodiments, each $R^2$ can be selected from Ar$^1$, $C_1$-$C_{22}$ alkyl, halo, $C_1$-$C_{22}$ haloalkyl, H, —N—(C$_1$-C$_{22}$ alkyl)$_2$, —NAr$^1{}_2$, —O—Ar$^1$, —O—(C$_1$-C$_{22}$ alkyl), and (R$^3$)$_3$—Si—. In embodiments, each R$^2$ is selected from Ar$^1$, C$_1$-C$_6$ alkyl, and (R$^3$)$_3$—Si—. In embodiments, one R$^2$ is Ar$^1$ and one R$^2$ is C$_1$-C$_6$ alkyl. In embodiments, both R$^2$ are Ar$^1$. In embodiments, both R$^2$ are C$_1$-C$_6$ alkyl.

Generally, L$^2$ is absent or a neutral ligand. The neutral ligand is not particularly limited. Suitable neutral ligands include, but are not limited to, phosphine, phosphite, phosphinite, phosphonite, ether, thioether, amine, imine, and a five- or six-membered monocyclic group comprising 1 to 4 ring heteroatoms selected from N, S, and O. The five- or six-membered monocyclic groups can include 1 to 4 heteroatoms, 1 to 3 heteroatoms or 1 to 2 heteroatoms, for example, pyridine, pyridazine, pyrimidine, pyrazine, triazine, pyrrole, pyrazole, imidazoletriazole, pyran, pyrone, dioxin, and furan. The five- or six-membered monocyclic groups can be substituted with halo, C$_1$-C$_{20}$ alkyl, C$_1$-C$_{20}$ heteroalkyl, C$_1$-C$_{20}$ aryl, 5-20 membered heteroaryl, and functional groups, including but not limited to, C$_1$-C$_{20}$ alkoxy, C$_5$-C$_{20}$ aryloxy, C$_2$-C$_{20}$ alkylcarbonyl, C$_6$-C$_{20}$ arylcarbonyl, carboxy, carboxylate, carbamoyl, carbamido, formyl, thioformyl, amino, nitro, and nitroso. In embodiments, L$^2$ is tetrahydrofuran (THF).

In general, Ar$^1$ can be independently an aryl or heteroaryl, wherein the heteroaryl is a 5-12 membered aromatic ring including from 1 to 4 heteroatoms selected from O, N, and S.

Each occurrence of R$^3$ can be independently selected C$_1$-C$_{22}$ alkyl, Ar$^1$, —O—(C$_1$-C$_{22}$ alkyl), —O—Ar$^1$, —NH$_2$, —NH—(C$_1$-C$_{22}$) alkyl, —N—(C$_1$-C$_{22}$)$_2$ alkyl, —NHAr$^1$, or —N—Ar$^1{}_2$. In embodiments, each occurrence of R$^3$ can be independently selected C$_1$-C$_{22}$ alkyl, Ar$^1$, —O—(C$_1$-C$_{22}$ alkyl), —O—Ar$^1$, —N—(C$_1$-C$_{22}$)$_2$ alkyl, or —N—Ar$^1{}_2$.

In embodiments, the metallacycloalkylene the metallacyclopropylene has a structure represented by a formula (2), (3), or (4):

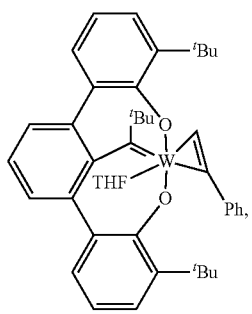

(2)

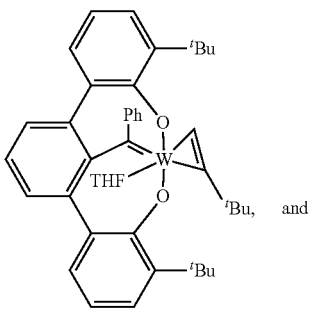

(3)

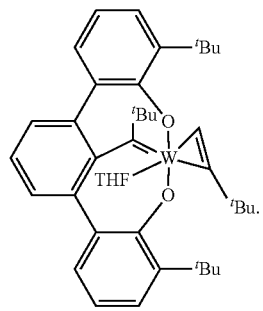

(4)

Methods of making metallacycloalkylene compounds having a structure represented by formula (IV) are known in the art and described in, for example, U.S. Pat. No. 9,206,266, and McGowan et al., "Compelling mechanistic data and identification of the active species in tungsten-catalyzed alkyne polymerizations: conversion of a trianionic pincer into a new tetraanionic pincer-type ligand," *Chemical Science*, vol. 4, no. 3, 1 Jan. 2013 which are hereby incorporated by reference in their entireties.

Metallacyclopentadiene Compound

In general, the metallacyclopentadiene compound has a structure according to formula (V):

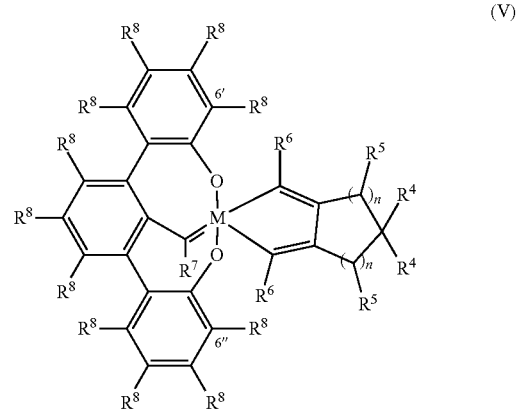

(V)

In general, M is a transition metal. In embodiments, M comprises a group 6 transition metal. In embodiments, M comprises molybdenum (Mo) or tungsten (W). In embodiments, M comprises tungsten (W).

In general, each R$^3$ can be independently H, C$_1$-C$_{20}$ alkyl, carboxyl, ester, amino, thiol, halo, C$_1$-C$_{22}$ haloalkyl, OH, or two adjacent R$^8$, together with the carbon atoms to which they are attached, form a five- to eight-member cyclic group. In embodiments, each R$^8$ can be H or a C$_1$-C$_6$alkyl group. In embodiments, each R$^3$ can be independently H, C$_1$-C$_{20}$ alkyl, secondary amino, halo, C$_1$-C$_{22}$ haloalkyl, or two adjacent R$^8$, together with the carbon atoms to which they are attached, form a five- to eight-member cyclic group. In embodiments, each R$^8$ can be H or a C$_1$-C$_6$alkyl group.

R$^7$ can be selected from Ar$^3$, C$_1$-C$_{22}$ alkyl, halo, C$_1$-C$_{22}$ haloalkyl, H, —NH$_2$, —N—(C$_1$-C$_{22}$ alkyl)$_2$, —NH(C$_1$-C$_{22}$ alkyl), —NHAr$^3$, —NAr$^3{}_2$, —O—Ar$^3$, —O—(C$_1$-C$_{22}$ alkyl), and (R$^{10}$)$_3$—Si—. When R$^7$ is alkyl, haloalkyl, or alkoxy, the alkyl chain can be straight or branched. In embodiments, R$^7$ can be selected from Ar$^3$, C$_1$-C$_{22}$ alkyl, halo, C$_1$-C$_{22}$ haloalkyl, H, —N—(C$_1$-C$_{22}$ alkyl)$_2$, —NAr$^3{}_2$, —O—$Ar^3$, —O—($C_1$-$C_{22}$ alkyl), and $(R^{10})_3$—Si—. When $R^7$ is alkyl, haloalkyl, or alkoxy, the alkyl chain can be straight or branched. The alkyl chain can optionally further be substituted by, for example, $Ar^3$, halo, amino, alkoxy, ether, and $(R^3)_3$—Si—. In embodiments, $R^2$ is tert-butyl. Suitable amino groups for $R^7$ include, but are not limited to, $C_1$-$C_4$ dialkyl amino, wherein each alkyl group can be the same (e.g., dimethyl amino, diethyl amino, dipropyl amino, dibutyl amino), or different (e.g., methylethyl amino, methylpropyl amino, methylbutyl amino, ethylpropyl amino, ethylbutyl amino, and propylbutyl amino).

In general, each $R^4$ can be independently $C_1$-$C_{22}$ alkyl or both $R^4$ together with the carbon atom to which they are attached form a spiro five- to eight-member monocyclic group or a spiro eleven- to thirty-member polycyclic group, for example, cyclopentane, cyclohexane, cycloheptane, cyclooctane, cyclopentene, cyclopentadiene, cyclohexene, cyclohexadiene, cyclohexatriene (benzene), cycloheptene, cycloheptadiene, cycloheptatriene, cyclooctene, cyclooctadiene, cyclooctatriene, and cyclooctatetraene (annulene), fluorenyl, pyrrolyl, furanyl, thiophenyl, imidazolyl, pyrazolyl, oxazolyl, isoxazolyl, thiazolyl, phenyl, pyridinyl, pyrazinyl, pyrimidinyl, pyridazinyl, or triazinyl, benzofuranyl, isobenzofuranyl, indolyl, isoindolyl, benzothiophenyl, bensimidazolyl, purinyl, indazolyl, benzoxazolyl, benzisoxazolyl, benzothiazolyl, maphthalenyl, anthracenyl, quinolinyl, isoquinolinyl, quinoxalinyl, acridinyl, quinazolinyl, cinnolinyl, and phthalazinyl. In embodiments wherein both $R^4$ are linked to form a five- to eight-member cyclic group, one or more of the atoms of the cyclic group can be a heteroatom selected from oxygen, nitrogen, and sulfur. In embodiments, each $R^4$ comprises $C_1$-$C_{22}$ alkyl. In embodiments, at least one $R^4$ is methyl. In embodiments, both $R^4$ are methyl. In embodiments, at least one $R^4$ is t-butyl. In embodiments, both $R^4$ are t-butyl. In embodiments, one $R^4$ is methyl and one $R^4$ is t-butyl.

In general, each $R^5$ can be independently H, $C_1$-$C_{22}$ alkyl, —$NH_2$, —N—($C_1$-$C_{22}$ alkyl)$_2$, —NH($C_1$-$C_{22}$ alkyl), —NHAr$^3$, —NAr$^3_2$, —O—Ar$^3$, —OH, or —O—($C_1$-$C_{22}$ alkyl). In embodiments, each $R^5$ can be independently H, $C_1$-$C_{22}$ alkyl, —N—($C_1$-$C_{22}$ alkyl)$_2$, —NAr$^3_2$, —O—Ar$^3$, or —O—($C_1$-$C_{22}$ alkyl). In embodiments, at least one $R^5$ is hydrogen. In embodiments, each $R^5$ is hydrogen.

In general, each occurrence of n is independently 1, 2, 3, 4, or 5. In embodiments, both n are the same. In refinements of the foregoing embodiment, each n is 1. In embodiments, each n is different. For example, each n can be selected such that one n is 1 and the second n is 2, one n is 1 and the second n is 3, one n is 1 and the second n is 4, one n is 1 and the second n is 5, one n is 2 and the second n is 3, one n is 2 and the second n is 4, one n is 2 and the second n is 5, one n is 3 and the second n is 4, one n is 3 and the second n is 5, or one n is 4 and the second n is 5.

Each $R^6$ can be independently H, $C_1$-$C_3$ alkyl, halide, —$NH_2$, —N—($C_1$-$C_3$ alkyl)$_2$, —NH($C_1$-$C_3$ alkyl), —NHAr$^3$, —NAr$^3_2$, —O—Ar$^3$, —O—($C_1$-$C_3$ alkyl), —S—Ar$^3$, —S—($C_1$-$C_3$ alkyl). In embodiments, at least one $R^6$ is H. In embodiments, each $R^6$ can be independently H, $C_1$-$C_3$ alkyl, halide, —N—($C_1$-$C_3$ alkyl)$_2$, —NAr$^3_2$, —O—Ar$^3$, —O—($C_1$-$C_3$ alkyl), —S—Ar$^3$, —S—($C_1$-$C_3$ alkyl). In embodiments, at least one $R^6$ is H. In embodiments, each $R^6$ is H. In embodiments, at least one $R^6$ is selected from methyl, ethyl, and i-propyl.

Each occurrence of $R^{10}$ is independently selected from $C_1$-$C_{22}$ alkyl, Ar$^3$, —O—($C_1$-$C_{22}$ alkyl), —O—Ar$^3$, —N($C_1$-$C_{22}$ alkyl)$_2$, —NH($C_1$-$C_{22}$ alkyl), —$NH_2$, or —NH—Ar$^3$. In embodiments, each occurrence of $R^{10}$ is independently selected from $C_1$-$C_{22}$ alkyl, Ar$^3$, —O—($C_1$-$C_{22}$ alkyl), —O—Ar$^3$, or —N($C_1$-$C_{22}$ alkyl)$_2$.

Generally, each Ar$^3$ can be independently an aryl or heteroaryl, wherein the heteroaryl is a 5-12 membered aromatic ring comprising from 1 to 4 heteroatoms selected from O, N, and S. In some cases, Ar$^3$ comprises pyrrolyl, furanyl, thiophenyl, imidazolyl, pyrazolyl, oxazolyl, isoxazolyl, thiazolyl, phenyl, pyridinyl, pyrazinyl, pyrimidinyl, pyridazinyl, or triazinyl. Ar$^3$ can also be a fused aryl or heteroaryl group, including, but not limited to, benzofuranyl, isobenzofuranyl, indolyl, isoindolyl, benzothiophenyl, bensimidazolyl, purinyl, indazolyl, benzoxazolyl, benzisoxazolyl, benzothiazolyl, naphthalenyl, anthracenyl, quinolinyl, isoquinolinyl, quinoxalinyl, acridinyl, quinazolinyl, cinnolinyl, and phthalazinyl.

In embodiments, the metallacyclopentadiene compound has a structure represented by a formula (5) or (6):

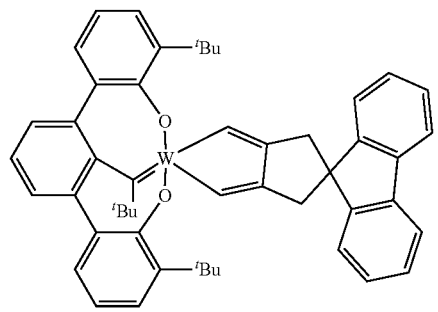

(5)

and

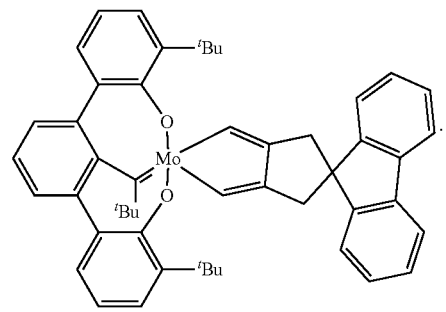

(6)

In general, the metallacyclopentadiene compound having a structure according to formula (V) can be prepared by reacting a compound of formula (VI) and a dialkyne having structure of formula (VII) under conditions sufficient to form the compound having a structure represented by formula (V):

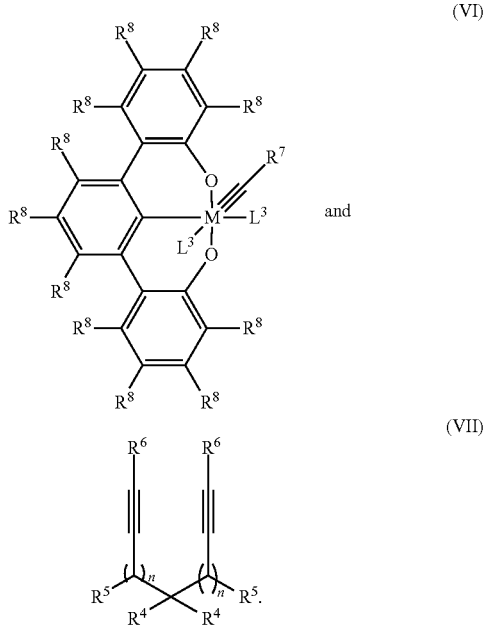

wherein each $R^8$, $R^7$, $R^6$, $R^5$, and $R^4$ are as defined for compounds having a structure according to formula (V). In general, each $L^3$ independently can be absent or selected from phosphine, phosphite, phosphonite, phosphinite, amine, amide, imine, alkoxy, ether, thioether, and a five- or six-membered monocyclic group having 1 to 3 ring heteroatoms. Suitable bidentate ligands include, but are not limited to, bipyridine, ethylenediamine, diaminocyclohexane, acetylacetonate, oxalate, and phenanthroline.

$L^3$ can be absent or a weakly coordinating electron donor ligand, including, but not limited to, phosphine, phosphite, phosphinite, phosphonite, ether, thioether, amine, amide, imine, and five- or six-membered monocyclic groups containing 1 to 3 heteroatoms. The five- or six-membered monocyclic groups can include 1 to 3 heteroatom or 1 to 2 heteroatoms, for example, pyridine, pyridazine, pyrimidine, pyrazine, triazine, pyrrole, pyrazole, imidazoletriazole, pyran, pyrone, dioxin, and furan. The five- or six-membered monocyclic groups can be substituted with halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_2$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, including but not limited to, $C_1$-$C_{20}$ alkoxy, $C_5$-$C_{24}$ aryloxy, $C_2$-$C_{20}$ alkylcarbonyl, $C_6$-$C_{24}$ arylcarbonyl, carboxy, carboxylate, carbamoyl, carbamido, formyl, thioformyl, amino, nitro, and nitroso.

Phosphine and amine ligands can include primary, secondary, and tertiary phosphines and amines. The phosphine and amine ligands can include 0 to 3 alkyl groups, 1 to 3 alkyl groups, or 1 to 2 alkyl groups selected from $C_1$-$C_{20}$ alkyl. The phosphine and amine ligands can also include 0 to 3 aryl or heteroaryl groups, 1 to 3 aryl or heteroaryl groups, or 1 to 2 aryl or heteroaryl groups selected from five- and six-membered aryl or heteroaryl rings.

In embodiments, at least one $L^3$ is absent. In embodiments wherein $L^3$ is absent, the complex of formula (II) is coordinatively unsaturated. In embodiments, at least one $L^3$ is a phosphine. In embodiments, at least one $L^3$ is an amine. In refinements of the foregoing embodiments, at least one $L^3$ is selected from $NH_2$, dimethyl amine and diethyl amine. In embodiments, at least one $L^3$ is an ether. In embodiments at least one $L^3$ is a five- or six-membered monocyclic group having 1 to 3 ring heteroatoms. In refinements of the foregoing embodiment, at least one $L^3$ is selected from tetrahydrofuran, tetrahydrothiophene, pyridine, and tetrahydropyran. In some embodiments, both $L^3$ together comprise a bidentate ligand selected from bipyridine, ethylenediamine, diaminocyclohexane, acetylacetonate, oxalate, and phenanthroline.

In embodiments, the reaction of the complex of formula (VI) and the compound of formula (VII) can occur neat, in cases when the compound of formula (VII) is a liquid. In embodiments, the reaction of the complex of formula (VI) and the compound of formula (VII) can occur in solution. Suitable solvents include nonpolar aprotic solvents, such as, but not limited to, benzene, toluene, hexanes, pentanes, dichloromethane, trichloromethane, chloro-substituted benzenes, deuterated analogs of the foregoing and combinations of the foregoing. As will be understood by one of ordinary skill in the art, polar aprotic solvents may also be suitable provided they do not compete with the dialkyne to coordinate at the metal center. Suitable polar aprotic solvents can include, but are not limited to, diethyl ether, ethyl acetate, acetone, dimethylformamide, dimethoxyethane, tetrahydrofuran, acetonitrile, dimethyl sulfoxide, nitromethane, propylene carbonate, deuterated analogs of the foregoing, and combinations of the foregoing.

The reaction of the complex of formula (VI) and the compound of formula (VII) can occur at any suitable temperature for any suitable time. It is well understood in the art that the rate of a reaction can be controlled by tuning the temperature. Thus, in general, as the reaction temperature increases the reaction time can decrease. Without intending to be bound by theory, it is believed that the electron withdrawing or donating abilities of $R^2$ can affect the rate of addition of the compound of formula (VII) to the complex of formula (VI), for example, under otherwise identical reaction conditions, as the electron donating ability of $R^2$ increases, the rates generally increase, whereas as the electron donating ability of $R^2$ decreases (and electron withdrawing ability increases), the rates generally decrease. Similarly, without intending to be bound by theory, it is believed that the steric bulk of $R^6$ can affect the rate of addition of the compound of formula (VII) to the complex of formula (VI), for example, under otherwise identical reaction conditions, as the steric bulk of $R^6$ can inhibit the approach of the dialkyne to the metal center. Without intending to be bound by theory, it is believed that close proximity of the germinal dialkynes of the dialkyne can promote addition of the dialkyne to the metal complex. Thus, under otherwise identical reaction conditions, it is believed that a symmetric, short chain dialkyne will react with the metal center at a faster rate than an asymmetric and/or long chain dialkyne. Accordingly, reaction temperature and time can be selected to facilitate addition of the dialkyne to the metal complex.

Reaction temperatures can be in a range of about −80° C. to about 100° C., about −70 to about 80° C., about −50° C. to about 75° C., about −25° C. to about 50° C., about 0° C. to about 35° C., about 5° C. to about 30° C., about 10° C. to about 25° C., about 15° C. to about 25° C., or about 20° C. to about 25° C., for example, about 0° C., about 5° C., about 10° C., about 15° C., about 20° C., about 25° C., about 30° C., or about 35° C. Reaction times can be instantaneous or in a range of about 30 seconds to about 72 h, about 1 min to about 72 h, about 5 min to about 72 h, about 10 min to about 48 h, about 15 min to about 24 h, about 20 min to about 12 h, about 25 min to about 6 h, or about 30 min to about 3 h, for example, 30 seconds, 1 min, 5 min, 10 min, 15 min, 20 min, 25 min, 30 min, 35 min, 40 min, 45 min, 50 min, 55 min, 60 min, 75 min, 90 min, 105 min, 2 h, 3 h, 4 h, 5 h, 6 h, 12 h, 18 h, 24 h, 36 h, 48 h, 60 h, or 72 h.

Alkynes

The functionalized cyclic polymer can be prepared from a plurality of alkynes, wherein at least one alkyne comprises a functional group capable of further reacting to form a modified polymer. In some embodiments, the plurality of alkynes comprises the same alkyne. In some embodiments, the plurality of alkynes comprises a mixture of alkynes. In embodiments, the plurality of alkynes does not include any alkyne having an acidic hydrogen. In embodiments, the plurality of alkynes does not include any alkyne comprising a functional group selected from carboxyl, thiol, hydroxyl, primary amine and secondary amine. A primary amine is a nitrogen atom having two hydrogen substituents. A secondary amine is a nitrogen atom having one hydrogen substituent. In embodiments, the plurality of alkynes does not include any alkyne comprising a carbon-oxygen double bond, a carbon-sulfur double bond, a nitrogen-oxygen double bond, a carbon-nitrogen double bond or a carbon-nitrogen triple bond.

The functional group capable of further reacting to form a modified polymer can be a heteroatom, an alkene, or an alkyne. In embodiments, the functional group is a heteroatom. In some embodiments, the functional group comprises a halogen, a hydroxy, an alkoxy, an amine, a silyl, a silyl ether, an aldehyde, a ketone, a ketal, an acetal, a carbamate, a urea, an ester, a carboxyl, a carboxylate, an anhydride, an alkene, an alkyne, a nitrile, a nitro, a thiol, a thioether, a sulfone, a sulfoxide, or a sulfonamide. In embodiments, the functional group comprises a halogen, an alkoxy, a tertiary amine, a silyl, a silyl ether, an ester, an alkene, an alkyne, a thioether. A tertiary amine is a nitrogen atom having no hydrogen substituents. In embodiments, the functional group comprises halogen, a hydroxy, an alkoxy, an amine, a carbamate, an ester, a carboxyl, a carboxylate, an anhydride, an alkene, an alkyne, a thiol, a sulfone, a sulfoxide, or a sulfonamide. In embodiments, the functional group comprises a halogen, a hydroxy, an alkoxy, an ester, a carboxyl, a carboxylate, an amine, an alkene, or an alkyne. In embodiments, the functional group comprises a halogen, an alkoxy, an ester, an alkene, or an alkyne. In embodiments, the functional group comprises an alkene or an alkyne. In embodiments, the functional group comprises an alkene. In embodiments, the functional group comprises an alkyne.

In embodiments wherein the functional group comprises a heteroatom, the heteroatom can be selected from the group consisting of nitrogen (N), oxygen (O), sulfur (S), tin (Sn), boron (B), phosphorus (P), silicon (Si), chlorine (Cl), bromine (Br), iodine (I), fluorine (F), lithium (Li), magnesium (Mg), and combinations thereof.

In embodiments, the plurality of alkynes comprises at least one alkyne selected from the group consisting of propargyl bromide, propargyl chloride, propargyl amine, propargyl alcohol, 3-bromo-1-butyne, 4-bromo-1-butyne, 4-chloro-2-butyn-1-ol, 2-butyn-1-ol, 3-butyn-1-ol, 3-butyn-2-ol, methyl propargyl ether, 2-butyne-1,4-diol, 1-amino-3-butyne, N-propargylamine, 5-iodo-1-pentyne, 1-pentyn-3-ol, 2-methyl-3-butyn-2-ol, 2-pentyn-1-ol, 3-pentyn-1-ol, 3-pentyn-2-ol, 4-pentyn-1-ol, 4-pentyn-2-ol, 2-methyl-3-butyn-2-amine, 3-dimethylamino-1-propyne, 4-pentyn-1-amine, ethynyltrimethylsilane, propargyl ether, 2,4-hexadiyne-1,6-diol, dipropargylamine, 3-(allyloxy)-1-propyne, 3-methyl-1-penten-4-yn-3-ol, 5-hexen-2-yn-1-ol, 1-iodo-1-hexyne, 6-iodo-1-hexyne, 1-hexyn-3-ol, 2-hexyn-1-ol, 3-hexyn-1-ol, 3-hexyn-2-ol, 3-methyl-1-pentyn-3-ol, 5-hexyn-1-ol, 5-hexyn-3-ol, 1,4-dimethoxy-2-butyne, 3-bromo-1-(trimethylsilyl)-1-propyne, 3-(trimethylsilyl) propargyl alcohol, 3-trimethylsiloxy-1-propyne, 1-(trimethylsilyl)propyne, trimethyl(propargyl)silane, 1-ethynylcyclopentanol, 6-hepten-3-yn-1-ol, 1-heptyn-1-ol, 5-methyl-1-hexyn-1-ol, 4-(trimethylsilyl)-3-butyn-2-one, 3,3-diethoxy-1-propyne, 3-(trimethylsilyloxy)-1-butyne, 4-(trimethylsilyl)-3-butyn-2-ol, 3,4-dichlorophenylacetylene, 3,4-difluorophenylacetylene, (bromoethynyl)benzene, (chloroethynyl)benzene, (iodoethynyl)benzene, 1-ethynyl-4-nitrobenzene, 3-hydroxyphenylacetylene, 2-ethynylaniline, 3-ethynylaniline, 4-ethynylaniline, 2-methyl-6-hepten-3yn-2-ol, 1-ethynylcyclohexylamine, 1-oxctyn-3-ol, 2-octyn-1-ol, 3,5-dimethyl-1-hexyn-3-ol, 3-octyn-1-ol, 4-methyl-1-heptyn-3-ol, [(1,1-dimethyl-2-propynyl)oxy] trimethylsilane, 5-(trimethylsilyl)-4-pentyn-1-ol, (tert-butyldimethylsilyl)acetylene, (triethylsilyl)acetylene, 1-(trimethylsilyl)-1-pentyne, 1-dimethylamino-3-(trimethylsilyl)-2-propyne, bis(trimethylsilyl)acetylene, 4-(trifluoromethoxy)phenylacetylene, 3-phenyl-2-propynenitrile, 1-phenyl-2-propyn-1-one, 3-ethynylbenzaldehyde, (3-bromo-1-propynyl)benzene, 2-ethynyltoluene, 3-ethynyltoluene, 1-phenyl-2-propyn-1-ol, 2-ethynylanisole, 2-ethynylbenzyl alcohol, 3-ethynylanisole, 3-phenyl-2-propyn-1-ol, 4-ethynylanisole, 4-ethynylbenzyl alcohol, phenyl propargyl ether, tripropargylamine, N-tert-butyl-1,1-dimethylpropargylamine, tert-butyldimethyl(2-propynyloxy)silane, 1-trimethylsilyl-1-hexyne, 2-(2-fluorophenyl)-3-butyn-2-ol, 2-(3-fluorophenyl)-3-butyn-2-ol, 1-ethynyl-4-methoxy-2-methylbenzene, 2-phenyl-3-butyn-2-ol, 4-phenyl-3-butyn-2-ol, 1-ethynyl-3,5-dimethoxybenzene, 4-ethynyl-N,N-dimethylaniline, (dimethylphenylsilyl) acetylene, 2-decyn-1-ol, 3-decyn-1-ol, 5-decyn-1-ol, 1,4-bis (trimethylsilyl)butadiyne, N-tert-amyl-1,1-dimethylpropargylamine, 2-tert-butyldimethylsiloxybut-3-yne, 4-(tert-butyldimethylsilyloxy)-1-butyne, N-propargylphthalimide, 3-(2-phenylethynyl)-2-oxazolidinone, 1-phenyl-1-pentyn-3-ol, 1-methyl-2-propynyl p-toluene sulfonate, N-methyl-N-propargylbenzylamine, 1-phenyl-2-trimethylsilylacetylene, 2-[(trimethylsilyl)ethynyl]aniline, 4-[(trimethylsilyl)ethynyl]aniline, 3-(1-octyne-1-yl)-2-oxazolidinone, 10-undecyn-1-ol, 9-yndecyn-1-ol, 1-chloro-5-triethylsilyl-1-pentyne, [(triisopropylsilyl)acetylene]sulfur pentafluoride, (triisopropylsilyl)acetylene, 1-(2-phenylethynyl)-2-pyrrolidinone, 3-[(trimethylsilyl)ethynyl]benzonitrile, 1-phenyl-1-hexyn-3-ol, 1-phenyl-4-methyl-1-pentyn-3-ol, 3-(trimethylsilyl)ethynylbenzaldehyde, (3-methoxyphenylethynyl) trimethylsilane, (4-methoxyphenylethynyl)trimethylsilane, 1-phenyl-3-(trimethylsilyl)-2-propyn-1-ol, 4-(trimethylsilylethynyl)benzyl alcohol, 2-[(trimethylsilyl)ethynyl]toluene, 1-(triisopropylsilyl)-1-propyne, 2-ethynyl-6-methoxynaphthalene, 3-(1-naphthyl)-2-propyn-1-ol, 1-[(trimethylsilyl) ethynyl]-3,5-dimethoxybenzene, TMS-N-ethynyl-N,4-dimethylbenzenesulfonamide, 1-ethynyl-4-phenoxybenzene, 1,1-dipheny-2-propyn-1-ol, 1,3-diphenyl-2-propyn-1-ol, (methyldiphenylsilyl)acetylene, 1-(1-naphthyl)-2-(trimethylsilyl)acetylene, 1,4-diphenyl-2-butyne-1,4-dione, (6-methoxynaphthalen-2-ylethynyl)trimethylsilane, 1,4-bis [(trimethylsilyl)ethynyl]benzene, 4-phenyl-3-(2-phenylethynyl)oxazolidin-2-one, 1,4-bis(trifluoromethyl)-1,4-diphenyl-2-butyn-1,4-diol, 1,6-diphenoxy-2,4,-hexadiyne, (triphenylsilyl)acetylene, 1,1,3-triphenylpropargyl alcohol, 4-methyl-N-(2-phenylethynyl)-N-(phenylmethyl)-benzenesulfonamide, [1,4-phenylenebis(2,1-ethynediyl-4,1-phenylene)]bis(thioacetate), 1-ethynyl-4-(trifluoromethyl)benzene, 4-ethynyl-N,N-dimethylaniline, 2-(ethynyloxy)-2-methoxypropane, and N,N-dimethylethynamine.

In embodiments, the plurality of alkynes comprises at least one alkyne selected from the group consisting of propargyl bromide, propargyl chloride, 3-bromo-1-butyne, 4-bromo-1-butyne, methyl propargyl ether, 5-iodo-1-pentyne, 3-dimethylamino-1-propyne, ethynyltrimethylsilane, propargyl ether, 3-(allyloxy)-1-propyne,1-iodo-1-hexyne, 6-iodo-1-hexyne, 1,4-dimethoxy-2-butyne, 3-bromo-1-(trimethylsilyl)-1-propyne, 3-trimethylsiloxy-1-propyne, 1-(trimethylsilyl)propyne, trimethyl(propargyl)silane, 3,3-diethoxy-1-propyne, 3-(trimethylsilyloxy)-1-butyne, 3,4-dichlorophenylacetylene, 3,4-difluorophenylacetylene, (bromoethynyl)benzene, (chloroethynyl)benzene, (iodoethynyl)benzene, [(1,1-dimethyl-2-propynyl)oxy]trimethylsilane, (tert-butyldimethylsilyl)acetylene, (triethylsilyl)acetylene, 1-(trimethylsilyl)-1-pentyne, 1-dimethylamino-3-(trimethylsilyl)-2-propyne, bis(trimethylsilyl)acetylene, 4-(trifluoromethoxy)phenylacetylene, (3-bromo-1-propynyl)benzene, 2-ethynyltoluene, 3-ethynyltoluene, 2-ethynylanisole, 3-ethynylanisole, 4-ethynylanisole, phenyl propargyl ether, tripropargylamine, tert-butyldimethyl(2-propynyloxy)silane, 1-trimethylsilyl-1-hexyne, 1-ethynyl-4-methoxy-2-methylbenzene, 1-ethynyl-3,5-dimethoxybenzene, 4-ethynyl-N,N-dimethylaniline, (dimethylphenylsilyl)acetylene, 1,4-bis(trimethylsilyl)butadiyne, 2-tert-butyldimethylsiloxybut-3-yne, 4-(tert-butyldimethylsilyloxy)-1-butyne, N-methyl-N-propargylbenzylamine, 1-phenyl-2-trimethylsilylacetylene, 1-chloro-5-triethylsilyl-1-pentyne, [(triisopropylsilyl)acetylene]sulfur pentafluoride, (triisopropylsilyl)acetylene, (3-methoxyphenylethynyl)trimethylsilane, (4-methoxyphenylethynyl)trimethylsilane, 2-[(trimethylsilyl)ethynyl]toluene, 1-(triisopropylsilyl)-1-propyne, 2-ethynyl-6-methoxynaphthalene, 1-[(trimethylsilyl)ethynyl]-3,5-dimethoxybenzene, 1-ethynyl-4-phenoxybenzene, (methyldiphenylsilyl)acetylene, 1-(1-naphthyl)-2-(trimethylsilyl)acetylene, (6-methoxynaphthalen-2-ylethynyl)trimethylsilane, 1,4-bis[(trimethylsilyl)ethynyl]benzene, 1,6-diphenoxy-2,4,-hexadiyne, (triphenylsilyl)acetylene, 1-ethynyl-4-(trifluoromethyl)benzene, 4-ethynyl-N,N-dimethylaniline, 2-(ethynyloxy)-2-methoxypropane, and N,N-dimethylethynamine.

In embodiments, the plurality of alkynes comprises at least one alkyne selected from the group consisting of propargyl bromide, propargyl chloride3-bromo-1-butyne, 4-bromo-1-butyne, 4-chloro-2-butyn-1-ol, 5-iodo-1-pentyne, 1-iodo-1-hexyne, 6-iodo-1-hexyne, 3,4-dichlorophenylacetylene, 3,4-difluorophenylacetylene, (bromoethynyl)benzene, (chloroethynyl)benzene, (iodoethynyl)benzene, (3-bromo-1-propynyl)benzene, 1-chloro-5-triethylsilyl-1-pentyne, and 1,4-bis(trifluoromethyl)-1,4-diphenyl-2-butyn-1,4-diol. In embodiments, the plurality of alkynes comprises at least one alkyne selected from the group consisting of propargyl bromide, propargyl chloride3-bromo-1-butyne, 4-bromo-1-butyne, 5-iodo-1-pentyne, 1-iodo-1-hexyne, 6-iodo-1-hexyne, 3,4-dichlorophenylacetylene, 3,4-difluorophenylacetylene, (bromoethynyl)benzene, (chloroethynyl)benzene, (iodoethynyl)benzene, (3-bromo-1-propynyl)benzene, and 1-chloro-5-triethylsilyl-1-pentyne.

In some embodiments, the plurality of alkynes comprises at least one alkyne selected from the group consisting of propargyl amine, 1-amino-3-butyne, N-propargylamine, 2-methyl-3-butyn-2-amine, 3-dimethylamino-1-propyne, 4-pentyn-1-amine, dipropargylamine, 1-ethynyl-4-nitrobenzene, 2-ethynylaniline, 3-ethynylaniline, 4-ethynylaniline, 1-ethynylcyclohexylamine, 1-dimethylamino-3-(trimethylsilyl)-2-propyne, 3-phenyl-2-propynenitrile, tripropargylamine, N-tert-butyl-1,1-dimethylpropargylamine, 4-ethynyl-N,N-dimethylaniline, N-tert-amyl-1,1-dimethylpropargylamine, N-propargylphthalimide, N-methyl-N-propargylbenzylamine, 2-[(trimethylsilyl)ethynyl]aniline, 4-[(trimethylsilyl)ethynyl]aniline, TMS-N-ethynyl-N,4-dimethylbenzenesulfonamide, 4-methyl-N-(2-phenylethynyl)-N-(phenylmethyl)-benzenesulfonamide, 4-ethynyl-N,N-dimethylaniline, and N,N-dimethylethynamine. In some embodiments, the plurality of alkynes does not comprises any alkyne selected from the group consisting of propargyl amine, 1-amino-3-butyne, N-propargylamine, 2-methyl-3-butyn-2-amine, 4-pentyn-1-amine, dipropargylamine, 1-ethynyl-4-nitrobenzene, 2-ethynylaniline, 3-ethynylaniline, 4-ethynylaniline, 1-ethynylcyclohexylamine, 3-phenyl-2-propynenitrile, N-tert-butyl-1,1-dimethylpropargylamine, N-tert-amyl-1,1-dimethylpropargylamine, N-propargylphthalimide, 2-[(trimethylsilyl)ethynyl]aniline, 4-[(trimethylsilyl)ethynyl]aniline, TMS-N-ethynyl-N,4-dimethylbenzenesulfonamide, and 4-methyl-N-(2-phenylethynyl)-N-(phenylmethyl)-benzenesulfonamide. In some embodiments, the plurality of alkynes comprises an alkyne selected from the group consisting of 3-dimethylamino-1-propyne, 1-dimethylamino-3-(trimethylsilyl)-2-propyne, tripropargylamine, 4-ethynyl-N,N-dimethylaniline, N-methyl-N-propargylbenzylamine, 4-ethynyl-N,N-dimethylaniline, and N,N-dimethylethynamine.

In some embodiments, the plurality of alkynes comprises at least one alkyne selected from the group consisting of propargyl alcohol, 4-chloro-2-butyn-1-ol, 2-butyn-1-ol, 3-butyn-1-ol, 3-butyn-2-ol, methyl propargyl ether, 2-butyne-1,4-diol, 1-pentyn-3-ol, 2-methyl-3-butyn-2-ol, 2-pentyn-1-ol, 3-pentyn-1-ol, 3-pentyn-2-ol, 4-pentyn-1-ol, 4-pentyn-2-ol, propargyl ether, 2,4-hexadiyne-1,6-diol, 3-(allyloxy)-1-propyne, 3-methyl-1-penten-4-yn-3-ol, 5-hexen-2-yn-1-ol, 1-hexyn-3-ol, 2-hexyn-1-ol, 3-hexyn-1-ol, 3-hexyn-2-ol, 3-methyl-1-pentyn-3-ol, 5-hexyn-1-ol, 5-hexyn-3-ol, 3-(trimethylsilyl)propargyl alcohol, 1-ethynylcyclopentanol, 6-hepten-3-yn-1-ol, 1-heptyn-1-ol, 5-methyl-1-hexyn-1-ol, 4-(trimethylsilyl)-3-butyn-2-one, 3,3-diethoxy-1-propyne, 3-(trimethylsilyloxy)-1-butyne, 4-(trimethylsilyl)-3-butyn-2-ol, 2-methyl-6-hepten-3yn-2-ol, 1-oxctyn-3-ol, 2-octyn-1-ol, 3,5-dimethyl-1-hexyn-3-ol, 3-octyn-1-ol, 4-methyl-1-heptyn-3-ol, 5-(trimethylsilyl)-4-pentyn-1-ol, 4-(trifluoromethoxy)phenylacetylene, 1-phenyl-2-propyn-1-one, 3-ethynylbenzaldehyde, 1-phenyl-2-propyn-1-ol, 2-ethynylanisole, 2-ethynylbenzyl alcohol, 3-ethynylanisole, 3-phenyl-2-propyn-1-ol, 4-ethynylanisole, 4-ethynylbenzyl alcohol, phenyl propargyl ether, tert-butyldimethyl(2-propynyloxy)silane, 2-(2-fluorophenyl)-3-butyn-2-ol, 2-(3-fluorophenyl)-3-butyn-2-ol, 1-ethynyl-4-methoxy-2-methylbenzene, 2-phenyl-3-butyn-2-ol, 4-phenyl-3-butyn-2-ol, 1-ethynyl-3,5-dimethoxybenzene, 2-decyn-1-ol, 3-decyn-1-ol, 5-decyn-1-ol, 3-(2-phenylethynyl)-2-oxazolidinone, 1-phenyl-1-pentyn-3-ol, 3-(1-octyne-1-yl)-2-oxazolidinone, 10-undecyn-1-ol, 9-yndecyn-1-ol, 1-phenyl-1-hexyn-3-ol, 1-phenyl-4-methyl-1-pentyn-3-ol, (3-methoxyphenylethynyl)trimethylsilane, (4-methoxyphenylethynyl)trimethylsilane, 1-phenyl-3-(trimethylsilyl)-2-propyn-1-ol, 4-(trimethylsilylethynyl)benzyl alcohol, 2-ethynyl-6-methoxynaphthalene, 3-(1-naphthyl)-2-propyn-1-ol, 1-[(trimethylsilyl)ethynyl]-3,5-dimethoxybenzene, 1-ethynyl-4-phenoxybenzene, 1,1-dipheny-2-propyn-1-ol, 1,3-diphenyl-2-propyn-1-ol, 1,4-diphenyl-2-butyne-1,4-dione, 4-phenyl-3-(2-phenylethynyl)oxazolidin-2-one, 1,4-bis (trifluoromethyl)-1,4-diphenyl-2-butyn-1,4-diol, 1,6-diphenoxy-2,4,-hexadiyne, 1,1,3-triphenylpropargyl alcohol, [1,4-phenylenebis(2,1-ethynediyl-4,1-phenylene)]bis(thioacetate), and 2-(ethynyloxy)-2-methoxypropane. In some embodiments, the plurality of alkynes does not comprises any alkyne selected from the group consisting of propargyl alcohol, 4-chloro-2-butyn-1-ol, 2-butyn-1-ol, 3-butyn-1-ol, 3-butyn-2-ol, 2-butyne-1,4-diol, 1-pentyn-3-ol, 2-methyl-3-butyn-2-ol, 2-pentyn-1-ol, 3-pentyn-1-ol, 3-pentyn-2-ol, 4-pentyn-1-ol, 4-pentyn-2-ol, propargyl ether, 2,4-hexadiyne-1,6-diol, 3-methyl-1-penten-4-yn-3-ol, 5-hexen-2-yn-1-ol, 1-hexyn-3-ol, 2-hexyn-1-ol, 3-hexyn-1-ol, 3-hexyn-2-ol, 3-methyl-1-pentyn-3-ol, 5-hexyn-1-ol, 5-hexyn-3-ol, 3-(trimethylsilyl)propargyl alcohol, 1-ethynylcyclopentanol, 6-hepten-3-yn-1-ol, 1-heptyn-1-ol, 5-methyl-1-hexyn-1-ol, 4-(trimethylsilyl)-3-butyn-2-one, 4-(trimethylsilyl)-3-butyn-2-ol, 2-methyl-6-hepten-3yn-2-ol, 1-oxctyn-3-ol, 2-octyn-1-ol, 3,5-dimethyl-1-hexyn-3-ol, 3-octyn-1-ol, 4-methyl-1-heptyn-3-ol, 5-(trimethylsilyl)-4-pentyn-1-ol, 1-phenyl-2-propyn-1-one, 3-ethynylbenzaldehyde, 1-phenyl-2-propyn-1-ol, 2-ethynylbenzyl alcohol, 3-phenyl-2-propyn-1-ol, 4-ethynylbenzyl alcohol, 2-(2-fluorophenyl)-3-butyn-2-ol, 2-(3-fluorophenyl)-3-butyn-2-ol, 2-phenyl-3-butyn-2-ol, 4-phenyl-3-butyn-2-ol, 2-decyn-1-ol, 3-decyn-1-ol, 5-decyn-1-ol, 3-(2-phenylethynyl)-2-oxazolidinone, 1-phenyl-1-pentyn-3-ol, 3-(1-octyne-1-yl)-2-oxazolidinone, 10-undecyn-1-ol, 9-yndecyn-1-ol, 1-phenyl-1-hexyn-3-ol, 1-phenyl-4-methyl-1-pentyn-3-ol, 1-phenyl-3-(trimethylsilyl)-2-propyn-1-ol, 4-(trimethylsilylethynyl)benzyl alcohol, 3-(1-naphthyl)-2-propyn-1-ol, 1,1-diphenyl-2-propyn-1-ol, 1,3-diphenyl-2-propyn-1-ol, 1,4-diphenyl-2-butyne-1,4-dione, 4-phenyl-3-(2-phenylethynyl)oxazolidin-2-one, 1,4-bis(trifluoromethyl)-1,4-diphenyl-2-butyn-1,4-diol, 1,1,3-triphenylpropargyl alcohol, and [1,4-phenylenebis(2,1-ethynediyl-4,1-phenylene)]bis(thioacetate). In some embodiments, the plurality of alkynes comprises an alkyne selected from the group consisting of methyl propargyl ether, 3-(allyloxy)-1-propyne, 3,3-diethoxy-1-propyne, 3-(trimethylsilyloxy)-1-butyne, 4-(trifluoromethoxy)phenylacetylene, 2-ethynylanisole, 3-ethynylanisole, 4-ethynylanisole, phenyl propargyl ether, tert-butyldimethyl(2-propynyloxy)silane, 1-ethynyl-4-methoxy-2-methylbenzene, 1-ethynyl-3,5-dimethoxybenzene, (3-methoxyphenylethynyl)trimethylsilane, (4-methoxyphenylethynyl)trimethylsilane, 2-ethynyl-6-methoxynaphthalene, 1-[(trimethylsilyl)ethynyl]-3,5-dimethoxybenzene, 1-ethynyl-4-phenoxybenzene, 1,6-diphenoxy-2,4,-hexadiyne, and 2-(ethynyloxy)-2-methoxypropane.

In some embodiments, the plurality of alkynes comprises at least one alkyne selected from the group consisting of ethynyltrimethylsilane, 3-bromo-1-(trimethylsilyl)-1-propyne, 3-(trimethylsilyl)propargyl alcohol, 3-trimethylsiloxy-1-propyne, 1-(trimethylsilyl)propyne, trimethyl(propargyl)silane, 4-(trimethylsilyl)-3-butyn-2-one, 3-(trimethylsilyloxy)-1-butyne, 4-(trimethylsilyl)-3-butyn-2-ol, [(1,1-dimethyl-2-propynyl)oxy]trimethylsilane, 5-(trimethylsilyl)-4-pentyn-1-ol, (tert-butyldimethylsilyl)acetylene, (triethylsilyl)acetylene, 1-(trimethylsilyl)-1-pentyne, 1-dimethylamino-3-(trimethylsilyl)-2-propyne, bis(trimethylsilyl)acetylene, tert-butyldimethyl(2-propynyloxy)silane, (dimethylphenylsilyl)acetylene, 1,4-bis(trimethylsilyl)butadiyne, 2-tert-butyldimethylsiloxybut-3-yne, 4-(tert-butyldimethylsilyloxy)-1-butyne, 1-phenyl-2-trimethylsilylacetylene, 2-[(trimethylsilyl)ethynyl]aniline, 4-[(trimethylsilyl)ethynyl]aniline, [(triisopropylsilyl)acetylene]sulfur pentafluoride, (triisopropylsilyl)acetylene, 3-[(trimethylsilyl)ethynyl]benzonitrile, 3-(trimethylsilyl)ethynylbenzaldehyde, (3-methoxyphenylethynyl)trimethylsilane, (4-methoxyphenylethynyl)trimethylsilane, 1-phenyl-3-(trimethylsilyl)-2-propyn-1-ol, 4-(trimethylsilylethynyl)benzyl alcohol, 2-[(trimethylsilyl)ethynyl]toluene, 1-(triisopropylsilyl)-1-propyne, 1-[(trimethylsilyl)ethynyl]-3,5-dimethoxybenzene, (methyldiphenylsilyl)acetylene, 1-(1-naphthyl)-2-(trimethylsilyl)acetylene, (6-methoxynaphthalen-2-ylethynyl)trimethylsilane, 1,4-bis[(trimethylsilyl)ethynyl]benzene, and (triphenylsilyl)acetylene. In some embodiments, the plurality of alkynes comprises at least one alkyne selected from the group consisting of ethynyltrimethylsilane, 3-bromo-1-(trimethylsilyl)-1-propyne, 3-trimethylsiloxy-1-propyne, 1-(trimethylsilyl)propyne, trimethyl(propargyl)silane, 3-(trimethylsilyloxy)-1-butyne, (tert-butyldimethylsilyl)acetylene, (triethylsilyl)acetylene, 1-(trimethylsilyl)-1-pentyne, 1-dimethylamino-3-(trimethylsilyl)-2-propyne, bis(trimethylsilyl)acetylene, (dimethylphenylsilyl)acetylene, 1,4-bis(trimethylsilyl)butadiyne, 2-tert-butyldimethylsiloxybut-3-yne, 4-(tert-butyldimethylsilyloxy)-1-butyne, 1-phenyl-2-trimethylsilylacetylene, [(triisopropylsilyl)acetylene]sulfur pentafluoride, (triisopropylsilyl)acetylene, (3-methoxyphenylethynyl)trimethylsilane, (4-methoxyphenylethynyl)trimethylsilane, 2-[(trimethylsilyl)ethynyl]toluene, 1-(triisopropylsilyl)-1-propyne, 1-[(trimethylsilyl)ethynyl]-3,5-dimethoxybenzene, (methyldiphenylsilyl)acetylene, 1-(1-naphthyl)-2-(trimethylsilyl)acetylene, (6-methoxynaphthalen-2-ylethynyl)trimethylsilane, 1,4-bis[(trimethylsilyl)ethynyl]benzene, and (triphenylsilyl)acetylene.

In embodiments, the plurality of alkynes comprise alkynes having a structure according to formula (I):

$$R \equiv R^a - X \qquad (I).$$

In general, R is selected from H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_8$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-OH, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O—aryl, $C_0$-$C_6$alkylene-O— heteroaryl wherein the heteroaryl is a 5-12 membered aromatic ring comprising 1 to 4 heteroatoms selected from O, N, and S, and $C_0$-$C_6$alkylene-$NR^b_2$.

In embodiments, R is selected from H, halo, $C_1$-$C_{20}$alkyl, $C_0$-$C_6$alkylene-$C_5$-$C_{20}$cycloalkyl, $C_1$-$C_{20}$heteroalkyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl wherein the heteroaryl is a 5-12 membered aromatic ring comprising 1 to 4 heteroatoms selected from O, N, and S, and $C_0$-$C_6$alkylene-$NR^b_2$.

In embodiments, R is selected from H, halo, $C_1$-$C_{20}$alkyl, $C_5$-$C_{20}$cycloalkyl, $C_1$-$C_{20}$heteroalkyl comprising 1 to 5 heteroatoms selected from O, N, and S, 5-20 membered heterocycloalkyl comprising 1 to 4 ring heteroatoms selected from O, N, and S, aryl, heteroaryl, wherein the heteroaryl is a 5-12 membered aromatic ring comprising 1 to 4 ring heteroatoms selected from O, N, and S, —O—$C_1$-$C_{20}$alkyl, —O—$C_5$-$C_{20}$cycloalkyl, —O-5-20 membered heterocycloalkyl comprising 1 to 4 ring heteroatoms selected from O, N, and S, —O-aryl, —O— heteroaryl wherein the heteroaryl is a 5-12 membered aromatic ring comprising 1 to 4 heteroatoms selected from O, N, and S, and $NR^b_2$. In embodiments R is selected from H, $C_1$-$C_6$alkyl, $C_1$-$C_6$ heteroalkyl, aryl, heteroaryl wherein the heteroaryl is a 5-12 membered aromatic ring comprising 1 to 4 ring heteroatoms, —O—$C_1$-$C_6$alkyl, —O—$C_1$-$C_6$heteroalkyl, —O-aryl, and —O-heteroaryl wherein the heteroaryl is a 5-12 membered aromatic ring comprising 1 to 4 heteroatoms. In embodiments, R is selected from H, $C_1$-$C_6$alkyl, $C_1$-$C_6$ heteroalkyl, aryl, heteroaryl wherein the heteroaryl is a 5-12 membered aromatic ring comprising 1 to 4 ring heteroatoms. In embodiments, R is H. In embodiments, R is $C_1$-$C_6$alkyl.

In general, $R^a$ can be selected from a bond, $(O)_{0-1}C_1$-$C_{20}$alkylene, $(O)_{0-1}C_2$-$C_{20}$alkenylene, $(O)_{0-1}C_2$-$C_{20}$alkynylene, $(O)_{0-1}C_0$-$C_6$alkylene-$C_5$-$C_{20}$cycloalkylene, $(O)_{0-1}C_0$-$C_6$alkylene-$C_5$-$C_{20}$cycloalkenylene, $(O)_{0-1}C_0$-$C_6$alkylene-$C_3$-$C_{20}$cycloalkynylene, $(O)_{0-1}C_1$-$C_{20}$heteroalkylene comprising 1 to 5 heteroatoms selected from O, N, and S, $(O)_{0-1}C_2$-$C_{20}$heteroalkenylene comprising 1 to 5 heteroatoms selected from O, N, and S, $(O)_{0-1}C_0$-$C_6$alkylene-5-20 membered heterocycloalkylene comprising 1 to 4 ring heteroatoms selected from O, N, and S, $(O)_{0-1}C_0$-$C_6$alkylene-5-20 membered heterocycloalkenylene comprising 1 to 4 ring heteroatoms selected from O, N, and S, $(O)_{0-1}C_0$-$C_6$alkylene-arylene, $(O)_{0-1}C_0$-$C_6$alkylene-heteroarylene, wherein the heteroarylene is a 5-12 membered aromatic ring comprising 1 to 4 ring heteroatoms selected from O, N, and S, and $C_0$-$C_6$alkylene-$NR^b$—.

In embodiments, $R^a$ can be selected from a bond, $(O)_{0-1}C_1$-$C_{20}$alkylene, $(O)_{0-1}C_0$-$C_6$alkylene-$C_5$-$C_{20}$cycloalkylene, $(O)_{0-1}C_1$-$C_{20}$heteroalkylene comprising 1 to 5 heteroatoms selected from O, N, and S, $(O)_{0-1}C_0$-$C_6$alkylene-5-20 membered heterocycloalkylene comprising 1 to 4 ring heteroatoms selected from O, N, and S, $(O)_{0-1}C_0$-$C_6$alkylene-arylene, $(O)_{0-1}C_0$-$C_6$alkylene-heteroarylene, wherein the heteroarylene is a 5-12 membered aromatic ring comprising 1 to 4 ring heteroatoms selected from O, N, and S, and $C_0$-$C_6$alkylene-$NR^b$—.

In embodiments, $R^a$ can be selected from a bond, $(O)_{0-1}C_1$-$C_6$alkylene, $(O)_{0-1}C_5$-$C_{20}$cycloalkylene, $(O)_{0-1}C_1$-$C_6$heteroalkylene comprising 1 to 5 heteroatoms selected from O, N, and S, $(O)_{0-1}$5-20 membered heterocycloalkylene comprising 1 to 4 ring heteroatoms selected from O, N, and S, $(O)_{0-1}$arylene, $(O)_{0-1}$heteroarylene, wherein the heteroarylene is a 5-12 membered aromatic ring comprising 1 to 4 ring heteroatoms selected from O, N, and S, and —$NR^b$—. In embodiments, $R^a$ can be selected from a bond, $C_1$-$C_6$alkylene, $C_1$-$C_6$heteroalkylene, arylene, heteroarylene wherein the heteroarylene is a 5-12 membered aromatic ring comprising 1 to 4 heteroatoms selected from O, N, and S, and —$NR^b$—. In embodiments, $R^a$ is a bond. In embodiments, $R^a$ is a $C_1$-$C_6$alkyl. In embodiments, $R^a$ is aryl. In embodiments, $R^a$ is heteroaryl. In embodiments, $R^a$ is —$NR^b$—.

In general, each $R^b$ can be independently selected from H, $C_1$-$C_{20}$alkyl, $SO_2C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $SO_2C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-OH, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O-heteroaryl, wherein the heteroaryl is a 5-12 membered aromatic ring comprising 1 to 4 heteroatoms selected from O, N, and S.

In embodiments, each $R^b$ can be independently selected from $C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 4 heteroatoms selected from O, N, and S.

In embodiments, $R^b$ can be independently selected from $C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 4 heteroatoms selected from O, N, and S.

In embodiments, $R^b$ can be independently selected from $C_1$-$C_{20}$alkyl, $C_0$-$C_6$alkylene-$C_5$-$C_{20}$cycloalkyl, $C_1$-$C_{20}$heteroalkyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O—heteroaryl, wherein the heteroaryl is a 5-12 membered aromatic ring comprising 1 to 4 heteroatoms selected from O, N, and S. In embodiments, $R^b$ can be independently selected from $C_1$-$C_{20}$alkyl, $C_5$-$C_{20}$cycloalkyl, $C_1$-$C_{20}$heteroalkyl comprising 1 to 5 heteroatoms selected from O, N, and S, 5-20 membered heterocycloalkyl comprising 1 to 4 ring heteroatoms selected from O, N, and S, aryl, heteroaryl wherein the heteroaryl is a 5-12 membered aromatic ring comprising 1 to 4 ring heteroatoms selected from O, N, and S, —O—$C_1$-$C_{20}$alkyl, —O—$C_5$-$C_{20}$cycloalkyl, —O-5-20 membered heterocycloalkyl comprising 1 to 4 ring heteroatoms selected from O, N, and S, $C_0$-$C_6$alkylene —O— aryl, and —O— heteroaryl wherein the heteroaryl is a 5-12 membered aromatic ring comprising 1 to 4 heteroatoms selected from O, N, and S.

In embodiments, $R^b$ can be independently selected from $C_1$-$C_{50}$alkyl, $C_5$-$C_{20}$cycloalkyl, $C_1$-$C_6$heteroalkyl comprising 1 to 5 heteroatoms selected from O, N, and S, 5-20 membered heterocycloalkyl comprising 1 to 4 ring heteroatoms selected from O, N, and S, aryl, and heteroaryl wherein the heteroaryl is a 5-12 membered aromatic ring comprising 1 to 4 ring heteroatoms selected from O, N, and S. In embodiments, $R^b$ is other than H. In embodiments, $R^b$ is $C_1$-$C_6$alkyl.

In general, X can be H, halo, $C_1$-$C_{20}$alkoxy, phosphino, phosphito, phosphinito, phosphonito, amino, imino, nitro, hydroxyl, thiol, sulfonato, sulfonamido, boryl, lithium, or magnesium. In embodiments, X can be H, halo, $C_1$-$C_6$alkoxy, phosphino, amino, hydroxyl, thiol, sulfonato, sulfonamido, boryl, lithium, or magnesium. In embodiments, X can be H, halo, $C_1$-$C_6$alkoxy, phosphino, amino, hydroxyl, and thiol. In embodiments, X can be H, halo, $C_1$-$C_{20}$alkoxy, phosphino, phosphito, phosphinito, phosphonito, secondary amino, boryl, lithium, or magnesium. In embodiments, X can be H, halo, $C_1$-$C_6$alkoxy, phosphino, boryl, lithium, or magnesium. In embodiments, X can be H, halo, $C_1$-$C_6$alkoxy, and phosphine.

In embodiments, the plurality of alkynes comprise alkynes having a structure according to formula (I), as described above, with the proviso that none of R, $R^a$, or $R^b$ comprise an acidic hydrogen. In embodiments, the plurality of alkynes comprise alkynes having a structure according to formula (I), as described above, with the proviso that none of R, $R^a$, or $R^b$ comprise a functional group selected from carboxyl, thiol, hydroxyl, primary amine and secondary amine. In embodiments, the plurality of alkynes comprise alkynes having a structure according to formula (I), as described above, with the proviso that none of R, $R^a$, or $R^b$ comprise a carbon-oxygen double bond, a carbon-sulfur double bond, a nitrogen-oxygen double bond, a carbon-nitrogen double bond or a carbon-nitrogen triple bond. In embodiments, the plurality of alkynes comprise alkynes having a structure according to formula (I), as described above, with the proviso that none of R, $R^a$, or $R^b$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

In embodiments, the plurality of alkynes comprise alkynes having a structure according to formula (II):

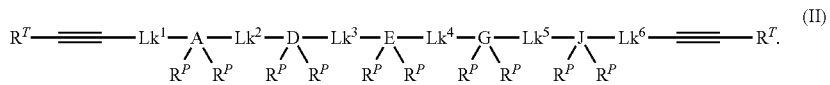

In general, each $R^T$ can be independently selected from the group consisting of H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_3$-$C_{20}$cycloalkynyl, $C_1$-$C_{20}$heteroalkyl comprising 1 to 5 heteroatoms selected from O, N, and S, $C_1$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-OH, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O—aryl, $C_0$-$C_6$alkylene-O— heteroaryl wherein the heteroaryl is a 5-12 membered aromatic ring comprising 1 to 4 heteroatoms selected from O, N, and S, and $C_0$-$C_6$alkylene-$NR^c_2$.

In embodiments, $R^T$ is selected from H, halo, $C_1$-$C_{20}$alkyl, $C_0$-$C_6$alkylene-$C_5$-$C_{20}$cycloalkyl, $C_1$-$C_{20}$heteroalkyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-aryl, $C_0$-$C_6$alkylene-heteroaryl wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl wherein the heteroaryl is a 5-12 membered aromatic ring comprising 1 to 4 heteroatoms selected from O, N, and S, and $C_0$-$C_6$alkylene-$NR^c_2$.

In embodiments, $R^T$ is selected from H, halo, $C_1$-$C_{20}$alkyl, $C_5$-$C_{20}$cycloalkyl, $C_1$-$C_{20}$heteroalkyl comprising 1 to 5 heteroatoms selected from O, N, and S, 5-20 membered heterocycloalkyl comprising 1 to 4 ring heteroatoms selected from O, N, and S, aryl, heteroaryl, wherein the heteroaryl is a 5-12 membered aromatic ring comprising 1 to 4 ring heteroatoms selected from O, N, and S, —O—$C_1$-$C_{20}$alkyl, —O—$C_5$-$C_{20}$cycloalkyl, —O-5-20 membered heterocycloalkyl comprising 1 to 4 ring heteroatoms selected from O, N, and S, —O-aryl, —O— heteroaryl wherein the heteroaryl is a 5-12 membered aromatic ring comprising 1 to 4 heteroatoms selected from O, N, and S, and $NR^c_2$. In embodiments $R^T$ is selected from H, $C_1$-$C_6$alkyl, $C_1$-$C_6$ heteroalkyl, aryl, heteroaryl wherein the heteroaryl is a 5-12 membered aromatic ring comprising 1 to 4 ring heteroatoms, —O—$C_1$-$C_6$alkyl, —O—$C_1$-$C_6$heteroalkyl, —O-aryl, and —O-heteroaryl wherein the heteroaryl is a 5-12 membered aromatic ring comprising 1 to 4 heteroatoms. In embodiments, $R^T$ is selected from H, $C_1$-$C_6$alkyl, $C_1$-$C_6$ heteroalkyl, aryl, heteroaryl wherein the heteroaryl is a 5-12 membered aromatic ring comprising 1 to 4 ring heteroatoms. In embodiments, $R^T$ is H. In embodiments, $R^T$ is $C_1$-$C_6$alkyl.

In general, A is selected from carbon (C), nitrogen (N), oxygen (O), sulfur (S), —$((CH_2)_nO)_{1-20}$, —$((CH_2)_mHN)_{1-20}$, and $Ar^2$, n and m are discussed below. In embodiments, A comprises C, N, O, or S. In embodiments, A is —$((CH_2)_nO)_{1-20}$. In embodiments, A is —$((CH_2)_nO)_{1-20}$ and n is 2. In embodiments, A is —$((CH_2)_mHN)_{1-20}$. In embodiments, A is —$((CH_2)_mHN)_{1-20}$ and m is 2. In embodiments, A is $Ar^2$. In embodiments, $Ar^2$ is phenylene. In embodiments, wherein A is $Ar^2$, $Lk^1$ and $Lk^2$ can be provided in an ortho, meta, or para configuration. In refinements of the foregoing embodiments, $Lk^1$ and $Lk^2$ are provided in a para configuration.

In general, each of D, E, G, and J are independently selected from null, carbon (C), nitrogen (N), oxygen (O), sulfur (S), —$((CH_2)_nO)_{1-20}$, —$((CH_2)_mHN)_{1-20}$, and $Ar^2$. In embodiments, each of D, E, G, and J are independently selected from null, C, N, O, or S. In embodiments, each of D, E, G, and J are independently selected from null and —$((CH_2)_nO)_{1-20}$. In embodiments, each of D, E, G, and J are independently selected from null and —$((CH_2)_nO)_{1-20}$ wherein each n is 2. In embodiments, each of D, E, G, and J are independently selected from null and —$((CH_2)_mHN)_{1-20}$. In embodiments, each of D, E, G, and J are independently selected from null and —$((CH_2)_mHN)_{1-20}$ wherein m is 2. In embodiments, each of D, E, G, and J are independently selected from null and $Ar^2$. In embodiments, D, E, G, and J can be phenylene. In embodiments, wherein D, E, G, or J are $Ar^2$, each of $Lk^2$ and $Lk^3$, $Lk^3$ and $Lk^4$, $Lk^4$ and $Lk^5$, and $Lk^5$ and $Lk^6$ can be provided in an ortho, meta, or para configuration. In refinements of the foregoing embodiments, $Lk^2$ and $Lk^3$, $Lk^3$ and $Lk^4$, $Lk^4$ and $Lk^5$, and $Lk^5$ and $Lk^6$ can be provided in a para configuration.

In general, n can be 1, 2, 3, 4, or 5. In embodiments, n can be 1, 2, 3, or 4. In embodiments, n can be 1, 2, or 3. In embodiments, n can be 1 or 2. In embodiments, n can be 2 or 3. In embodiments, n can be 2, 3, or 4. In embodiments, n can be 2, 3, 4, or 5. In embodiments, n can be 3 or 4. In embodiments, n can be 3, 4, or 5. In embodiments, n can be 4 or 5. In embodiments, n is 1. In embodiments, n is 2. In embodiments, n is 3. In embodiments, n is 4. In embodiments, n is 5.

In general, m can be 1, 2, 3, 4, or 5. In embodiments, m can be 1, 2, 3, or 4. In embodiments, m can be 1, 2, or 3. In embodiments, m can be 1 or 2. In embodiments, m can be 2 or 3. In embodiments, m can be 2, 3, or 4. In embodiments, m can be 2, 3, 4, or 5.

In embodiments, m can be 3 or 4. In embodiments, m can be 3, 4, or 5. In embodiments, m can be 4 or 5. In embodiments, m is 1. In embodiments, m is 2. In embodiments, m is 3. In embodiments, m is 4. In embodiments, m is 5.

In general, $Ar^2$ can be selected from the group consisting of phenylene, naphthalene, anthracene, fluorene, phenalene, phenanthrene, chrysene, fluoranthene, pyrene, tetracene, benzopyrene, perylene, tetraphenylene, anthanthrene, zethrene, a derivative of any of the foregoing wherein 1 to 5 carbon atoms have been replaced with O, S, or N, or a substituted variation of any of the foregoing.

In general, each $R^P$ can be independently selected from null, H, halo, oxo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_3$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-OH, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O—aryl, $C_0$-$C_6$alkylene-O— heteroaryl, wherein the heteroaryl is a 5-12 membered aromatic ring comprising 1 to 5 heteroatoms selected from O, N, and S, and $C_0$-$C_6$alkylene-$NR^c_2$, or both $R^P$ together with the atom to which they are attached form a spiro five- to thirty-membered monocyclic or polycyclic group comprising 0 to 5 ring heteroatoms selected from N, O, and S.

In embodiments, each $R^P$ can be independently selected from null, H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_3$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl, wherein the heteroaryl is a 5-12 membered aromatic ring comprising 1 to 5 heteroatoms selected from O, N, and S, and $C_0$-$C_6$alkylene-$NR^c_2$, or both $R^P$ together with the atom to which they are attached form a spiro five- to thirty-membered monocyclic or polycyclic group comprising 0 to 5 ring heteroatoms selected from N, O, and S.

In embodiments, each $R^P$ can be independently selected from null, H, halo, $C_1$-$C_{20}$alkyl, $C_0$-$C_6$alkylene-$C_5$-$C_{20}$cycloalkyl, $C_1$-$C_{20}$heteroalkyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl, wherein the heteroaryl is a 5-12 membered aromatic ring comprising 1 to 5 heteroatoms selected from O, N, and S, and $C_0$-$C_6$alkylene-$NR^c_2$.

In embodiments, each $R^P$ can be independently selected from null, H, halo, $C_1$-$C_6$alkyl, $C_5$-$C_{20}$cycloalkyl, $C_1$-$C_6$heteroalkyl comprising 1 to 5 heteroatoms selected from O, N, and S, 5-20 membered heterocycloalkyl comprising 1 to 4 ring heteroatoms selected from O, N, and S, aryl, heteroaryl wherein the heteroaryl is a 5-12 membered aromatic ring comprising 1 to 4 ring heteroatoms selected from O, N, and S, —O—$C_1$-$C_6$alkyl, —O—$C_5$-$C_{20}$cycloalkyl, —O-5-20 membered heterocycloalkyl comprising 1 to 4 ring heteroatoms selected from O, N, and S, —O— aryl, —O— heteroaryl, wherein the heteroaryl is a 5-12 membered aromatic ring comprising 1 to 5 heteroatoms selected from O, N, and S, and —$NR^c_2$.

In embodiments, each $R^P$ can be independently selected from null, H, halo, $C_1$-$C_6$alkyl, $C_1$-$C_6$heteroalkyl comprising 1 to 5 heteroatoms selected from O, N, and S, aryl, heteroaryl wherein the heteroaryl is a 5-12 membered aromatic ring comprising 1 to 4 ring heteroatoms selected from O, N, and S, —O—$C_1$-$C_6$alkyl, —O— aryl, —O— heteroaryl, wherein the heteroaryl is a 5-12 membered aromatic ring comprising 1 to 5 heteroatoms selected from O, N, and S, and —$NR^c_2$. In embodiments, each $R^P$ can be independent selected from null, H, $C_1$-$C_6$alkyl, aryl, heteroaryl wherein the heteroaryl is a 5-12 membered aromatic ring comprising 1 to 4 ring heteroatoms selected from O, N, and S, —O—$C_1$-$C_6$alkyl, —O-aryl, and —$NR^c_2$. In embodiments, each $R^P$ can be selected from null, H, $C_1$-$C_6$alkyl, and aryl. In embodiments, both $R^P$ together with the atom to which they are attached form a spiro five- to thirty-membered monocyclic or polycyclic group comprising 0 to 5 ring heteroatoms selected from N, O, and S.

In general, each $R^c$ can be independently selected from $C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 5 heteroatoms selected from O, N, and S.

In embodiments, each $R^c$ can be independently selected from $C_1$-$C_{20}$alkyl, $C_0$-$C_6$alkylene-$C_5$-$C_{20}$cycloalkyl, $C_1$-$C_{20}$heteroalkyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 5 heteroatoms selected from O, N, and S.

In embodiments, each $R^c$ can be independently selected from $C_1$-$C_6$alkyl, $C_5$-$C_{20}$cycloalkyl, $C_1$-$C_6$heteroalkyl comprising 1 to 5 heteroatoms selected from O, N, and S, 5-20 membered heterocycloalkyl comprising 1 to 4 ring heteroatoms selected from O, N, and S, aryl, heteroaryl wherein the heteroaryl is a 5-12 membered aromatic ring comprising 1 to 4 ring heteroatoms selected from O, N, and S, —O—$C_1$-$C_6$alkyl, —O—$C_5$-$C_{20}$cycloalkyl, —O-5-20 membered heterocycloalkyl comprising 1 to 4 ring heteroatoms selected from O, N, and S, —O-aryl, and —O— heteroaryl wherein the heteroaryl is a 5-12 membered aromatic ring comprising 1 to 5 heteroatoms selected from O, N, and S.

In embodiments, each $R^c$ can be independently selected from $C_1$-$C_6$alkyl, $C_1$-$C_6$heteroalkyl comprising 1 to 5 heteroatoms selected from O, N, and S, aryl, heteroaryl wherein the heteroaryl is a 5-12 membered aromatic ring comprising 1 to 4 ring heteroatoms selected from O, N, and S, —O—$C_1$-$C_6$alkyl, —O— aryl, and —O— heteroaryl wherein the heteroaryl is a 5-12 membered aromatic ring comprising 1 to 5 heteroatoms selected from O, N, and S.

In embodiments, each $R^c$ can be independently selected form H, $C_1$-$C_6$alkyl, aryl, heteroaryl wherein the heteroaryl is a 5-12 membered aromatic ring comprising 1 to 4 ring heteroatoms, —O—$C_1$-$C_6$alkyl, and —O— aryl.

In general, each of $Lk^1$, $Lk^2$, $Lk^3$, $Lk^4$, $Lk^5$, and $Lk^6$ can be independently $C_{0-10}$alkylene. In embodiments, each of $Lk^1$, $Lk^2$, $Lk^3$, $Lk^4$, $Lk^5$, and $Lk^6$ can be independently $C_{1-8}$alkylene. In embodiments, each of $Lk^1$, $Lk^2$, $Lk^3$, $Lk^4$, $Lk^5$, and $Lk^6$ can be independently $C_{1-4}$alkylene. In embodiments, each of $Lk^1$, $Lk^2$, $Lk^3$, $Lk^4$, $Lk^5$, and $Lk^6$ can be independently methyl, ethyl, or propyl.

In embodiments, the plurality of alkynes comprise alkynes having a structure according to formula (II), as described above, with the proviso that none of $R^T$, $R^P$, $R^c$ and $Ar^2$ comprise an acidic hydrogen. In embodiments, the plurality of alkynes comprise alkynes having a structure according to formula (II), as described above, with the proviso that none of $R^T$, $R^P$, $R^c$ and $Ar^2$ comprise a functional group selected from carboxyl, thiol, hydroxyl, primary amine and secondary amine. In embodiments, the plurality of alkynes comprise alkynes having a structure according to formula (II), as described above, with the proviso that none of $R^T$, $R^P$, $R^c$ and $Ar^2$ comprise a carbon-oxygen double bond, a carbon-sulfur double bond, a nitrogen-oxygen double bond, a carbon-nitrogen double bond or a carbon-nitrogen triple bond. In embodiments, the plurality of alkynes comprise alkynes having a structure according to formula (II), as described above, with the proviso that none of $R^T$, $R^P$, $R^c$ and $Ar^2$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

In embodiments, the plurality of alkynes comprises at least one alkyne selected from the group consisting of 4-ethynylanisole, 4-ethynylbenzoic acid methyl ester, 2-ethynylthiophene, 1-ethynyl-4-(trifluoromethyl)benzene, 4-ethynyl-N,N-dimethylaniline, ethoxyethyne, hexa-1,5-diyne, and 4,4-dimethylhepta-1,6-diyne.

Cyclic Polymers

The polymerization of alkynes to cyclic polymers occurs upon combining reacting a metal-alkylidyne compound, metallacycloalkylene compound, or metallacyclopentadiene compound with a plurality of alkynes in a fluid state, which can be in solution.

Examples of solvents that may be used in the polymerization reaction include organic, protic, or aqueous solvents that are inert under the polymerization conditions, such as aromatic hydrocarbons, halogenated hydrocarbons, ethers, aliphatic hydrocarbons, alcohols, water, or mixtures thereof.

Suitable halogenated hydrocarbon solvents include methylene chloride, chloroform, chlorobenzene, 1,2-dichloroethane, dichlorobenzene, and mixtures thereof. In embodiments, the polymerization reaction solvent does not include aqueous solvents or protic solvents (e.g., the polymerization reaction occurs in the presence of a non-aqueous and/or aprotic solvent). In embodiments, the polymerization reaction solvent comprises aromatic hydrocarbons, aliphatic hydrocarbons, halogenated hydrocarbons, or combinations thereof. The concentration of the monomers is not particularly limited. In embodiments wherein the alkynes are liquid, the monomers can be provided neat. In embodiments wherein the monomer is provided in the presence of a solvent, the monomers can be provided at concentrations in a range of 0.01 M to 5 M, for example in a range of 0.01 M to 4.5 M, 0.01 M to 4 M, 0.01 M to 3 M, 0.05 M to 3 M, 0.1 M to 3 M, 0.1 M to 3.5 M, 0.5 M to 3.5 M, 0.5 M to 4 M, or 0.5 M to 5 M. In embodiments wherein the alkynes are provided as a gas, the metal-alkylidyne compound, metallacycloalkylene compound, or metallacyclopentadiene compound can be dissolved in a solvent.

The polymerization can be carried out at, for example, ambient temperatures at dry conditions under an inert atmosphere. The polymerization can be carried out at a temperature in the range of about 30° C. to about 100° C. or greater, for example, in a range of about 35° C. to about 85° C. or about 40° C. to about 60° C. Polymerization times will vary, depending on the particular monomer, metal complex, and desired molecular weight of the cyclic polymer product. The progress of the reaction can be monitored by standard techniques, e.g., nuclear magnetic resonance (NMR) spectroscopy.

Polymerization proceeds by successive addition/insertion of the monomer to the growing macrocycle on the metal complex, and the intermediate macrocylic complex undergoes intramolecular chain transfer to yield the cyclic olefinic polymer. Polymerization may be terminated at any time by addition of a solvent effective to precipitate the polymer, for example, methanol. A representative cyclic polymer prepared from a monosubstituted alkyne (substituted with $R^{10}$) has a structure according to formula (VIII):

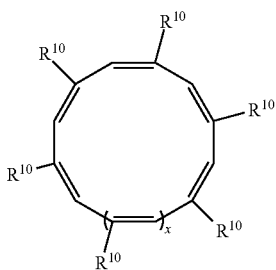

(VIII)

wherein x represents an integer for the monomer units of the alkyne in the cyclic polymer and depends on the amount of monomer provided and the molecular weight of the polymer at termination. In some cases, x is 1 to 10000. The precipitated polymer may then be isolated by filtration or other conventional means.

In embodiments, the functionalized cyclic polymer may cross-link upon polymerization. Cross-linking of the functionalized cyclic polymer can provide a cyclic polymer network, as shown in FIG. 1, which can advantageously provide a cyclic polymer material that swells when exposed to hydrocarbons, i.e., when the network sorbs hydrocarbons in an oil remediation application, for example. Functional groups that can lead to crosslinking can include, but are not limited to, alkynes, e.g., from the polymerization of diynes (1,5-hexadiyne, 1,6-heptadiyne), carboxyls, amines, amides, thiols, and hydroxyls. Crosslinking agents can be included to facilitate crosslinking, as is known in the art. In embodiments, the functional groups present on the cyclic polymer can react with one another to form crosslinks and no additional crosslinking agent is added to the precipitated polymer. In embodiments, crosslinking agents are added to the precipitated polymer to facilitate crosslinking.

The polymerization conditions can be controlled to prevent crosslinking. In embodiments, the alkyne is provided as a dilute solution, for example, in a range of 0.1 μM to 0.5 M, less than about 0.5 M, less than about 0.4 M, less than about 0.25 M, less than about 0.1 M, less than about 0.05 M, less than about 0.01 M, less than about 1000 μM, less than about 100 μM, less than about 10 μM, less than about 5 μM, less than about 1 μM, or about 0.5 μM or about 0.1 μM.

Figure 2:
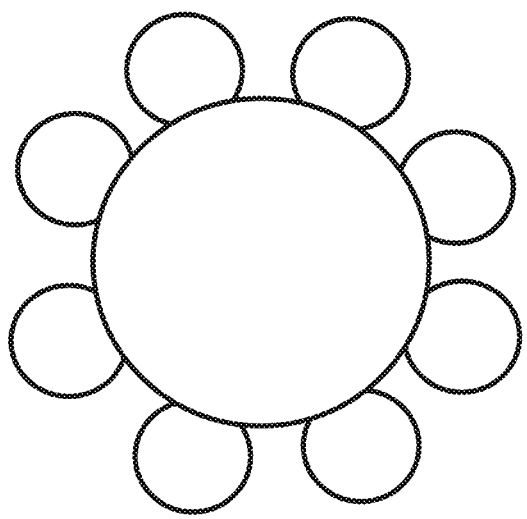
FIG. 2 is a representation of a cyclic polymer bearing rings along the backbone.

In embodiments wherein the plurality of alkynes comprises dialkynes such that the cyclic polymer includes pendant alkyne groups (e.g., as in structure (VIII) above, when $R^{10}$ comprises alkylene-alkyne), polymerization conditions can be selected to avoid crosslinking and instead form cyclic polymers bearing rings along the back bone, as shown in FIG. 2. Without intending to be bound by theory, it is believed that when a dialkyne having alkyl substituents, in particular germinal alkyl substituents (e.g., 4,4-dimethyl-hepta-1,6-diyne) is polymerized at low alkyne concentrations, the Thorpe-Ingold effect can be exploited and the alkyl substituents promote intramolecular cyclization rather than intermolecular crosslinking, resulting in cyclic polymers bearing rings along the backbone. Thus, in embodiments, the cyclic polymer comprises a cyclic polymer backbone and a ring structure on the cyclic polymer backbone. In embodiments, the cyclic polymer comprises a cyclic polymer backbone and a plurality of ring structures on the polymer backbone.

In embodiments wherein the plurality of alkynes comprises different alkynes, the different alkynes can be added stepwise to provide a block copolymer. In embodiments, wherein the plurality comprises different alkynes, the different alkynes can be added concurrently to provide a random copolymer. It will be appreciated that if the different alkynes have significantly different rates of insertion and/or propagation, the different alkynes or alkenes can be added concurrently and still provide a block copolymer.

The molecular weight of the cyclic polymers can be small, equivalent to oligomers of three to ten repeating units, or the molecular weights can be of any size up to tens and hundreds of thousands or millions in molecular weight, for example, in a range of about 200 Da to about 5,000,000 Da, about 500 Da to about 4,000,000 Da, about 1,000 Da to about 3,000,000 Da, about 5,000 Da to about 2,000,000 Da or about 10,000 to about 1,000,000 Da. The cyclic polyalkenes can be used as prepared or converted into cyclic polyalkanes upon reduction of the double bonds of the cyclic polyalkene polymer. The cyclic polyalkene can be converted to substituted cyclic polyalkanes by addition reaction at the alkene groups of the cyclic polyalkenes, for example the addition of halogens, alcohols, amines, or any other olefin addition reactions.

The cyclic polyalkenes prepared by this method can display one or more geometries across the resulting double bonds of the polyalkene backbone. In embodiments, the cyclic polymer is syndiotactic. In embodiments, the alkene groups of the cyclic polymer are at least 50%, at least 60%, at least 70%, at least 80%, or at least 90% cis. In embodiments, the alkene groups of the cyclic polymer are at least 50%, at least 60%, at least 70%, at least 80%, or at least 90% trans. In embodiments, the cyclic polymer is syndiotactic and at least 90% of the alkene groups are cis. In embodiments, the cyclic polymer is syndiotactic and at least 90% of the alkene groups are trans.

Following polymer synthesis and recovery, the olefinic polymer provided may be hydrogenated using conventional means, e.g., via standard $H_2/Pd/C$ procedures or via tosyl-hydrazine decomposition. Generally, either procedure will result in a saturated polymer having hydrogenated more than 99% of the olefinic functionalities in the polymer backbone, as may be determined by $^1H$ and $^{13}C$ NMR spectroscopy. As used herein, a cyclic polymer is fully hydrogenated if more than 99% of the olefinic functionalities are hydrogenated. Advantageously, the stereoregularity of the polymers are maintained during hydrogenation, providing for stereoregular saturated cyclic polymers.

The functional groups capable of further reacting to form a modified polymer can be modified using synthetic methods well known to those skilled in the art, including but not limited to by Suzuki coupling, Heck coupling, Mitsunobu coupling, esterification, amide bond formation, condensation reactions, alkylation, and protonation.

The modified polymers can be, for example, brush polymers, cationic polymers, anionic polymers, hydrophobic polymers, or hydrophilic polymers. As used herein, brush polymers refer to polymers having long chains off the cyclic polymer backbone and can have a high density of branching or low density of branching. The ability to modify the cyclic polymer after polymerization advantageously provides a mechanism for including functional groups which may otherwise interfere with the polymerization process, including but not limited to groups having acidic hydrogens, groups having heteroatom containing unsaturated bonds, groups having long chains or sterically bulky substituents that may sterically interfere with monomer approach to the metal center.

The functionalized cyclic polymers advantageously allow controlled post-polymerization modification to provide specialized polymers for a variety of applications, including but not limited to, oil remediation, motor oil additives (e.g., viscosity modifiers), lubricants, carriers for drug delivery, and/or polymers for membrane/cell penetration.

In general, cyclic polymers can be useful for oil remediation. In particular, hydrophobic cyclic polymers, for example, polymers having alkyl modifications, fluorinated modifications, and/or silanated modifications can be useful for oil remediation. Motor oil additives such as viscosity modifiers can include cyclic brush polymers having long hydrophobic chains off of the cyclic backbone. Cationic cyclic polymers can advantageously be used for drug delivery and/or membrane/cell penetration.

EXAMPLES

Materials and methods: Unless specified otherwise, all manipulations were performed under an inert atmosphere using glove-box techniques. Toluene and pentane were dried using a GlassCountour drying column. 1,5-hexadiyne and 1,6-heptadiyne were purchased from Sigma-Aldrich and Alfa-Aesar, respectively, distilled from calcium hydride, degassed by freeze pump thawing, and filtered through a column of basic alumina immediately prior to use. Toluene-$d_8$ was dried over phosphorous pentoxide ($P_2O_5$), distilled, degassed by freeze pump thawing, and stored over 4 Å molecular sieves. NMR spectra were obtained on Mercury 300 MHZ, Varian INOVA 500 MHZ and Varian INOVA2 500 MHz spectrometers. Fourier transform infrared spectroscopy was performed using a Cary 630 FTIR (Agilent Technologies, Santa Clara, Calif., USA). The conductivity data was recorded on a Signatone Pro 4 4-point probe.

Example 1—Synthesis of Cyclic Polymers with Alkyne Monomers

Polymerization of 4-Ethynylanisole

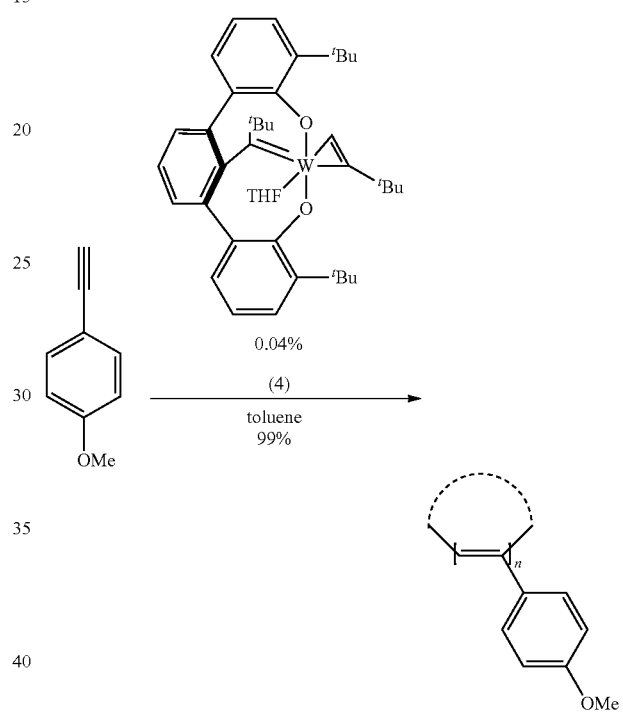

Synthesis of cyclic poly(4-ethynylanisole): In an inert atmosphere glovebox, 98 µL of 4-ethynylanisole (0.76 mmol) was added via a micropipette to 1.0 mL toluene in a glass vial equipped with a stir bar. Adding a stock solution (5 mg/mL) of catalyst (4) (48 µL) into the stirring solution via micropipette in one shot initiated the polymerization. The solution turned from light yellow (catalyst color) to bright orange after a few seconds. After 30 min, the reaction was terminated by dropwise adding the reaction solution to tenfold excess of stirring degassed methanol. Vacuum filtration under argon flow followed by drying under vacuum overnight gave the orange poly(4-ethynylanisole) in 99% yield. The evidence of a successful polymerization came from $^1H$ NMR and size exclusion chromatography (SEC) equipped with static light scattering (SLS). The $^1H$ NMR spectrum of poly(4-ethynylanisole) in $CDCl_3$ at 25° C. exhibited multiple broad resonances centered at 6.61 (Ar—H), 6.48 (Ar—H), 5.79 (CH═), and 3.59 (OCH$_3$) ppm. The broadness of the resonances suggested the formation of a polymer. The olefinic proton resonance centered at 5.79 ppm confirmed the formation of a polyene. Further direct evidence of polymerization came from the SLS analysis of the polymer separated via SEC, revealing the polymer $M_n$ of 97,000 and dispersity (D) of 1.43.

Polymerization of 4-ethynylbenzoic Acid Methyl Ester

Polymerization of 2-Ethynylthiophene

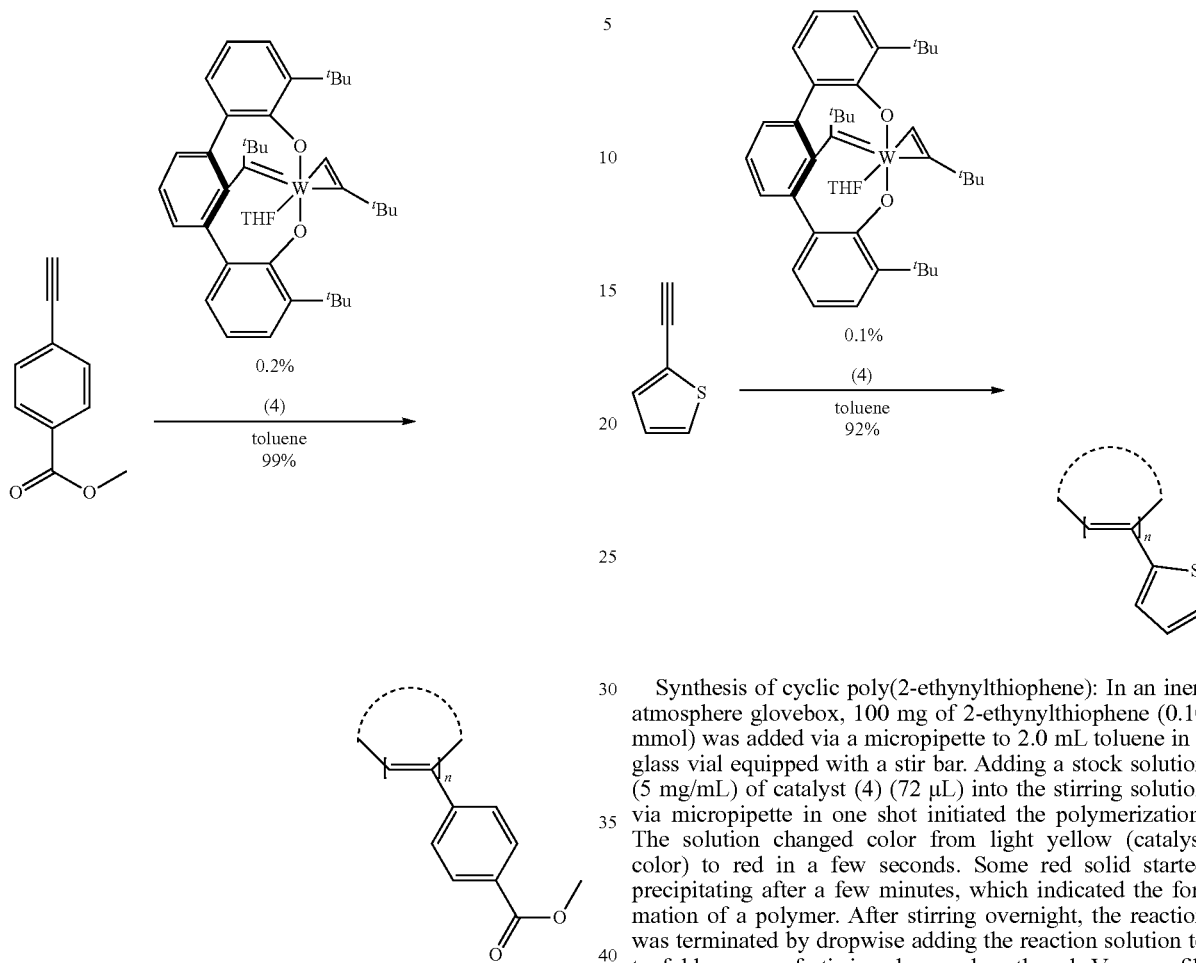

Synthesis of cyclic poly(4-ethynylbenzoic acid methyl ester): In an inert atmosphere glovebox, 100 mg of 4-ethynylbenzoic acid methyl ester (0.63 mmol) was added via a micropipette to 1.0 mL toluene in a glass vial equipped with a stir bar. Adding a stock solution (5 mg/mL) of catalyst (4) (195 μL) into the stirring solution via micropipette in one shot initiated the polymerization. The solution changed color from light yellow (catalyst color) to orange in a few seconds. The solution also turned viscous, indicating the formation of high molecular weight polymers. After stirring overnight, the reaction was terminated by dropwise adding the reaction solution to tenfold excess of stirring degassed methanol. Vacuum filtration under argon flow followed by drying under vacuum overnight gave the orange polymer in 82% yield. The evidence of a successful polymerization came from $^1$H NMR. In the $^1$H NMR spectra of the product, the proton resonances shifted, broadened, and overlapped compared to the ones from the monomer, which suggested the formation of a polymer. The terminal alkyne proton centered at 2.84 ppm in the monomer disappeared in the polymer $^1$H NMR spectra, while the polymer exhibited a broad olefinic proton resonance centered at 5.88 ppm, confirming the formation of a polyene.

Synthesis of cyclic poly(2-ethynylthiophene): In an inert atmosphere glovebox, 100 mg of 2-ethynylthiophene (0.10 mmol) was added via a micropipette to 2.0 mL toluene in a glass vial equipped with a stir bar. Adding a stock solution (5 mg/mL) of catalyst (4) (72 μL) into the stirring solution via micropipette in one shot initiated the polymerization. The solution changed color from light yellow (catalyst color) to red in a few seconds. Some red solid started precipitating after a few minutes, which indicated the formation of a polymer. After stirring overnight, the reaction was terminated by dropwise adding the reaction solution to tenfold excess of stirring degassed methanol. Vacuum filtration under argon flow followed by drying under vacuum overnight gave the red polymer in 92% yield. The evidence of a successful polymerization came from $^1$H NMR spectrum of poly(2-ethynylthiophene). In the $^1$H NMR spectrum, the product exhibited one broad resonance centered at 6.75 ppm, as the olefinic proton resonance overlapped with thiophene protons. The broadness of the resonance and the formation of the olefinic proton were clear evidence for the formation of a polyene.

Polymerization of 1-ethynyl-4-(trifluoromethyl)benzene

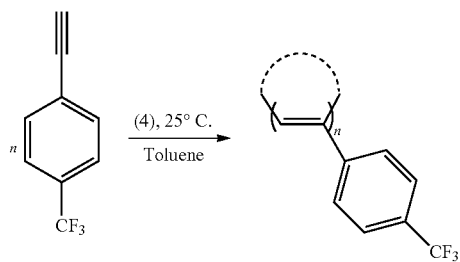

1-ethynyl-4-(trifluoromethyl)benzene was dried with CaH$_2$ and distilled under vacuum prior to use. A toluene solution of 1-ethynyl-4-(trifluoromethyl)benzene was colorless to start and the solution developed a pale orange color as soon as a stock solution (1 mg/mL) of catalyst

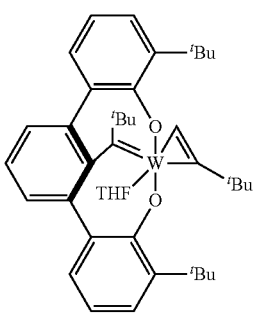
(4)

in toluene was added (monomer:catalyst loading ratio of 1000:1). After ~3-4 minutes a deep orange precipitate was observed. Instead of possessing a powdery texture the precipitate stuck to the walls of the reaction vessel and appeared as one solid. At the end of the reaction the solution was faint orange in color. Quenching of the reaction mixture with methanol did not provide any more solid. For a monomer:catalyst ratio of 10000:1 a faint orange solution color was observed but no precipitate formed even after 24 h; quenching of the reaction mixture with methanol also did not provide a precipitate. The results of several polymerizations are summarized in Table 1. When freshly distilled, 1-ethynyl-4-(trifluoromethyl)benzene was colorless and a transparent liquid but over a several days even when stored at −20° C. the monomer developed a faint yellow color that intensified over time and more rapidly if the temperature was raised. Impurities that develop in monomer 1-ethynyl-4-(trifluoromethyl)benzene may be responsible for the appearance of the faint yellow color but these impurities remained unidentified. The lack of polymer formation with a 10,000:1 ratio might have been due to the instability of the monomer rather than the inherent functional group.

The orange polymer that precipitated did not dissolve in benzene, toluene or chloroform, but dissolved in dichloromethane. The $^1$H NMR spectrum of the solid in DCM-d$_2$ exhibited two broad resonances at 7.24 ppm and 5.83 ppm with relative peak intensity ratio of 4.00:0.75, respectively. The peak at 7.23 ppm was attributable to aromatic protons and the peak at 5.83 ppm was attributed to olefinic protons. The assignment also agreed with the peak intensity ratio. The insolubility of the polymer in toluene and other solvents was associated with the presence of the —CF$_3$ group in the polymer.

TABLE 1

| Monomer Concentration | Reaction time | Monomer: Catalyst | Temperature (° C.) | Yield |
|---|---|---|---|---|
| 1M | 25 minutes | 1000:1 | 25 | 82.24% |
| 1M | 25 minutes | 1000:1 | 50 | 78.25% |
| 1M | 15 minutes | 10000:1 | 25 | — |
| 1M | 25 minutes | 10000:1 | 25 | — |
| 1M | 24 hours | 10000:1 | 25 | — |

Polymerization of 4-ethynyl-N,N-dimethylaniline

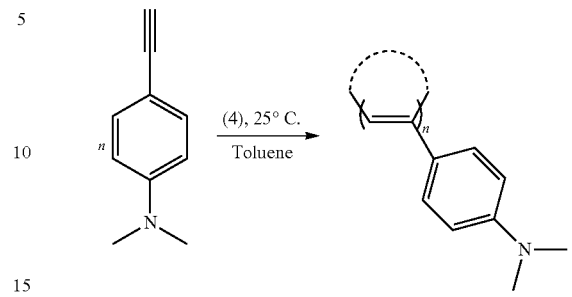

4-ethynyl-N,N-dimethylaniline was dried over CaH$_2$ and sublimed (50° C., 104 torr) prior to use. A deep orange color appeared as the stock solution of catalyst (4) (1 mg/mL) was added to a toluene solution of 4-ethynyl-N,N-dimethylaniline. The orange color became more intense as the reaction progressed. Catalyst (4) was highly active towards the substrate. A 20.7% yield was obtained even with a catalyst loading as low as 30000:1 (monomer:catalyst) (Table 2). The solution became viscous as the reaction proceeded. The product precipitated as an orange solid when the reaction mixture was quenched with methanol. In this case, the cyclic polymer was soluble in tetrahydrofuran (sparingly), dichloromethane (sparingly), acetone and methanol but insoluble in toluene and benzene. A $^1$H NMR spectrum of the orange solid in CDCl$_3$ exhibited a broad resonance at 2.73 ppm and an even broader signal at 6.32 ppm which overlapped with a resonance at 5.83 ppm. The relative ratios were 6.74:4.00: 0.89. The peak at 2.73 ppm arises from N—CH$_3$ protons and the resonances at 6.32 ppm and the shoulder at 5.83 ppm were attributed to the aromatic protons and olefinic protons, respectively.

TABLE 2

| Monomer Concentration | Reaction time | Monomer: Catalyst | Temperature (° C.) | Yield |
|---|---|---|---|---|
| 1M | 1 hour | 1000:1 | 25 | 79.2% |
| 1M | 1 hour | 5000:1 | 25 | 58.8% |
| 1M | 1 hour | 10000:1 | 25 | 48.45% |
| 1M | 1 hour | 20000:1 | 25 | 35.69% |
| 1M | 1 hour | 30000:1 | 25 | 20.69% |

Polymerization of Ethoxyethyne

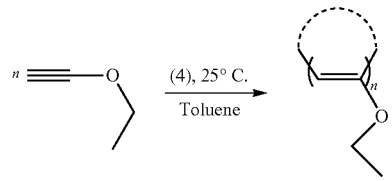

The ethoxyethyne was purchased as 1:1 (v/v) solution in hexanes, the solution was dark in color and used without further purification. Addition of catalyst (4) to a toluene solution of ethoxyethyne did not reveal a color change but a dark colored precipitated was observed as the reaction proceeded. Just like the precipitate observed in case of polymerization of 4-ethynyl-N,N-dimethylaniline, the polymer stuck to the vessel walls. The catalyst exhibited remarkable activity even at 20000:1 (monomer:catalyst) ratio which indicated immunity of the catalyst towards the ether functional group directly bonded to a sp-hybridized carbon. In contrast to the above described polymerization reactions the yield of the reaction in this case was unusually low (Table 3). The product was soluble in methanol and provides a dark color to the solution when the reaction mixture was quenched with methanol. The product was tested for solubility and was soluble in toluene, tetrahydrofuran, dichloromethane, acetone, and methanol. A $^1$H NMR spectrum of the product in CDCl$_3$ exhibited two broad resonances at 1.25 ppm and 3.74 ppm attributable to the —CH$_3$ and —CH$_2$— protons of the ethyl group with a relative intensity ratio of 2.87:2.00, respectively. The olefinic protons were not observed in the spectra, due to broadening.

TABLE 3

| Monomer Concentration | Reaction time | Monomer: Catalyst | Temperature (° C.) | Yield |
|---|---|---|---|---|
| 1M | 1 hour | 1000:1 | 25 | 28.5% |
| 1M | 1 hour | 5000:1 | 25 | 23.5% |
| 1M | 1 hour | 10000:1 | 25 | 21.4% |
| 1M | 1 hour | 20000:1 | 25 | 20.7% |

Attempted Polymerization of 4-ethynylaniline

Monomer 4-ethynylaniline was dried over molecular sieves (3 Å) overnight and recrystallized from a toluene solution prior to use. Catalyst (4) did not show similar reactivity with 4-ethynylaniline as it showed with the ethoxyethyne, 4-ethynyl-N,N-dimethylaniline, and 1-ethynyl-4-(trifluoromethyl) benzene. Addition of stock solution of catalyst (4) (1 mg/mL) into toluene solution of 4-ethynylaniline gave rise to orange color in the solution over time. Different reaction conditions gave rise to different physical attributes of the reaction product. Table 4 summarizes reaction conditions and yield of precipitate obtained. General reaction scheme is shown below.

A $^1$H NMR spectrum of the product reveals that it was not a polymer. Stacking $^1$H NMR of 4-ethynylaniline with the product confirmed that the precipitate contains monomer 4-ethynylaniline. The precipitate was observed in the reaction as it proceeded, and the color of the precipitate changed from orange to light orange yellowish as the monomer to catalyst ratio was increased from 100:1 to 20000:1. NH$_2$ groups may be incompatible with catalyst (4).

TABLE 4

| Monomer Concentration | Reaction time | Monomer: Catalyst | Temperature (° C.) | Yield |
|---|---|---|---|---|
| 0.5M | 1 hour | 100:1 | 25 | 75.31% |
| 0.5M | 1 hour | 200:1 | 25 | 74.45% |
| 0.5M | 1 hour | 500:1 | 25 | 72.74% |
| 0.5M | 1 hour | 1000:1 | 25 | 71.28% |
| 0.5M | 1 hour | 5000:1 | 25 | 71.02% |
| 0.5M | 1 hour | 10000:1 | 25 | 69.20% |
| 0.5M | 1 hour | 20000:1 | 25 | 68.20% |

Overall, catalyst (4) was tolerant towards strong electron withdrawing, such as —CF$_3$. Catalyst (4) showed excellent activity even at very high monomer to catalyst (30000:1) ratios in the presence of strong electron donating groups such as —N(CH$_3$)$_2$. Results herein revealed that catalyst (4) was able to polymerize an alkyne with direct attachment to an ether group. Reaction of (4) with 4-ethynylaniline suggested that the catalyst was ineffective in presence of N—H bonds.

Example 2—Synthesis of Cyclic Polymers Using Dialkyne Monomers

General Polymerization Procedure: In an inert atmosphere glovebox, 2 ml of a 1,6-heptadiyne stock solution (1 M) was added to a 20 ml glass vial. 200 μL of a stock solution of catalyst

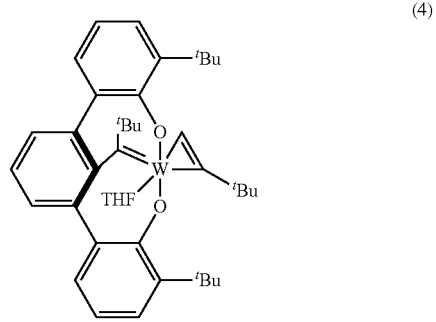

(4)

(2 mg/ml) was added into the stirring solution of the monomer. The solution turned dark red upon the catalyst addition. After 5 min, a black precipitation formed, and all the volatiles were removed in vacuo to give the poly(1,6-heptadiyne). Polymer was then washed with toluene to remove the remaining catalyst and monomer. Polymer was then transferred into an air-free flask and dried under vacuum at 80° C. to remove volatiles.

Figure 3:
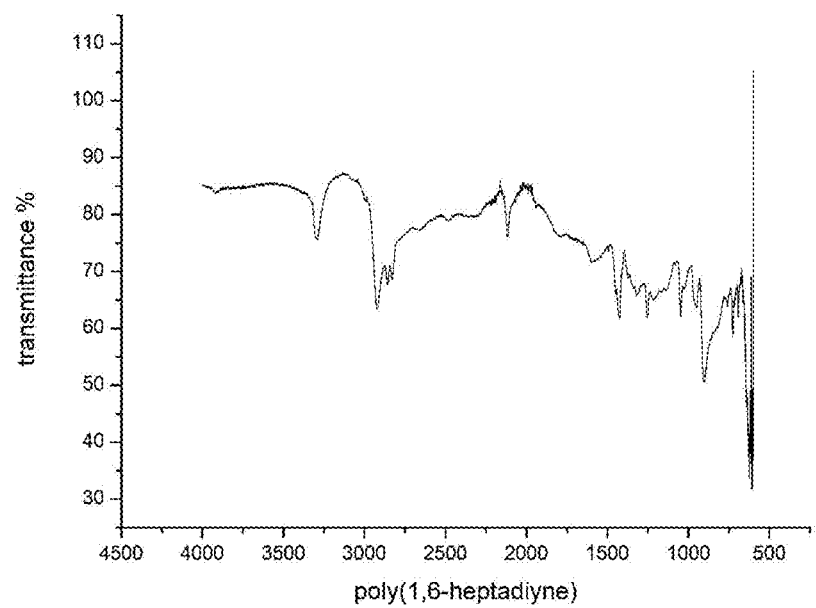
FIG. 3 depicts an infrared spectra of poly(1,6-heptadiyne) as described herein.
Figure 4:
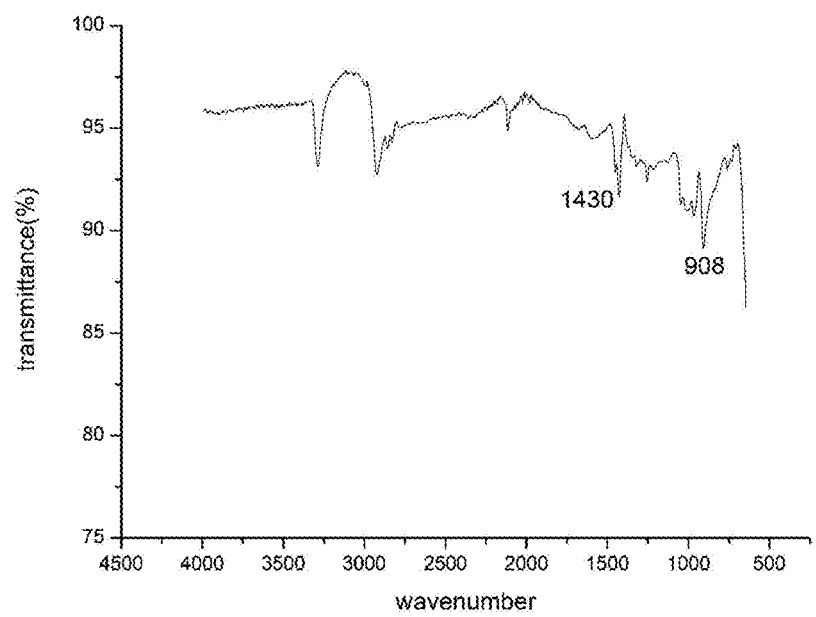
FIG. 4 depicts an infrared spectra of poly(1,5-hexadiyne) as described herein.

Treating 1,5-hexadiyne and 1,6-heptadiyne with catalyst (4) provided cyclic poly(1,5-hexadiyne) and poly(1,6-heptadiyne), respectively. Polymerization reactions typically finished after 5 min at ambient temperature and gave polymers in >99% yield. Polymerization of 1,5-hexadiyne gave a dark green solution and a black precipitate whereas, polymerization of 1,6-heptadiyne gave a deep red solution and a black precipitate. After removal of all volatiles, poly(1,5-hexadiyne) and poly(1,6-heptadiyne) were black insoluble solids. Soluble fractions of the reaction mixture were analyzed by NMR spectroscopy and IR spectra were recorded for both polymers (FIG. 3 and FIG. 4)

Poly(1,6-heptadiyne) synthesized by catalyst (4) was a black brittle insoluble polymer with a dull side and a shiny side. Gibson, Bailey, et. al. reported the synthesis of linear poly(1,6-heptadiyne) using Ziegler-Natta type catalysts which also provided a golden-green "metallic" film (Gibson et al., *Journal of the American Chemical Society*, 105(13), 4417-4431). The color difference may be due to the high molecular weight of the poly(1,6-heptadiyne) generated from catalyst (4).

By adjusting the monomer concentration and monomer: catalyst ratio it was shown possible to alter the crosslinking and promoted intramolecular cyclization. Various trials were conducted with different reaction conditions; the results are shown in Table 5. Under all the conditions the polymers generated were insoluble, suggesting crosslinking existed in poly(1,6-heptadiyne) products.

TABLE 5

| Monomer | Monomer concentration | Monomer: Catalyst ratio | Appearance |
| --- | --- | --- | --- |
| 1,5-hexadiyne | neat | 1000:1 | Dark green precipitate |
| 1,5-hexadiyne | 1.0M | 1000:1 | Dark green precipitate |
| 1,6-heptadiyne | neat M | 1000:1 | Black brittle film |
| 1,6-heptadiyne | 1.0M | 1000:1 | Black brittle film |

Swelling study of poly(1,6-heptadiyne): A dry sample of poly(1,6-heptadiyne) was weighed and placed in a 20 ml glass vial. 5 ml of toluene was then added into the vial to allow the polymer sample to soak in toluene for 16 h. The sample was then dried in an inert atmosphere for 1 h to allow the toluene on the surface of the polymer to evaporate. The swelled sample was then weighed again, and the swelling ratio was calculated by the equation shown below.

Swelling ratio=(Swelled weight/dry sample weight−1)*100%

TABLE 6

Swelling ratio of poly(1,6-heptadiyne) under different conditions.

| Entry | Monomer concentration | Monomer: Catalyst ratio | Appearance | Swelling ratio |
| --- | --- | --- | --- | --- |
| 1 | 2.5M | 4000:1 | Black brittle film | 30% |
| 2 | 2.0M | 4000:1 | Black brittle film | 98% |
| 3 | 2.0M | 10000:1 | Black brittle film | 38% |
| 4 | 1.0M | 4000:1 | Black brittle film | 61% |
| 5 | 0.5M | 4000:1 | Black brittle film | 37% |

A crosslinked polymer can absorb solvent to swell, and the swelling ratio depends on the crosslinking density (Nandi et al., *Macromolecules*, 38(10), 4447-4455). Table 6 lists the results from the poly(1,6-heptadiyne) swelling study. Based on the proposed polymerization mechanism, higher initial monomer concentration can produce polymers with a higher crosslink density. However, based on entry 1, 2, 4 and 5, different initial monomer concentrations did not affect the swelling ratio, and the results seemed random. Conductivity was not able to be obtained since the doped film was too brittle.

Example 3—Synthesis of Functionalized Cyclic Polymers from 4-Ethynylphenylboronic Acid Pinacol Ester Synthesis of Cyclic Poly(4-ethynylphenylboronic Acid Pinacol Ester)

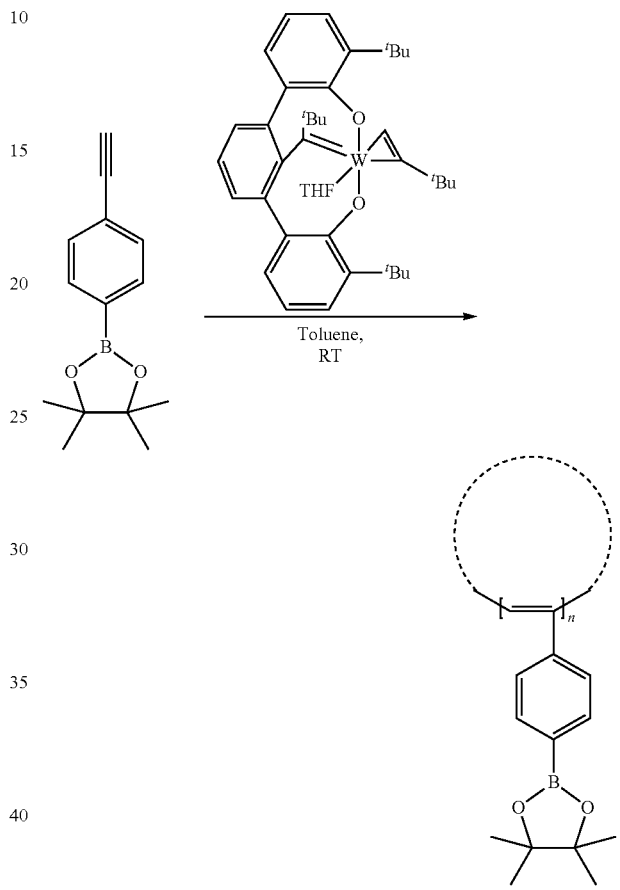

In inert atmosphere glovebox, 50 mg of 4-ethynylphenylboronic acid pinacol ester (0.22 mmol) was added to 2 ml toluene in a glass vial equipped with a stir bar. A stock solution of (10 mg/ml) of catalyst was added into the stirring solution in one shot to initiate polymerization (monomer: initiator=100:1). The solution turned from yellow to orange immediately, followed by red after stirring for 1 minute. An increase in viscosity of the solution was observed which indicated the formation of high molecular weight polymers. After stirring for 2 hours, the reaction was quenched by dropwise adding the reaction solution to tenfold excess of stirring degassed methanol in a beaker. Vacuum filtration followed which yielded a bright orange polymer in 92% yield. The broadness of the peaks in $^1$H NMR spectra indicated the successful formation of the polymer. The $^1$H NMR spectra of poly(4-ethynylphenylboronic acid pinacol ester) in $CDCl_3$ at 25° C. exhibited broad resonances centered at 7.45 ppm (Ar—H, 2H), 6.53 ppm (Ar—H, 2H), 5.83 ppm (=CH, 1H), and 1.26 ppm ($CH_3$, 12H). Further, the presence of a proton resonance at 5.83 ppm indicated the presence of the olefinic protons in the polyene polymer backbone. The isolated polymer was characterized by gel-permeation chromatography (GPC) coupled with static-light scattering (SLS) which revealed the molecular weight of the polymer molecular weight ($M_n$) as 92,540 g/mol, and dispersity (Đ) of 1.34. The same synthetic protocol was successfully extended to different monomer:initiator ratios (50:1, 200:1, 400:1, 500:1) to give rise to the desired polymer with molecular weight ($M_n$) ranging from 49,880 g/mol to 74,210 g/mol and dispersity (Đ) below 1.4. The molecular weights and dispersity values are provided below in Table 7. The isolated polymers under all reaction conditions were found to be freely soluble in chloroform and tetrahydrofuran indicating absence of unwanted cross-linking of the polymers during course of polymerization.

TABLE 7

| Monomer: Initiator | $M_n$ (g/mol) | PDI (Đ) |
|---|---|---|
| 50:1 | 49,880 | 1.43 |
| 100:1 | 92,540 | 1.34 |
| 200:1 | 45,960 | 1.33 |
| 400:1 | 66,620 | 1.42 |
| 500:1 | 74,210 | 1.30 |

Synthesis of Cyclic poly(4-ethynylphenylboronic Acid)

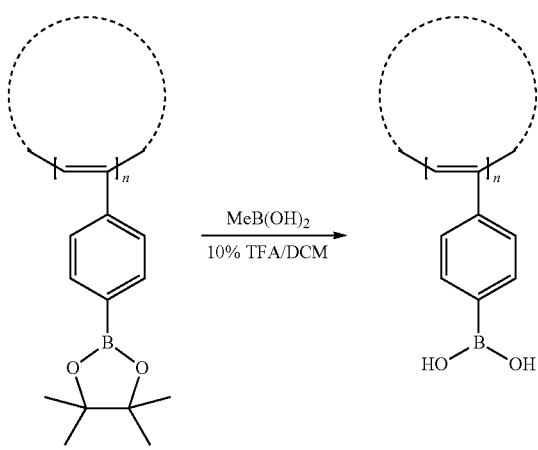

50 mg of cyclic poly(4-ethynylphenylboronic acid pinacol ester) (0.22 mmol) and methyl boronic acid (2.2 mmol, 130 mg) were dissolved in 1 ml of dichloromethane (DCM) in a glass vial, and trifluoroacetic acid (TFA) (10% in dichloromethane, 0.1 ml) was added to the reaction solution. Immediate color change from red to black was observed upon addition of trifluoroacetic acid. The reaction solution was stirred overnight (about 12 hours) at 25° C. The resulting product was purified by diluting the reaction solution with dichloromethane (5 ml) followed by evaporation at 40° C. Drying the product under vacuum yielded a dark brown solid in 90% yield. The isolated product was found to be insoluble in common organic solvents like chloroform, dimethyl sulfoxide, and water which limited the characterization of the product by 1H NMR. However, the product was found to be readily soluble in water in presence of potassium hydroxide (10%). This indicates the deprotonation of the boronic acid to boronate ions leading to the generation of a water-soluble cyclic polymer. The presence of the boronate ions was confirmed by adding a bifunctional diol crosslinker (i.e., diglycerol) to the cyclic polymer solution in water, leading to the generation of a boronate ester crosslinked cyclic polymer hydrogel, as shown in the following scheme:

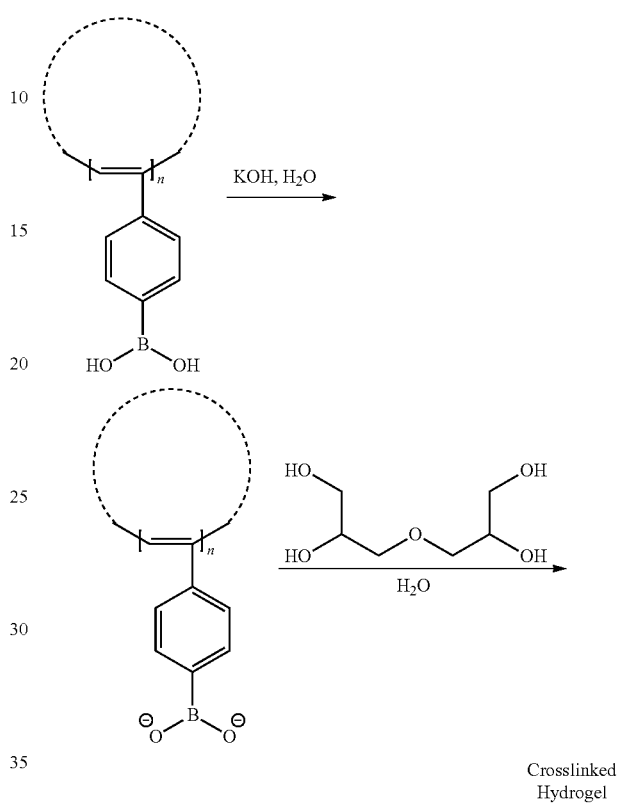

Boronate ester linkages are reported to be dynamic in nature, thus these hydrogels are expected to be dynamic in nature.

Thus example three demonstrates the preparation of a functionalized cyclic polymer comprising a boron containing functional group capable of further reacting, e.g., with a crosslinker, to form a modified polymer, according to methods of the disclosure.

What is claimed:

1. A method of preparing a functionalized cyclic polymer comprising:

reacting a metal-alkylidyne compound, metallacycloalkylene compound, or metallacyclopentadiene compound with a plurality of alkynes to form the functionalized cyclic polymer, wherein at least one alkyne comprises a functional group capable of further reacting to form a modified polymer, wherein the functional group comprises an alkyne and at least one alkyne comprises a dialkyne with a $C_{2-5}$ alkylene between the two alkyne groups.

2. The method of claim 1, wherein the plurality of alkynes further comprises at least one alkyne comprising a functional group capable of further reacting to form a modified polymer, wherein the functional group comprises a heteroatom or an alkene.

3. The method of claim 1, wherein the functional group is on a phenyl or naphthyl group.

4. The method of claim 1, wherein the metal-alkylidyne compound has a structure represented by formula (III) or formula (IV):

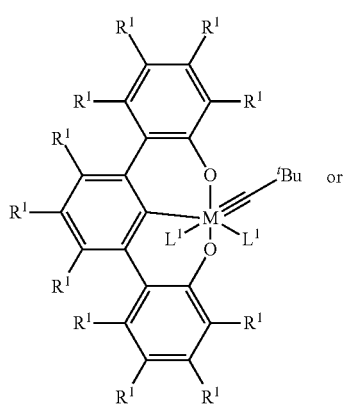

(III)

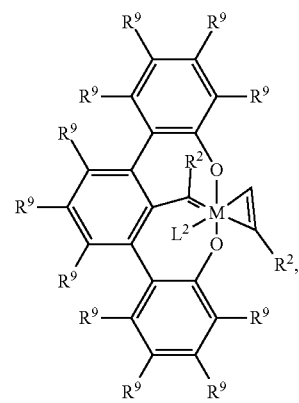

(IV)

M is a group 5-7 transition metal;

each $R^1$ is independently H, $C_1$-$C_{20}$ alkyl, secondary amino, halo, or $C_1$-$C_{22}$ haloalkyl, or two adjacent $R^1$, together with the carbon atoms to which they are attached, form a five- to eight-member cyclic group; and each $L^1$ is independently absent or a neutral ligand;

each $R^9$ is independently H, $C_1$-$C_{20}$ alkyl, secondary amino, halo, $C_1$-$C_{22}$ haloalkyl, or two adjacent $R^9$, together with the carbon atoms to which they are attached, form a five- to eight-member cyclic group;

each $R^2$ is selected from $Ar^1$, $C_1$-$C_{22}$ alkyl, halo, $C_1$-$C_{22}$ haloalkyl, H, —N—($C_1$-$C_{22}$ alkyl)$_2$, —NAr$^1$$_2$, —O—($C_1$-$C_{22}$ alkyl), and $(R^3)_3$—Si—;

$L^2$ is absent or a neutral ligand;

$Ar^1$ is independently aryl or heteroaryl, wherein the heteroaryl is a 5-12 membered aromatic ring comprising from 1 to 4 heteroatoms selected from O, N, and S;

each occurrence of $R^3$ is independently $C_1$-$C_{22}$ alkyl, $Ar^1$—O—($C_1$-$C_{22}$ alkyl), —O—$Ar^1$, —N—($C_1$-$C_{22}$)$_2$ alkyl, or —N—$Ar^1$$_2$.

5. The method of claim 1, wherein the metallacyclopentadiene compound has a structure according to formula (V):

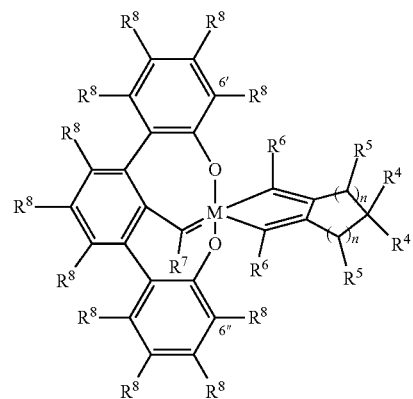

(V)

wherein M is a transition metal;

each $R^8$ is independently H, $C_1$-$C_{20}$ alkyl, secondary amino, halo, or $C_1$-$C_{22}$ haloalkyl, or two adjacent $R^8$, together with the carbon atoms to which they are attached, form a five- to eight-member cyclic group;

$R^7$ is selected from $Ar^3$, $C_1$-$C_{22}$ alkyl, halo, $C_1$-$C_{22}$ haloalkyl, H, —N—($C_1$-$C_{22}$ alkyl)$_2$, —NAr$^3$$_2$, —O—$Ar^3$, —O—($C_1$-$C_{22}$ alkyl), and $(R^{10})_3$—Si—;

each $R^4$ is independently $C_1$-$C_{22}$ alkyl or both $R^4$ together with the carbon atom to which they are attached form a spiro five- to eight-member monocyclic group or a spiro eleven- to thirty-member polycyclic group;

each $R^5$ is independently H, $C_1$-$C_{22}$ alkyl, —N—($C_1$-$C_{22}$ alkyl)$_2$, —NAr$^3$$_2$, —O—$Ar^3$, - or —O—($C_1$-$C_{22}$ alkyl);

each n is independently 1, 2, 3, 4, or 5;

each $R^6$ is independently H, $C_1$-$C_3$ alkyl, halide, —N—($C_1$-$C_3$ alkyl)$_2$, —NAr$^3$$_2$, —O—$Ar^3$—O—($C_1$-$C_3$ alkyl), —S—$Ar^3$, —S—($C_1$-$C_3$ alkyl);

each $R^{10}$ is independently selected from $C_1$-$C_{22}$ alkyl, $Ar^3$, —O—($C_1$-$C_{22}$ alkyl), —O—$Ar^3$, —N($C_1$-$C_{22}$ alkyl)$_2$ or —NAr$^3$$_2$ and each $Ar^3$ is independently an aryl or heteroaryl, wherein the heteroaryl is a 5-12 membered aromatic ring comprising from 1 to 4 heteroatoms selected from O, N, and S.

6. The method of claim 1, further comprising hydrogenating the functionalized cyclic polymer.

7. A stereoregular functionalized cyclic polymer prepared by the method according to claim 1.

8. A cyclic polymer, the cyclic polymer comprising a cyclic polymer backbone and a ring structure on the polymer backbone.

9. The cyclic polymer of claim 8, wherein the cyclic polymer comprises a plurality of ring structures on the polymer backbone.

10. They cyclic polymer of claim 8, wherein the ring structure comprises a cycloalkyl, a heterocycloalkyl, an aryl, a heteroaryl, a cycloalkenyl, a heterocycloalkenyl, or a combination thereof.

11. A method of preparing a functionalized cyclic polymer comprising:

reacting a metal-alkylidyne compound, metallacycloalkylene compound, or metallacyclopentadiene compound with a plurality of alkynes to form the functionalized cyclic polymer, wherein at least one alkyne comprises a functional group capable of further reacting to form a modified polymer and wherein the at least one alkyne comprising a functional group capable of further reacting comprises at least one alkyne selected from the group consisting of 4-ethynylanisole, 4-ethynylbenzoic acid methyl ester, 2-ethynylthiophene, 1-ethynyl-4-(trifluoromethyl)benzene, 4-ethynyl-N,N-dimethylaniline, ethoxyethyne, hexa-1,5-diyne, and 4,4-dimethylhepta-1,6-diyne.

12. The method of claim 11, wherein the metal-alkylidyne compound has a structure represented by formula (III) or formula (IV):

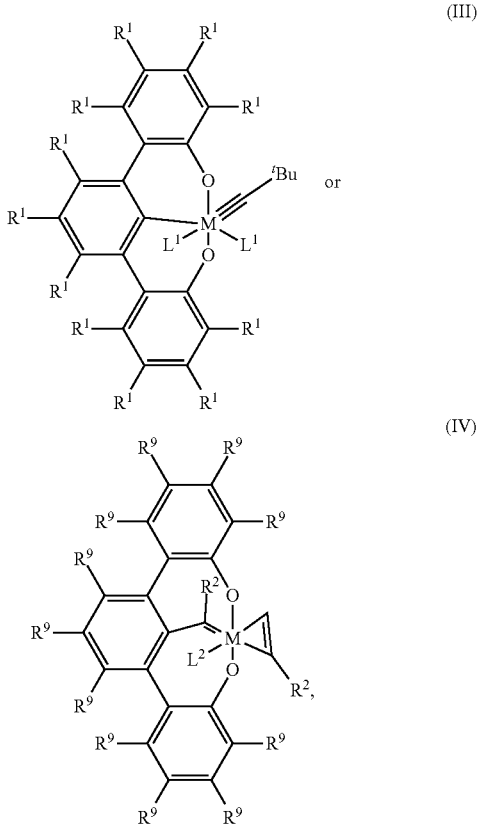

M is a group 5-7 transition metal;
each $R^1$ is independently H, $C_1$-$C_{20}$ alkyl, secondary amino, halo, or $C_1$-$C_{22}$ haloalkyl, or two adjacent $R^1$, together with the carbon atoms to which they are attached, form a five- to eight-member cyclic group; and
each $L^1$ is independently absent or a neutral ligand;
each $R^9$ is independently H, $C_1$-$C_{20}$ alkyl, secondary amino, halo, $C_1$-$C_{22}$ haloalkyl, or two adjacent $R^9$, together with the carbon atoms to which they are attached, form a five- to eight-member cyclic group;
each $R^2$ is selected from $Ar^1$, $C_1$-$C_{22}$ alkyl, halo, $C_1$-$C_{22}$ haloalkyl, H, $C_{22}$ alkyl), —$NAr^1_2$, —O—($C_1$-$C_{22}$ alkyl), and $(R^3)_3$—Si—;
$L^2$ is absent or a neutral ligand;
$Ar^1$ is independently aryl or heteroaryl, wherein the heteroaryl is a 5-12 membered aromatic ring comprising from 1 to 4 heteroatoms selected from O, N, and S;

each occurrence of $R^3$ is independently $C_1$-$C_{22}$ alkyl, $Ar^1$—O—($C_1$-$C_{22}$ alkyl), —O—$Ar^1$, —N—($C_1$-$C_{22}$)$_2$ alkyl, or —N—$Ar^1_2$.

13. The method of claim 11, wherein the metallacyclopentadiene compound has a structure according to formula (V):

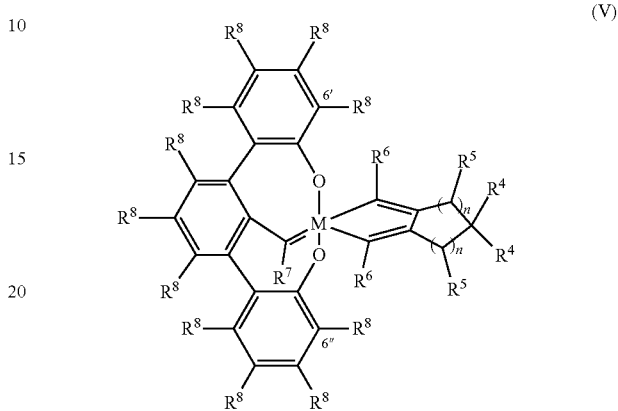

wherein M is a transition metal;
each $R^8$ is independently H, $C_1$-$C_{20}$ alkyl, secondary amino, halo, or $C_1$-$C_{22}$ haloalkyl, or two adjacent $R^8$, together with the carbon atoms to which they are attached, form a five- to eight-member cyclic group;
$R^7$ is selected from $Ar^3$, $C_1$-$C_{22}$ alkyl, halo, $C_1$-$C_{22}$ haloalkyl, H, —N—($C_1$-$C_{22}$ alkyl)$_2$, —$NAr^3_2$, —O—$Ar^3$, —O—($C_1$-$C_{22}$ alkyl), and $(R^{10})_3$—Si—;
each $R^4$ is independently $C_1$-$C_{22}$ alkyl or both $R^4$ together with the carbon atom to which they are attached form a spiro five- to eight-member monocyclic group or a spiro eleven- to thirty-member polycyclic group;
each $R^5$ is independently H, $C_1$-$C_{22}$ alkyl, —N—($C_1$-$C_{22}$ alkyl)$_2$, —$NAr^3_2$, —O—$Ar^3$, - or —O—($C_1$-$C_{22}$ alkyl);
each n is independently 1, 2, 3, 4, or 5;
each $R^6$ is independently H, $C_1$-$C_3$ alkyl, halide, —N—($C_1$-$C_3$ alkyl)$_2$, —$NAr^3_2$, —O—$Ar^3$—O—($C_1$-$C_3$ alkyl), —S—$Ar^3$, —S—($C_1$-$C_3$ alkyl);
each $R^{10}$ is independently selected from $C_1$-$C_{22}$ alkyl, $Ar^3$, —O—($C_1$-$C_{22}$ alkyl), —O—$Ar^3$, —N($C_1$-$C_{22}$ alkyl)$_2$ or —$NAr^3_2$ and
each $Ar^3$ is independently an aryl or heteroaryl, wherein the heteroaryl is a 5-12 membered aromatic ring comprising from 1 to 4 heteroatoms selected from O, N, and S.

14. The method of claim 11, further comprising hydrogenating the functionalized cyclic polymer.

15. A stereoregular functionalized cyclic polymer prepared by the method according to claim 11.

16. A method of preparing a functionalized cyclic polymer comprising:
reacting a metal-alkylidyne compound, metallacycloalkylene compound, or metallacyclopentadiene compound with a plurality of alkynes to form the functionalized cyclic polymer, wherein at least one alkyne comprises a functional group capable of further reacting to form a modified polymer and wherein the at least one alkyne comprising a functional group capable of further reacting comprises alkynes having a structure according to formula (I):

$$R=R^a-X \qquad (I),$$

wherein R is selected from H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_8$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl wherein the heteroaryl is a 5-12 membered aromatic ring comprising 1 to 4 heteroatoms selected from O, N, and S, and $C_0$-$C_6$alkylene-N$R^b{}_2$;

$R^a$ is selected from a bond, $(O)_{0-1}C_1$-$C_{20}$alkylene, $(O)_{0-1}C_2$-$C_{20}$alkenylene, $(O)_{0-1}C_2$-$C_{20}$alkynylene, $(O)_{0-1}C_0$-$C_6$alkylene-$C_5$-$C_{20}$cycloalkylene, $(O)_{0-1}C_0$-$C_6$alkylene-$C_5$-$C_{20}$cycloalkenylene, $(O)_{0-1}C_0$-$C_6$alkylene-$C_8$-$C_{20}$cycloalkynylene, $(O)_{0-1}C_1$-$C_{20}$heteroalkylene comprising 1 to 5 heteroatoms selected from O, N, and S, $(O)_{0-1}C_2$-$C_{20}$heteroalkenylene comprising 1 to 5 heteroatoms selected from O, N, and S, $(O)_{0-1}C_0$-$C_6$alkylene-5-20 membered heterocycloalkylene comprising 1 to 4 ring heteroatoms selected from O, N, and S, $(O)_{0-1}C_0$-$C_6$alkylene-5-20 membered heterocycloalkenylene comprising 1 to 4 ring heteroatoms selected from O, N, and S, $(O)_{0-1}C_0$-$C_6$alkylene-arylene, $(O)_{0-1}C_0$-$C_6$alkylene-heteroarylene, wherein the heteroarylene is a 5-12 membered aromatic ring comprising 1 to 4 ring heteroatoms selected from O, N, and S, and $C_0$-$C_6$alkylene-N$R^b$—;

each $R^b$ is independently selected from $C_1$-$C_{20}$alkyl, $C_2$-$C_{20}$alkenyl, $C_0$-$C_6$alkylene-$C_6$-$C_{20}$cycloalkyl, $C_0$-$C_6$alkylene-$C_6$-$C_{20}$cycloalkenyl, $C_1$-$C_{20}$heteroalkyl comprising 1 to 5 heteroatoms selected from O, N, and S, $SO_2C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_6$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 4 heteroatoms selected from O, N, and S; and X comprises H, halo, $C_1$-$C_{20}$alkoxy, phosphine, phosphito, phosphinito, phosphonito, secondary amino, beryl, lithium, or magnesium;

with the proviso that none of R, $R^a$, and $R^b$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

17. The method of claim 16, wherein the metal-alkylidyne compound has a structure represented by formula (III) or formula (IV):

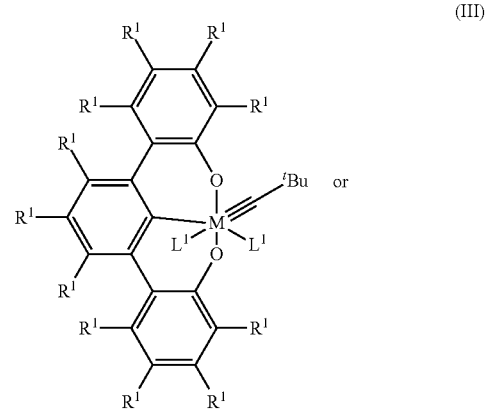

(III)

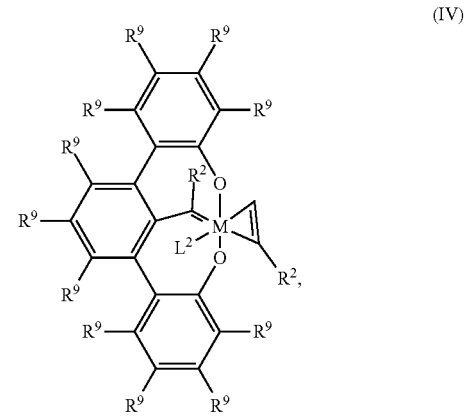

(IV)

M is a group 5-7 transition metal;

each $R^1$ is independently H, $C_1$-$C_{20}$ alkyl, secondary amino, halo, or $C_1$-$C_{22}$ haloalkyl, or two adjacent $R^1$, together with the carbon atoms to which they are attached, form a five- to eight-member cyclic group; and each $L^1$ is independently absent or a neutral ligand;

each $R^9$ is independently H, $C_1$-$C_{20}$ alkyl, secondary amino, halo, $C_1$-$C_{22}$ haloalkyl, or two adjacent $R^9$, together with the carbon atoms to which they are attached, form a five- to eight-member cyclic group;

each $R^2$ is selected from $Ar^1$, $C_1$-$C_{22}$ alkyl, halo, $C_1$-$C_{22}$ haloalkyl, H, $C_{22}$ alkyl)$_2$, —$NAr^1{}_2$, —O—($C_1$-$C_{22}$ alkyl), and $(R^3)_3$—Si—;

$L^2$ is absent or a neutral ligand;

$Ar^1$ is independently aryl or heteroaryl, wherein the heteroaryl is a 5-12 membered aromatic ring comprising from 1 to 4 heteroatoms selected from O, N, and S;

each occurrence of $R^3$ is independently $C_1$-$C_{22}$ alkyl, $Ar^1$—O—($C_1$-$C_{22}$ alkyl), —O—$Ar^1$, —N—($C_1$-$C_{22}$)$_2$ alkyl, or —N—$Ar^1{}_2$.

18. The method of claim 16, wherein the metallacyclopentadiene compound has a structure according to formula (V):

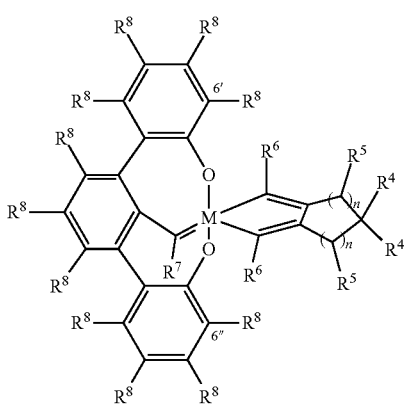

(V)

wherein M is a transition metal;

each $R^8$ is independently H, $C_1$-$C_{20}$ alkyl, secondary amino, halo, or $C_1$-$C_{22}$ haloalkyl, or two adjacent $R^8$, together with the carbon atoms to which they are attached, form a five- to eight-member cyclic group;

$R^7$ is selected from $Ar^3$, $C_1$-$C_{22}$ alkyl, halo, $C_1$-$C_{22}$ haloalkyl, H, —N—($C_1$-$C_{22}$ alkyl)$_2$, —$NAr^3{}_2$, —O—$Ar^3$, —O—($C_1$-$C_{22}$ alkyl), and $(R^{10})_3$—Si—;

each $R^4$ is independently $C_1$-$C_{22}$ alkyl or both $R^4$ together with the carbon atom to which they are attached form a spiro five- to eight-member monocyclic group or a spiro eleven- to thirty-member polycyclic group;

each $R^5$ is independently H, $C_1$-$C_{22}$ alkyl, —N—($C_1$-$C_{22}$ alkyl)$_2$, —$NAr^3{}_2$, —O—$Ar^3$, - or —O—($C_1$-$C_{22}$ alkyl);

each n is independently 1, 2, 3, 4, or 5;

each $R^6$ is independently H, $C_1$-$C_3$ alkyl, halide, —N—($C_1$-$C_3$ alkyl)$_2$, —$NAr^3{}_2$, —O—$Ar^3$—O—($C_1$-$C_3$ alkyl), —S—$Ar^3$, —S—($C_1$-$C_3$ alkyl);

each $R^{16}$ is independently selected from $C_1$-$C_{22}$ alkyl, $Ar^3$, —O—($C_1$-$C_{22}$ alkyl), —O—$Ar^3$, —N($C_1$-$C_{22}$ alkyl)$_2$ or —$NAr^3{}_2$ and each $Ar^3$ is independently an aryl or heteroaryl, wherein the heteroaryl is a 5-12 membered aromatic ring comprising from 1 to 4 heteroatoms selected from O, N, and S.

19. The method of claim 16, further comprising hydrogenating the functionalized cyclic polymer.

20. A stereoregular functionalized cyclic polymer prepared by the method according to claim 16.

21. A method of preparing a functionalized cyclic polymer comprising:

reacting a metal-alkylidyne compound, metallacycloalkylene compound, or metallacyclopentadiene compound with a plurality of alkynes to form the functionalized cyclic polymer, wherein at least one alkyne comprises a functional group capable of further reacting to form a modified polymer and wherein the at least one alkyne comprising a functional group capable of further reacting comprises alkynes having a structure according to formula (II):

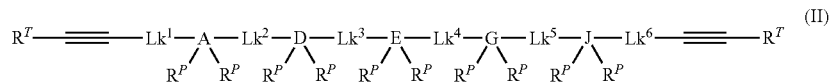

(II)

wherein
each $R^T$ independently is selected from the group consisting of H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_8$-$C_{20}$cycloalkynyl, $C_1$-$C_{20}$heteroalkyl comprising 1 to 5 heteroatoms selected from O, N, and S, $C_1$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O-aryl, $C_0$-$C_6$alkylene-O-heteroaryl wherein the heteroaryl is a 5-12 membered aromatic ring comprising 1 to 4 heteroatoms selected from O, N, and S, and $C_0$-$C_6$alkylene-$NR^c_2$;

A is carbon (C), nitrogen (N), oxygen (O), sulfur (S), —$((CH_2)_nO)_{1\text{-}20}$—, —$((CH_2)_mHN)_{1\text{-}20}$—, or $Ar^2$;

each of D, E, G, and J are independently selected from null, carbon (C), nitrogen (N), oxygen (O), sulfur (S), —$((CH_2)_nO)_{1\text{-}20}$—, —$((CH_2)_mHN)_{1\text{-}20}$—, and $Ar^2$;

n is 1, 2, 3, 4, or 5;

m is 1, 2, 3, 4, or 5;

$Ar^2$ is selected from the group consisting of phenylene, naphthalene, anthracene, fluorene, phenalene, phenanthrene, chrysene, fluoranthene, pyrene, tetracene, benzopyrene, perylene, tetraphenylene, anthanthrene, zethrene, a derivative of any of the foregoing wherein 1 to 5 carbon atoms have been replaced with O, S, or N, or a substituted variation of any of the foregoing;

each $R^P$ is independently selected from null, H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_5$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl, wherein the heteroaryl is a 5-12 membered aromatic ring comprising 1 to 5 heteroatoms selected from O, N, and S, and $C_0$-$C_6$alkylene-$NR^c_2$, or both $R^P$ together with the atom to which they are attached form a spiro five- to thirty-membered monocyclic or polycyclic group comprising 0 to 5 ring heteroatoms selected from N, O, and S;

each $R^c$ is independently selected from H, $C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 5 heteroatoms selected from O, N, and S; and each of $Lk^1$, $Lk^2$, $Lk^3$, $Lk^4$, $Lk^5$, and $Lk^6$ are independently $C_{0\text{-}10}$alkylene;

with the proviso that none of $R^T$, $R^P$, $R^C$ and $Ar^2$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

22. The method of claim 21, wherein the metal-alkylidyne compound has a structure represented by formula (III) or formula (IV):

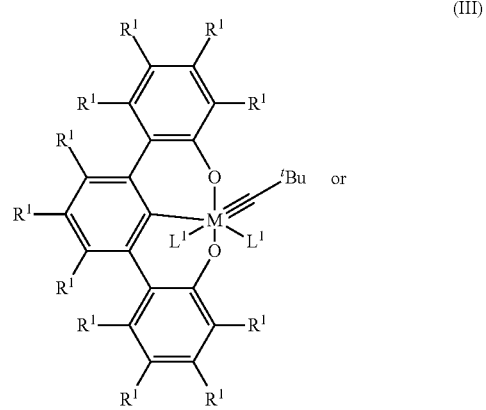

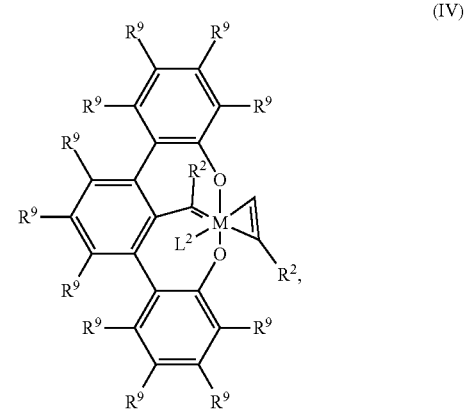

M is a group 5-7 transition metal;
each $R^1$ is independently H, $C_1$-$C_{20}$ alkyl, secondary amino, halo, or $C_1$-$C_{22}$ haloalkyl, or two adjacent $R^1$, together with the carbon atoms to which they are attached, form a five- to eight-member cyclic group; and each $L^1$ is independently absent or a neutral ligand;
each $R^9$ is independently H, $C_1$-$C_{20}$ alkyl, secondary amino, halo, $C_1$-$C_{22}$ haloalkyl, or two adjacent $R^9$, together with the carbon atoms to which they are attached, form a five- to eight-member cyclic group;
each $R^2$ is selected from $Ar^1$, $C_1$-$C_{22}$ alkyl, halo, $C_1$-$C_{22}$ haloalkyl, H, —N—($C_1$-$C_{22}$ alkyl)$_2$, —NAr$^1_2$, —O—($C_1$-$C_{22}$ alkyl), and ($R^3$)$_3$—Si—;
$L^2$ is absent or a neutral ligand;
$Ar^1$ is independently aryl or heteroaryl, wherein the heteroaryl is a 5-12 membered aromatic ring comprising from 1 to 4 heteroatoms selected from O, N, and S;
each occurrence of $R^3$ is independently $C_1$-$C_{22}$ alkyl, $Ar^1$—O—($C_1$-$C_{22}$ alkyl), —O—$Ar^1$, —N—($C_1$-$C_{22}$)$_2$ alkyl, or —N—$Ar^1_2$.

23. The method of claim 21, wherein the metallacyclopentadiene compound has a structure according to formula (V):

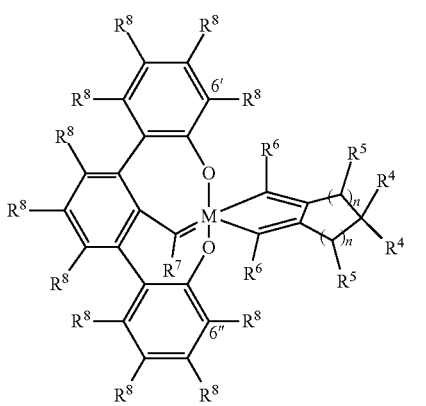

(V)

wherein M is a transition metal;
each $R^8$ is independently H, $C_1$-$C_{20}$ alkyl, secondary amino, halo, or $C_1$-$C_{22}$ haloalkyl, or two adjacent $R^8$, together with the carbon atoms to which they are attached, form a five- to eight-member cyclic group;
$R^7$ is selected from AO, $C_1$-$C_{22}$ alkyl, halo, $C_1$-$C_{22}$ haloalkyl, H, —N—($C_1$-$C_{22}$ alkyl)$_2$, —NAr$^3_2$, —O—($C_1$-$C_{22}$ alkyl), and ($R^{10}$)$_3$—Si—;
each $R^4$ is independently $C_1$-$C_{22}$ alkyl or both $R^4$ together with the carbon atom to which they are attached form a spiro five- to eight-member monocyclic group or a spiro eleven- to thirty-member polycyclic group;
each $R^5$ is independently H, $C_1$-$C_{22}$ alkyl, —N—($C_1$-$C_{22}$ alkyl)$_2$, —NAr$^3_2$, —O—$Ar^3$, - or —O—($C_1$-$C_{22}$ alkyl);
each n is independently 1, 2, 3, 4, or 5;
each $R^6$ is independently H, $C_1$-$C_3$ alkyl, halide, —N—($C_1$-$C_3$ alkyl)$_2$, —NAr$^3_2$, —O—$Ar^3$—O—($C_1$-$C_3$ alkyl), —S—$Ar^3$, —S—($C_1$-$C_3$ alkyl);
each $R^{10}$ is independently selected from $C_1$-$C_{22}$ alkyl, $Ar^3$, —O—($C_1$-$C_{22}$ alkyl), —O—$Ar^3$, —N($C_1$-$C_{22}$ alkyl)$_2$ or —NAr$^3_2$ and each $Ar^3$ is independently an aryl or heteroaryl, wherein the heteroaryl is a 5-12 membered aromatic ring comprising from 1 to 4 heteroatoms selected from O, N, and S.

24. The method of claim 21, further comprising hydrogenating the functionalized cyclic polymer.

25. A stereoregular functionalized cyclic polymer prepared by the method according to claim 21.

26. A method of preparing a functionalized cyclic polymer comprising:
reacting a metallacyclopentadiene compound with a plurality of alkynes to form the functionalized cyclic polymer,
wherein at least one alkyne comprises a functional group capable of further reacting to form a modified polymer and the metallacyclopentadiene compound has a structure according to formula (V):

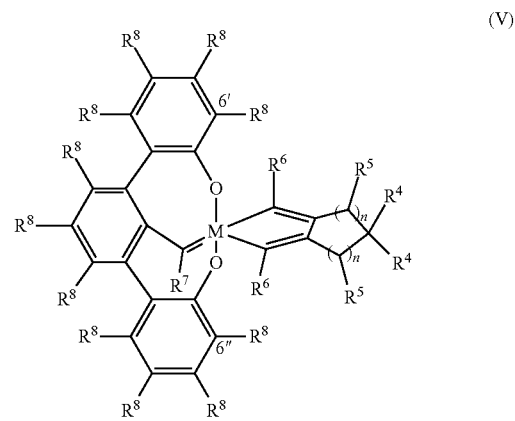

(V)

wherein M is a transition metal;
each $R^8$ is independently H, $C_1$-$C_{20}$ alkyl, secondary amino, halo, or $C_1$-$C_{22}$ haloalkyl, or two adjacent $R^8$, together with the carbon atoms to which they are attached, form a five- to eight-member cyclic group;
$R^7$ is selected from $Ar^3$, $C_1$-$C_{22}$ alkyl, halo, $C_1$-$C_{22}$ haloalkyl, H, —N—($C_1$-$C_{22}$ alkyl)$_2$, —NAr$^3_2$, —O—$Ar^3$, —O—($C_1$-$C_{22}$ alkyl), and ($R^{10}$)$_3$—Si—;
each $R^4$ is independently $C_1$-$C_{22}$ alkyl or both $R^4$ together with the carbon atom to which they are attached form a spiro five- to eight-member monocyclic group or a spiro eleven- to thirty-member polycyclic group;
each $R^5$ is independently H, $C_1$-$C_{22}$ alkyl, —N—($C_1$-$C_{22}$ alkyl)$_2$, —NAr$^3_2$, —O—$Ar^3$, - or —O—($C_1$-$C_{22}$ alkyl);
each n is independently 1, 2, 3, 4, or 5;
each $R^6$ is independently H, $C_1$-$C_3$ alkyl, halide, —N—($C_1$-$C_3$ alkyl)$_2$, —NAr$^3_2$, —O—$Ar^3$—O—($C_1$-$C_3$ alkyl), —S—$Ar^3$, —S—($C_1$-$C_3$ alkyl);
each $R^{10}$ is independently selected from $C_1$-$C_{22}$ alkyl, $Ar^3$, —O—($C_1$-$C_{22}$ alkyl), —O—$Ar^3$, —N($C_1$-$C_{22}$ alkyl)$_2$ or —NAr$^3_2$ and
each $Ar^3$ is independently an aryl or heteroaryl, wherein the heteroaryl is a 5-12 membered aromatic ring comprising from 1 to 4 heteroatoms selected from O, N, and S.

27. The method of claim 26, wherein the plurality of alkynes comprises a mixture of different alkynes.

28. The method of claim 26, wherein the functional group comprises a heteroatom, an alkene, or an alkyne.

29. The method of claim 28, wherein the functional group comprises a heteroatom selected from the group consisting of nitrogen (N), oxygen (O), sulfur (S), tin (Sn), boron (B), phosphorus (P), silicon (Si), chlorine (Cl), bromine (Br), iodine (I), fluorine (F), lithium (Li), magnesium (Mg), and combinations thereof, a halogen, an alkoxy, a tertiary amine, a silyl, a silyl ether, an ester, an alkene, an alkyne or a thioether.

30. The method of claim 26, wherein the functional group is on a phenyl or naphthyl group.

31. The method of claim 28, wherein the functional group comprises an alkyne and at least one alkyne comprises a dialkyne with a $C_{2-5}$alkylene between the two alkyne groups.

32. The method of claim 26, wherein the plurality of alkynes comprises at least one alkyne selected from the group consisting of propargyl bromide, propargyl chloride, 3-bromo-1-butyne, 4-bromo-1-butyne, methyl propargyl ether, 5-iodo-1-pentyne, 3-dimethylamino-1-propyne, ethynyltrimethylsilane, propargyl ether, 3-(allyloxy)-1-propyne, 1-iodo-1-hexyne, 6-iodo-1-hexyne, 1,4-dimethoxy-2-butyne, 3-bromo-1-(trimethylsilyl)-1-propyne, 3-trimethylsiloxy-1-propyne, 1-(trimethylsilyl)propyne, trimethyl(propargyl)silane, 3,3-diethoxy-1-propyne, 3-(trimethylsilyloxy)-1-butyne, 3,4-dichlorophenylacetylene, 3,4-difluorophenylacetylene, (bromoethynyl)benzene, (chloroethynyl)benzene, (iodoethynyl)benzene, [(1,1-dimethyl-2-propynyl)oxy]trimethylsilane, (tert-butyldimethylsilyl)acetylene, (triethylsilyl)acetylene, 1-(trimethylsilyl)-1-pentyne, 1-dimethylamino-3-(trimethylsilyl)-2-propyne, bis(trimethylsilyl)acetylene, 4-(trifluoromethoxy)phenylacetylene, (3-bromo-1-propynyl) benzene, 2-ethynyltoluene, 3-ethynyltoluene, 2-ethynylanisole, 3-ethynylanisole, 4-ethynylanisole, phenyl propargyl ether, tripropargylamine, tert-butyldimethyl(2-propynyloxy)silane, 1-trimethylsilyl-1-hexyne, 1-ethynyl-4-methoxy-2-methylbenzene, 1-ethynyl-3,5-dimethoxybenzene, 4-ethynyl-N,N-dimethylaniline, (dimethylphenylsilyl)acetylene, 1,4-bis(trimethylsilyl)butadiyne, 2-tert-butyldimethylsiloxybut-3-yne, 4-(tert-butyldimethylsilyloxy)-1-butyne, N-methyl-N-propargylbenzylamine, 1-phenyl-2-trimethylsilylacetylene, 1-chloro-5-triethylsilyl-1-pentyne, [(triisopropylsilyl)acetylene]sulfur pentafluoride, (triisopropylsilyl)acetylene, (3-methoxyphenylethynyl)trimethylsilane, (4-methoxyphenylethynyl)trimethylsilane, 2-[(trimethylsilyl)ethynyl]toluene, 1-(triisopropylsilyl)-1-propyne, 2-ethynyl-6-methoxynaphthalene, 1-[(trimethylsilylpethynyl]-3,5-dimethoxybenzene, 1-ethynyl-4-phenoxybenzene, (methyldiphenylsilyl)acetylene, 1-(1-naphthyl)-2-(trimethylsilyl)acetylene, (6-methoxynaphthalen-2-ylethynyl)trimethylsilane, 1,4-bis[(trimethylsilypethynyl]benzene, 1,6-diphenoxy-2,4,-hexadiyne, (triphenylsilyl)acetylene, 1-ethynyl-4-(trifluoromethyl)benzene, 4-ethynyl-N,N-dimethylaniline, 2-(ethynyloxy)-2-methoxypropane, and N,N-dimethylethynamine.

33. The method of claim 26, wherein the plurality of alkynes comprises at least one alkyne selected from the group consisting of 4-ethynylanisole, 4-ethynylbenzoic acid methyl ester, 2-ethynylthiophene, 1-ethynyl-4-(trifluoromethyl)benzene, 4-ethynyl-N,N-dimethylaniline, ethoxyethyne, hexa-1,5-diyne, and 4,4-dimethylhepta-1,6-diyne.

34. The method of claim 26, wherein the plurality of alkynes comprise alkynes having a structure according to formula (I):

wherein R is selected from H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_8$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl wherein the heteroaryl is a 5-12 membered aromatic ring comprising 1 to 4 heteroatoms selected from O, N, and S, and $C_0$-$C_6$alkylene-NR$^b_2$;

$R^a$ is selected from a bond, $(O)_{0-1}C_1$-$C_{20}$alkylene, $(O)_{0-1}C_2$-$C_{20}$alkenylene, $(O)_{0-1}C_2$-$C_{20}$alkynylene, $(O)_{0-1}C_0$-$C_6$alkylene-$C_5$-$C_{20}$cycloalkylene, $(O)_{0-1}C_0$-$C_6$alkylene-$C_5$-$C_{20}$cycloalkenylene, $(O)_{0-1}C_0$-$C_6$alkylene-$C_5$-$C_{20}$cycloalkynylene, $(O)_{0-1}C_1$-$C_{20}$heteroalkylene comprising 1 to 5 heteroatoms selected from O, N, and S, $(O)_{0-1}C_2$-$C_{20}$heteroalkenylene comprising 1 to 5 heteroatoms selected from O, N, and S, $(O)_{0-1}C_0$-$C_6$alkylene-5-20 membered heterocycloalkylene comprising 1 to 4 ring heteroatoms selected from O, N, and S, $(O)_{0-1}C_0$-$C_6$alkylene-5-20 membered heterocycloalkenylene comprising 1 to 4 ring heteroatoms selected from O, N, and S, $(O)_{0-1}C_0$-$C_6$alkylene-arylene, $(O)_{0-1}C_0$-$C_6$alkylene-heteroarylene, wherein the heteroarylene is a 5-12 membered aromatic ring comprising 1 to 4 ring heteroatoms selected from O, N, and S, and $C_0$-$C_6$alkylene-NR$^b$—;

each $R^b$ is independently selected from $C_1$-$C_{20}$alkyl, $C_2$-$C_{20}$alkenyl, $C_0$-$C_6$alkylene-$C_6$-$C_{20}$cycloalkyl, $C_0$-$C_6$alkylene-$C_6$-$C_{20}$cycloalkenyl, $C_1$-$C_{20}$heteroalkyl comprising 1 to 5 heteroatoms selected from O, N, and S, $SO_2C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_6$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 4 heteroatoms selected from O, N, and S; and X comprises H, halo, $C_1$-$C_{20}$alkoxy, phosphine, phosphito, phosphinito, phosphonito, secondary amino, beryl, lithium, or magnesium;

with the proviso that none of R, $R^a$, and $R^b$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

35. The method of claim 26, wherein the plurality of alkynes comprise alkynes having a structure according to formula (II):

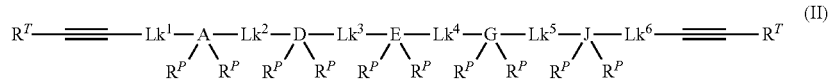

(II)

wherein each $R^T$ independently is selected from the group consisting of H, halo, $C_1$-$C_{20}$alkyl, $C_2$-$C_{20}$alkenyl, $C_2$-$C_{20}$alkynyl, $C_0$-$C_6$alkylene-$C_6$-$C_{20}$cycloalkyl, $C_0$-$C_6$alkylene-$C_6$-$C_{20}$cycloalkenyl, $C_0$-$C_6$alkylene-$C_8$-$C_{20}$cycloalkynyl, $C_1$-$C_{20}$heteroalkyl comprising 1 to 5 heteroatoms selected from O, N, and S, $C_1$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_6$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O-aryl, $C_0$-$C_6$alkylene-O-heteroaryl wherein the heteroaryl is a 5-12 membered aromatic ring comprising 1 to 4 heteroatoms selected from O, N, and S, and $C_0$-$C_6$alkylene-NR$^c$$_2$;

A is carbon (C), nitrogen (N), oxygen (O), sulfur (S), —$((CH_2)_nO)_{1-20}$—, $((CH_2)_mHN)_{1-20}$—, or $Ar^2$;

each of D, E, G, and J are independently selected from null, carbon (C), nitrogen (N), oxygen (O), sulfur (S), —$((CH_2)_nO)_{1-20}$—, —$((CH_2)_mHN)_{1-20}$—, and $Ar^2$;

n is 1, 2, 3, 4, or 5;

m is 1, 2, 3, 4, or 5;

$Ar^2$ is selected from the group consisting of phenylene, naphthalene, anthracene, fluorene, phenalene, phenanthrene, chrysene, fluoranthene, pyrene, tetracene, benzopyrene, perylene, tetraphenylene, anthanthrene, zethrene, a derivative of any of the foregoing wherein 1 to 5 carbon atoms have been replaced with O, S, or N, or a substituted variation of any of the foregoing;

each $R^P$ is independently selected from null, H, halo, $C_1$-$C_{20}$alkyl, $C_2$-$C_{20}$alkenyl, $C_2$-$C_{20}$alkynyl, $C_0$-$C_6$alkylene-$C_6$-$C_{20}$cycloalkyl, $C_0$-$C_6$alkylene-$C_6$-$C_{20}$cycloalkenyl, $C_0$-$C_6$alkylene-$C_6$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_6$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl, wherein the heteroaryl is a 5-12 membered aromatic ring comprising 1 to 5 heteroatoms selected from O, N, and S, and $C_0$-$C_6$alkylene-NR$^c$$_2$, or both $R^P$ together with the atom to which they are attached form a spiro five- to thirty-membered monocyclic or polycyclic group comprising 0 to 5 ring heteroatoms selected from N, O, and S;

each $R^c$ is independently selected from H, $C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 5 heteroatoms selected from O, N, and S; and each of $Lk^1$, $Lk^2$, $Lk^3$, $Lk^4$, $Lk^5$, and $Lk^6$ are independently $C_{0-10}$alkylene;

with the proviso that none of $R^T$, $R^P$, $R^C$ and $Ar^2$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

36. The method of claim 26, further comprising hydrogenating the functionalized cyclic polymer.

37. A stereoregular functionalized cyclic polymer prepared by the method according to claim 26.

38. A method of preparing a functionalized cyclic polymer comprising:

reacting a metallacyclopentadiene compound with a plurality of alkynes to form the functionalized cyclic polymer, wherein at least one alkyne comprises a functional group capable of further reacting to form a modified polymer and the metallacyclopentadiene compound has a structure represented by a formula (5) or (6):

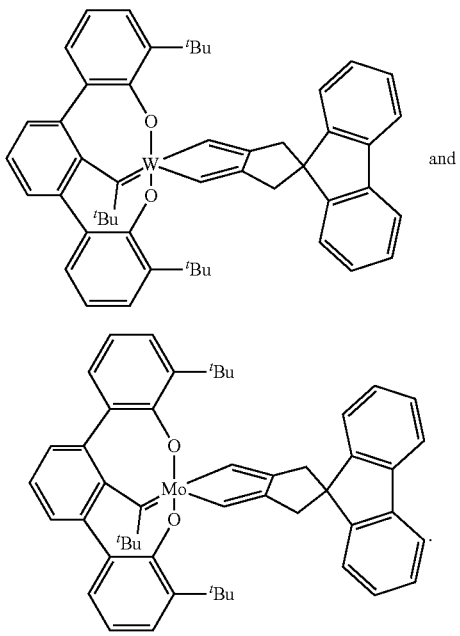

39. The method of claim 38, wherein the plurality of alkynes comprises a mixture of different alkynes.

40. The method of claim 38, wherein the functional group comprises a heteroatom, an alkene, or an alkyne.

41. The method of claim 40, wherein the functional group comprises a heteroatom selected from the group consisting of nitrogen (N), oxygen (O), sulfur (S), tin (Sn), boron (B), phosphorus (P), silicon (Si), chlorine (Cl), bromine (Br), iodine (I), fluorine (F), lithium (Li), magnesium (Mg), and combinations thereof, a halogen, an alkoxy, a tertiary amine, a silyl, a silyl ether, an ester, an alkene, an alkyne or a thioether.

42. The method of claim 38, wherein the functional group is on a phenyl or naphthyl group.

43. The method of claim 40, wherein the functional group comprises an alkyne and at least one alkyne comprises a dialkyne with a $C_{2-5}$alkylene between the two alkyne groups.

44. The method of claim 38, wherein the plurality of alkynes comprises at least one alkyne selected from the group consisting of propargyl bromide, propargyl chloride, 3-bromo-1-butyne, 4-bromo-1-butyne, methyl propargyl ether, 5-iodo-1-pentyne, 3-dimethylamino-1-propyne, ethynyltrimethylsilane, propargyl ether, 3-(allyloxy)-1-propyne, 1-iodo-1-hexyne, 6-iodo-1-hexyne, 1,4-dimethoxy-2-butyne, 3-bromo-1-(trimethylsilyl)-1-propyne, 3-trimethylsiloxy-1-propyne, 1-(trimethylsilyl)propyne, trimethyl (propargyl)silane, 3,3-diethoxy-1-propyne, 3-(trimethylsilyloxy)-1-butyne, 3,4-dichlorophenylacetylene, 3,4-difluorophenylacetylene, (bromoethynyl)benzene, (chloroethynyl)benzene, (iodoethynyl)benzene, [(1,1-dimethyl-2-propynyl)oxy]trimethylsilane, (tert-butyldimethylsilyl)acetylene, (triethylsilyl)acetylene, 1-(trimethylsilyl)-1-pentyne, 1-dimethylamino-3-(trimethylsilyl)-2-propyne, bis (trimethylsilyl)acetylene, 4-(trifluoromethoxy) phenylacetylene, (3-bromo-1-propynyl) benzene, 2-ethynyltoluene, 3-ethynyltoluene, 2-ethynylanisole, 3-ethynylanisole, phenyl propargyl ether, tripropargylamine, tert-butyldimethyl(2-propynyloxy)silane, 1-trimethylsilyl-1-hexyne, 1-ethynyl-4-methoxy-2-methylbenzene, 1-ethynyl-3,5-dimethoxybenzene, 4-ethynyl-N,N-dimethylaniline, (dimethylphenylsilyl)acetylene, 1,4-bis(trimethylsilyl)butadiyne, 2-tert-butyldimethylsiloxybut-3-yne, 4-(tert-butyldimethylsilyloxy)-1-butyne, N-methyl-N-propargylbenzylamine, 1-phenyl-2-trimethylsilylacetylene, 1-chloro-5-triethylsilyl-1-pentyne, [(triisopropylsilyl)acetylene]sulfur pentafluoride, (triisopropylsilyl)acetylene, (3-methoxyphenylethynyl)trimethylsilane, (4-methoxyphenylethynyl)trimethylsilane, 2-[(trimethylsilyl)ethynyl]toluene, 1-(triisopropylsilyl)-1-propyne, 2-ethynyl-6-methoxynaphthalene, 1-[(trimethylsilypethynyl]-3,5-dimethoxybenzene, 1-ethynyl-4-phenoxybenzene, (methyldiphenylsilyl)acetylene, 1-(1-naphthyl)-2-(trimethylsilyl)acetylene, (6-methoxynaphthalen-2-ylethynyl)trimethylsilane, 1,4-bis[(trimethylsilypethynyl]benzene, 1,6-diphenoxy-2,4,-hexadiyne, (triphenylsilyl)acetylene, 1-ethynyl-4-(trifluoromethyl)benzene, 4-ethynyl-N,N-dimethylaniline, 2-(ethynyloxy)-2-methoxypropane, and N,N-dimethylethynamine.

45. The method of claim 38, wherein the plurality of alkynes comprises at least one alkyne selected from the group consisting of 4-ethynylanisole, 4-ethynylbenzoic acid methyl ester, 2-ethynylthiophene, 1-ethynyl-4-(trifluoromethyl)benzene, 4-ethynyl-N,N-dimethylaniline, ethoxyethyne, hexa-1,5-diyne, and 4,4-dimethylhepta-1,6-diyne.

46. The method of claim 38, wherein the plurality of alkynes comprise alkynes having a structure according to formula (I):

$$R\!\!=\!\!R^a\!-\!X \qquad (I)$$

wherein R is selected from H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_8$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl wherein the heteroaryl is a 5-12 membered aromatic ring comprising 1 to 4 heteroatoms selected from O, N, and S, and $C_0$-$C_6$alkylene-$NR^b{}_2$;

$R^a$ is selected from a bond, $(O)_{0-1}C_1$-$C_{20}$alkylene, $(O)_{0-1}C_2$-$C_{20}$alkenylene, $(O)_{0-1}C_2$-$C_{20}$alkynylene, $(O)_{0-1}C_0$-$C_6$alkylene-$C_5$-$C_{20}$cycloalkylene, $(O)_{0-1}C_0$-$C_6$alkylene-$C_5$-$C_{20}$cycloalkenylene, $(O)_{0-1}C_0$-$C_6$alkylene-$C_5$-$C_{20}$cycloalkynylene, $(O)_{0-1}C_1$-$C_{20}$heteroalkylene comprising 1 to 5 heteroatoms selected from O, N, and S, $(O)_{0-1}C_2$-$C_{20}$heteroalkenylene comprising 1 to 5 heteroatoms selected from O, N, and S, $(O)_{0-1}C_0$-$C_6$alkylene-5-20 membered heterocycloalkylene comprising 1 to 4 ring heteroatoms selected from O, N, and S, $(O)_{0-1}C_0$-$C_6$alkylene-5-20 membered heterocycloalkenylene comprising 1 to 4 ring heteroatoms selected from O, N, and S, $(O)_{0-1}C_0$-$C_6$alkylene-arylene, $(O)_{0-1}C_0$-$C_6$alkylene-heteroarylene, wherein the heteroarylene is a 5-12 membered aromatic ring comprising 1 to 4 ring heteroatoms selected from O, N, and S, and $C_0$-$C_6$alkylene-NR$^b$—;

each R$^b$ is independently selected from $C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $SO_2C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_6$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 4 heteroatoms selected from O, N, and S; and X comprises H, halo, $C_1$-$C_{20}$alkoxy, phosphine, phosphito, phosphinito, phosphonito, secondary amino, beryl, lithium, or magnesium;

with the proviso that none of R, R$^a$, and R$^b$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

47. The method of claim 38, wherein the plurality of alkynes comprise alkynes having a structure according to formula (II):

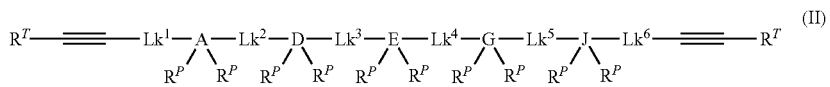

(II)

wherein
each R$^T$ independently is selected from the group consisting of H, halo, $C_1$-$C_{20}$alkyl, $C_2$-$C_{20}$alkenyl, $C_2$-$C_{20}$alkynyl, $C_0$-$C_6$alkylene-$C_6$-$C_{20}$cycloalkyl, $C_0$-$C_6$alkylene-$C_6$-$C_{20}$cycloalkenyl, $C_0$-$C_6$alkylene-$C_8$-$C_{20}$cycloalkynyl, $C_1$-$C_{20}$heteroalkyl comprising 1 to 5 heteroatoms selected from O, N, and S, $C_1$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O-aryl, $C_0$-$C_6$alkylene-O-heteroaryl wherein the heteroaryl is a 5-12 membered aromatic ring comprising 1 to 4 heteroatoms selected from O, N, and S, and $C_0$-$C_6$alkylene-NR$^c_2$;

A is carbon (C), nitrogen (N), oxygen (O), sulfur (S), —$((CH_2)_nO)_{1-20}$—, —$((CH_2)_mHN)_{1-20}$—, or Ar$^2$;

each of D, E, G, and J are independently selected from null, carbon (C), nitrogen (N), oxygen (O), sulfur (S), —$((CH_2)_nO)_{1-20}$—, —$((CH_2)_mHN)_{1-20}$—, and Ar$^2$;

n is 1, 2, 3, 4, or 5;
m is 1, 2, 3, 4, or 5;

Ar$^2$ is selected from the group consisting of phenylene, naphthalene, anthracene, fluorene, phenalene, phenanthrene, chrysene, fluoranthene, pyrene, tetracene, benzopyrene, perylene, tetraphenylene, anthanthrene, zethrene, a derivative of any of the foregoing wherein 1 to 5 carbon atoms have been replaced with O, S, or N, or a substituted variation of any of the foregoing;

each R$^P$ is independently selected from null, H, halo, $C_1$-$C_{20}$alkyl, $C_2$-$C_{20}$alkenyl, $C_2$-$C_{20}$alkynyl, $C_0$-$C_6$alkylene-$C_5$-$C_{20}$cycloalkyl, $C_0$-$C_6$alkylene-$C_5$-$C_{20}$cycloalkenyl, $C_0$-$C_6$alkylene-$C_5$-$C_{20}$cycloalkynyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, $C_0$-$C_6$alkylene-O— heteroaryl, wherein the heteroaryl is a 5-12 membered aromatic ring comprising 1 to 5 heteroatoms selected from O, N, and S, and $C_0$-$C_6$alkylene-NR$^c_2$, or both R$^P$ together with the atom to which they are attached form a Spiro five- to thirty-membered monocyclic or polycyclic group comprising 0 to 5 ring heteroatoms selected from N, O, and S;

each R$^c$ is independently selected from H, $C_1$-$C_{20}$alkyl, $C_2$-$C_{20}$alkenyl, $C_0$-$C_6$alkylene-$C_5$-$C_{20}$cycloalkyl, $C_0$-$C_6$alkylene-$C_5$-$C_{20}$cycloalkenyl, $C_1$-$C_{20}$heteroalkyl comprising 1 to 5 heteroatoms selected from O, N, and S, $C_2$-$C_{20}$heteroalkenyl comprising 1 to 5 heteroatoms selected from O, N, and S, $C_0$-$C_6$alkylene-5-20 membered heterocycloalkyl comprising 1 to 4 ring heteroatoms selected from O, N, and S, $C_0$-$C_6$alkylene-5-20 membered heterocycloalkenyl comprising 1 to 4 ring heteroatoms selected from O, N, and S, $C_0$-$C_6$alkylene-aryl, $C_0$-$C_6$alkylene-heteroaryl, wherein the heteroaryl is a 5-12 membered aromatic ring comprising 1 to 4 ring heteroatoms selected from O, N, and S, $C_0$-$C_6$alkylene-O—$C_1$-$C_{20}$alkyl, $C_0$-$C_6$alkylene-O—$C_5$-$C_{20}$cycloalkyl, $C_0$-$C_6$alkylene-O-5-20 membered heterocycloalkyl comprising 1 to 4 ring heteroatoms selected from O, N, and S, $C_0$-$C_6$alkylene-O— aryl, and $C_0$-$C_6$alkylene-O— heteroaryl, wherein the heteroaryl is a 5-12 membered aromatic ring comprising 1 to 5 heteroatoms selected from O, N, and S; and each of $Lk^1$, $Lk^2$, $Lk^3$, $Lk^4$, $Lk^5$, and $Lk^6$ are independently $C_{0-10}$alkylene;

with the proviso that none of $R^T$, $R^P$, $R^C$ and $Ar^2$ comprise an acidic hydrogen, a functional group selected from carboxyl, thiol, hydroxyl, primary amine and secondary amine, a carbon-oxygen double bond, a carbon-sulfur double bond, a nitrogen-oxygen double bond, a carbon-nitrogen double bond or a carbon-nitrogen triple bond.

48. The method of claim 38, further comprising hydrogenating the functionalized cyclic polymer.

49. A stereoregular functionalized cyclic polymer prepared by the method according to claim 38.

* * * * *

UNITED STATES PATENT AND TRADEMARK OFFICE
CERTIFICATE OF CORRECTION

PATENT NO. : 11,814,462 B2
APPLICATION NO. : 17/516191
DATED : November 14, 2023
INVENTOR(S) : Adam S. Veige Page 1 of 3

It is certified that error appears in the above-identified patent and that said Letters Patent is hereby corrected as shown below:

On the Title Page

At item (57), Line 2, "polymer" should be -- polymer, --.

In the Claims

At Column 43, Line 58, "—O—" should be -- —O—$Ar^1$, —O— --.

At Column 44, Line 35, "- or" should be -- or --.

At Column 44, Line 43, "—$NAr^3_2$ and" should be -- —$NAr^3_2$; and --.

At Column 44, Line 58, "They" should be -- The --.

At Column 45, Line 62, "H, $C_{22}$ alkyl)$_2$," should be -- H, -N-($C_1$-$C_{22}$ alkyl)$_2$, --.

At Column 45, Line 62, "—O—" should be -- —O—$Ar^1$, —O— --.

At Column 46, Line 37, "attached" should be -- attached, --.

At Column 46, Line 41, "- or" should be -- or --.

At Column 46, Line 51, "—$NAr^3_2$ and" should be -- —$NAr^3_2$; and --.

At Column 47, Line 6, "(I)," should be -- (I) --.

At Column 47, Line 12, "0," should be -- O, --.

At Column 47, Line 53, "$C_6$-$C_{20}$cycloalkyl," should be -- $C_5$-$C_{20}$cycloalkyl, --.

Signed and Sealed this
Fourth Day of June, 2024

Katherine Kelly Vidal
*Director of the United States Patent and Trademark Office*

At Column 47, Line 54, "$C_6$-$C_{20}$cycloalkenyl," should be -- $C_5$-$C_{20}$cycloalkenyl, --.

At Column 48, Line 1, "$C_6$-$C_{20}$cycloalkyl," should be -- $C_5$-$C_{20}$cycloalkyl, --.

At Column 49, Line 14, "$C_{22}$ alkyl)$_2$," should be -- -N-($C_1$-$C_{22}$ alkyl)$_2$, --.

At Column 49, Line 14, "—O—" should be -- —O—$Ar^1$, —O— --.

At Column 50, Line 11, "attached" should be -- attached, --.

At Column 50, Line 15, "- or" should be -- or --.

At Column 50, Line 22, "$R^{16}$" should be -- $R^{10}$ --.

At Column 50, Line 24, "—$NAr^3{}_2$ and" should be -- —$NAr^3{}_2$; and --.

At Column 51, Lines 34-39, "anthracene, fluorene, phenalene, phenanthrene, chrysene, fluoranthene, pyrene, tetracene, benzopyrene, perylene, tetraphenylene, anthanthrene, zethrene, a derivative of any of the foregoing wherein 1 to 5 carbon atoms have been replaced with O, S, or N, or a substituted variation of any of the foregoing;" should be on Line 33 after "naphthalene,", as the continuation point.

At Column 51, Line 62, "attached" should be -- attached, --.

At Column 53, Line 10, "—O—" should be -- —O—$Ar^1$, —O— --.

At Column 53, Line 46, "AO," should be -- $Ar^3$, --.

At Column 53, Line 47, "—O—" should be -- —O—$Ar^3$, —O— --.

At Column 53, Line 50, "attached" should be -- attached, --.

At Column 53, Line 54, "- or" should be -- or --.

At Column 53, Line 62, "—$NAr^3{}_2$ and" should be -- —$NAr^3{}_2$; and --.

At Column 53, Lines 62-65, "each $Ar^3$ is independently an aryl or heteroaryl, wherein the heteroaryl is a 5-12 membered aromatic ring comprising from 1 to 4 heteroatoms selected from O, N, and S." should be at Line 63, as a new point.

At Column 54, Line 41, "attached" should be -- attached, --.

At Column 54, Line 45, "- or" should be -- or --.

At Column 54, Line 54, "—$NAr^3{}_2$ and" should be -- —$NAr^3{}_2$; and --.

CERTIFICATE OF CORRECTION (continued)
U.S. Pat. No. 11,814,462 B2

At Column 55, Line 42, "1-[(trimethylsilypethynyl]" should be -- 1-[(trimethylsilyl)ethynyl] --.

At Column 55, Line 46, "[(trimethylsilypethynyl]" should be -- [(trimethylsilyl)ethynyl] --.

At Column 56, Line 22, "$C_5$-$C_{20}$cycloalkynylene," should be -- $C_8$-$C_{20}$cycloalkynylene, --.

At Column 56, Line 38, "$C_6$-$C_{20}$cycloalkyl," should be -- $C_5$-$C_{20}$cycloalkyl, --.

At Column 56, Line 39, "$C_6$-$C_{20}$cycloalkenyl," should be -- $C_5$-$C_{20}$cycloalkenyl, --.

At Column 56, Line 52, "$C_6$-$C_{20}$cycloalkyl," should be -- $C_5$-$C_{20}$cycloalkyl, --.

At Column 57, Line 17, "$C_6$-$C_{20}$cycloalkyl," should be -- $C_5$-$C_{20}$cycloalkyl, --.

At Column 57, Line 18, "$C_6$-$C_{20}$cycloalkenyl," should be -- $C_5$-$C_{20}$cycloalkenyl, --.

At Column 57, Line 31, "$C_6$-$C_{20}$cycloalkyl," should be -- $C_5$-$C_{20}$cycloalkyl, --.

At Column 57, Line 39, "$((CH_2)_mHN)_{1-20}$—," should be -- —$((CH_2)_mHN)_{1-20}$—, --.

At Column 57, Line 55, "$C_6$-$C_{20}$cycloalkyl," should be -- $C_5$-$C_{20}$cycloalkyl, --.

At Column 57, Lines 55-56, "$C_6$-$C_{20}$cycloalkenyl," should be -- $C_5$-$C_{20}$cycloalkenyl, --.

At Column 57, Line 56, "$C_6$-$C_{20}$cycloalkynyl," should be -- $C_5$-$C_{20}$cycloalkynyl, --.

At Column 58, Line 18, "attached" should be -- attached, --.

At Column 60, Line 11, "1-[(trimethylsilypethynyl]" should be -- 1-[(trimethylsilyl)ethynyl] --.

At Column 60, Line 15, "bis[(trimethylsilypethynyl]" should be -- bis[(trimethylsilyl)ethynyl] --.

At Column 60, Line 57, "$C_5$-$C_{20}$cycloalkynylene," should be -- $C_8$-$C_{20}$cycloalkynylene, --.

At Column 61, Line 19, "$C_6$-$C_{20}$cycloalkyl," should be -- $C_5$-$C_{20}$cycloalkyl, --.

At Column 61, Line 48, "$C_6$-$C_{20}$cycloalkyl," should be -- $C_5$-$C_{20}$cycloalkyl, --.

At Column 61, Line 49, "$C_6$-$C_{20}$cycloalkenyl," should be -- $C_5$-$C_{20}$cycloalkenyl, --.

At Column 62, Line 45, "attached" should be -- attached, --.

At Column 62, Line 46, "Spiro" should be -- spiro --.